(12) United States Patent
Punpruk et al.

(10) Patent No.: US 10,780,472 B2
(45) Date of Patent: Sep. 22, 2020

(54) SYSTEMS, DEVICES, CONTROLLERS, AND METHODS FOR USE IN THE TREATMENT OF A PIPELINE

(71) Applicant: PTT EXPLORATION AND PRODUCTION PUBLIC COMPANY LIMITED, Bangkok (TH)

(72) Inventors: Suchada Punpruk, Bangkok (TH); Chatawut Chanvanichskul, Bangkok (TH); Passaworn Silakorn, Bangkok (TH); Patara Limpanachaipornkul, Bangkok (TH); Chanya Thammawong, Bangkok (TH)

(73) Assignee: PTT Exploration and Production Public Company Limited, Bangkok (TH)

( * ) Notice: Subject to any disclaimer, the term of this patent is extended or adjusted under 35 U.S.C. 154(b) by 54 days.

(21) Appl. No.: 15/552,268

(22) PCT Filed: Feb. 1, 2016

(86) PCT No.: PCT/TH2016/000007
§ 371 (c)(1),
(2) Date: Aug. 18, 2017

(87) PCT Pub. No.: WO2017/135904
PCT Pub. Date: Aug. 10, 2017

(65) Prior Publication Data
US 2018/0036778 A1 Feb. 8, 2018

(51) Int. Cl.
*B08B 9/04* (2006.01)
*F16L 55/40* (2006.01)
(Continued)

(52) U.S. Cl.
CPC ........ *B08B 9/0557* (2013.01); *B23K 37/0276* (2013.01); *F16L 55/28* (2013.01);
(Continued)

(58) Field of Classification Search
CPC ....... F16L 2101/12; F16L 55/26; F16L 55/28; B05C 7/08; B08B 9/0553; B08B 9/0557
See application file for complete search history.

(56) References Cited

U.S. PATENT DOCUMENTS 2,332,984 A * 10/1943 Brackeen .............. B08B 9/0553
15/104.061
2,908,248 A * 10/1959 Brant .................... B08B 9/0436
118/408
(Continued)

FOREIGN PATENT DOCUMENTS

CN 2436243 Y 6/2001
CN 2650896 Y 10/2004
(Continued)

OTHER PUBLICATIONS

European Extended Search Report and Written Opinion in European Patent Application No. 16889569, dated Jul. 19, 2019.
(Continued)

*Primary Examiner* — Joseph L. Perrin
*Assistant Examiner* — Irina Graf
(74) *Attorney, Agent, or Firm* — Baker & McKenzie LLP

(57) ABSTRACT

System and method for decommissioning a pipeline. The system comprises mechanical and chemical assemblies. The mechanical assembly includes a main body and a contact assembly. When the mechanical assembly is provided in the pipeline, the contact assembly is configurable to contact with the interior wall of the pipeline. The chemical assembly is arranged serially in line with the mechanical assembly. The chemical assembly includes a front section having a
(Continued)

cross-sectional portion and a rear section having a cross-sectional portion. The front and the rear section are arranged in such a way that the cross-sectional portions of the front and the rear section cooperate with the interior wall of the pipeline to form a chamber to house a removal medium. The system and method can effectively and efficiently remove most or all of such residual mercury and/or other toxic substance from the interior wall of the pipeline before abandonment.

18 Claims, 24 Drawing Sheets

(51) Int. Cl.
    *B08B 9/055*     (2006.01)
    *F16L 55/38*     (2006.01)
    *B23K 37/02*     (2006.01)
    *F16L 55/28*     (2006.01)
    *F16L 55/46*     (2006.01)
    *F16L 101/12*     (2006.01)
    *F16L 101/30*     (2006.01)

(52) U.S. Cl.
    CPC ............... *F16L 55/38* (2013.01); *F16L 55/40* (2013.01); *F16L 55/46* (2013.01); *F16L 2101/12* (2013.01); *F16L 2101/30* (2013.01)

(56) References Cited

U.S. PATENT DOCUMENTS

| | | | | |
|---|---|---|---|---|
| 3,055,339 A * | 9/1962 | Pistole | ...................... | B05C 7/08 118/408 |
| 3,108,012 A * | 10/1963 | Curtis | ...................... | B05C 7/08 427/238 |
| 3,885,521 A * | 5/1975 | von Arx | ...................... | B05C 7/08 118/105 |
| 4,108,279 A * | 8/1978 | Marcell | ...................... | B05C 7/04 118/408 |
| 4,308,824 A * | 1/1982 | Muta | ...................... | B05C 7/08 118/713 |
| 4,416,703 A * | 11/1983 | Scott | ...................... | B08B 9/0555 134/22.11 |
| 4,774,905 A * | 10/1988 | Nobis | ...................... | B05C 7/02 118/304 |
| 5,686,674 A * | 11/1997 | Lowry | ...................... | E21B 23/08 73/865.8 |
| 6,500,271 B1 | 12/2002 | Moore et al. | | |
| 6,820,653 B1 * | 11/2004 | Schempf | ...................... | B08B 9/043 138/97 |
| 2005/0115588 A1 * | 6/2005 | Farris | ...................... | B08B 9/053 134/22.11 |
| 2008/0141474 A1 * | 6/2008 | Kapustin | ...................... | B08B 9/0436 15/104.066 |
| 2012/0118085 A1 * | 5/2012 | Christie | ...................... | F16L 55/26 73/865.8 |
| 2012/0137458 A1 * | 6/2012 | Knapp | ...................... | B08B 9/0551 15/104.061 |
| 2016/0281006 A1 * | 9/2016 | Grice | ...................... | C07C 7/1485 |

FOREIGN PATENT DOCUMENTS

| | | |
|---|---|---|
| CN | 201885891 U | 6/2011 |
| CN | 202366912 U | 8/2012 |
| CN | 203862640 U | 10/2014 |
| DE | 19520876 A1 | 12/1996 |
| GB | 493476 A | 10/1938 |
| WO | 2014011718 A1 | 1/2014 |
| WO | 2014062077 A1 | 4/2014 |
| WO | 2016154394 A1 | 9/2016 |

OTHER PUBLICATIONS

International Search Report and Written Opinion in corresponding Internatioanl Application No. PCT/TH2016/000007 by State Intellectual Property Office of China as International Searching Authority, dated Nov. 3, 2016.

* cited by examiner

SYSTEMS, DEVICES, CONTROLLERS, AND METHODS FOR USE IN THE TREATMENT OF A PIPELINE

This application claims priority to and is a national phase entry under 35 U.S.C. § 371 of International Application No. PCT/TH2016/000007 filed Feb. 1, 2016, the entire contents of which are incorporated herein by reference.

BACKGROUND

The present disclosure relates generally to systems and methods for use within a pipeline, and more specifically, to systems, devices, controllers, and methods for performing, among other things, the measuring, sampling, treating, conditioning, cleaning, and decommissioning of pipelines.

Various forms of pipelines are in use today. Pipelines may come in a variety of cross-sectional sizes, lengths, shapes, thicknesses, structures, compositions, and arrangements, and may be selected based on a plurality of considerations including, but not limited to, the type of contents to be transported (e.g., solid, liquid, and/or gaseous mixtures; hereinafter "mixtures"), the expected and/or desired throughput of the mixtures, expected lifetime of usage, distance in respect of which the mixtures will be transported, surrounding conditions of the pipeline (e.g., considerations based on subsea vs. terrestrial applications), and costs.

For subsea extraction applications, such as the extraction of hydrocarbons from a subsea reservoir, an installation of pipelines will involve a tremendous investment in time, cost, and other resources. Once installed, the pipelines are generally expected to function for not less than the duration of time expected to extract a desired amount of the mixtures contained in the reservoir. Once a decision has been made to no longer extract mixtures from such a reservoir, such as when the reservoir is depleted or nearly depleted, a decision must then be made as to what to do with the pipeline.

BRIEF SUMMARY

It is recognized in the present disclosure that conventional approaches to decommission a pipeline include (1) the removal of the pipeline, either in whole or in part, or (2) the abandoning of the pipeline, either in whole or in part. In respect to the removal of pipelines, the process for performing such may include, among other things, disassembling and/or cutting the pipeline into sections, removing the sections, and transporting the sections to a location for further treatment (e.g., for treating/cleaning, further disassembling or cutting, recycling, and/or discarding). In respect to the abandoning of pipelines, the process for performing such will typically depend on a variety of factors, including, but not limited to, laws and regulations of the country in which the pipeline is installed; methods of abandoning the pipeline; conditions of the pipeline (e.g., any presence of residual harmful solid, liquid, and/or gaseous mixtures attached to, embedded in, and/or formed on an interior wall of the pipeline); and/or environmental impact considerations.

In general, studies have shown that the overall cost for performing pipeline removal may be upwards of 5 to 10 times or more than the cost of abandoning the pipeline. However, abandoning of pipelines have become increasingly difficult to satisfactorily perform in several countries, including Thailand and other South East Asian countries, due to, among other things, expected, to-be-enacted, and/or already enacted legal and/or regulatory requirements of certain countries; lack of available or sufficient methods, devices, and systems for performing adequate treatment of pipelines before abandoning to meet such expected, to-be-enacted, and/or already enacted legal and/or regulatory requirements; etc. For example, extractable mixtures (e.g., hydrocarbons, etc.) in certain countries around the world, such as Thailand and other Asian countries, inherently possess exceptionally high concentrations of mercury (Hg) and/or other toxic substances. For example, studies have shown that mercury (Hg) concentrations from crude oil in such countries can be in the order of 100 or more times higher than the global average mercury (Hg) concentrations. As a result, over the useable lifetime of pipeline in such countries, a considerable amount of residual mercury (Hg) and/or other toxic substances will become attached to, embedded in, and/or formed on the interior walls of the pipelines. Specifically, a corroded and/or scaled layer of the interior walls of pipelines used in such countries may form and, over time, may contain very high concentrations of residual mercury (Hg) and/or other toxic substances formed therein which, if left untreated, may cause harmful environmental impacts. In order to reduce or eliminate possible harmful environmental impacts of such residual mercury (Hg) and/or other toxic substances from pipelines being abandoned, it is necessary to effectively and efficiently remove most or all of such residual mercury (Hg) and/or other toxic substances from the interior walls of the pipeline before abandonment.

Present example embodiments relate generally to systems, devices, controllers, and methods for use in, among other things, preparing, measuring, sampling, treating, conditioning, cleaning, and decommissioning pipelines.

In an exemplary embodiment, a system is described for treating an interior wall of a pipeline. The system may comprise a first mechanical assembly, a first chemical assembly, a second chemical assembly, and a second mechanical assembly. The first mechanical assembly may include a first main body and a first contact assembly attachable to the first main body. When the first mechanical assembly is provided in the pipeline, at least a portion of the first contact assembly is configurable to contact with and apply a force to the interior wall of the pipeline. The first chemical assembly may be arranged serially in line with and attached to at least a portion of the first mechanical assembly. The first chemical assembly may include a first front section having a cross-sectional portion configurable to resemble the geometrically-shaped cross-section of the pipeline. The first chemical assembly may also include a first rear section having a cross-sectional portion configurable to resemble and face the cross-sectional portion of the first front section. The first chemical assembly may also include a first chamber formable by a cooperation of the cross-sectional portion of the first front section, the cross-sectional portion of the first rear section, and the interior wall of the pipeline when the first chemical assembly is provided in the pipeline. The first chamber may be operable to receive and substantially house a first liquid-based removal medium. The second chemical assembly may be arranged serially in line with and attached to at least a portion of the first chemical assembly. The second chemical assembly may include a second front section having a cross-sectional portion configurable to resemble the geometrically-shaped cross-section of the pipeline. The second chemical assembly may also include a second rear section having a cross-sectional portion configurable to resemble and face the cross-sectional portion of the second front section. The second chemical assembly may also include a second chamber formable by a cooperation of the cross-sectional portion of the second front section, the cross-sectional portion of the second rear section, and the interior wall of the pipeline when the second chemical assembly is provided in the pipeline. The second chamber may be operable to receive and substantially house a second liquid-based removal medium. The second mechanical assembly may be arranged serially in line with and attached to at least a portion of the second chemical assembly. The second mechanical assembly may have a second main body and a second contact assembly attachable to the second main body. When the second mechanical assembly is provided in the pipeline, at least a portion of the second contact assembly is configurable to contact with and apply a force to the interior wall of the pipeline. In another exemplary embodiment, a system is described for treating an interior wall of a pipeline. The system may comprise a mechanical assembly and a chemical assembly. The mechanical assembly may include a main body and a contact assembly attachable to the main body. When the mechanical assembly is provided in the pipeline, at least a portion of the contact assembly is configurable to contact with and apply a force to the interior wall of the pipeline. The chemical assembly may be arranged serially in line with and attached to at least a portion of the mechanical assembly. The chemical assembly may include a front section having a cross-sectional portion configurable to resemble the geometrically-shaped cross-section of the pipeline. The chemical assembly may also include a rear section having a cross-sectional portion configurable to resemble and face the cross-sectional portion of the front section. The front and rear sections may be arranged in such a way that, when the chemical assembly is provided in the pipeline, the cross-sectional portions of the front and rear sections are operable to cooperate with the interior wall of the pipeline to form a chamber. The chamber may be operable to receive and substantially house a liquid-based removal medium.

In another exemplary embodiment, a system is described for treating an interior wall of a pipeline. The system may comprise a mechanical assembly having a main body and a contact assembly attachable to the main body. When the mechanical assembly is provided in the pipeline, at least a portion of the contact assembly is configurable to contact with and apply a force to the interior wall of the pipeline. Furthermore, the force applied by the contact assembly to the interior wall of the pipeline may be sufficient to remove at least a portion of a corroded or scaled outermost layer present in the interior wall of the pipeline.

In another exemplary embodiment, a system is described for treating an interior wall of a pipeline. The system may comprise a chemical assembly including a front section having a cross-sectional portion configurable to resemble the geometrically-shaped cross-section of the pipeline. The chemical assembly may also include a rear section having a cross-sectional portion configurable to resemble and face the cross-sectional portion of the front section. The chemical assembly may also include a chamber formable by a cooperation of the cross-sectional portion of the front section, the cross-sectional portion of the rear section, and the interior wall of the pipeline when the chemical assembly is provided in the pipeline. The chamber may be operable to receive and substantially house a liquid-based removal medium.

In another exemplary embodiment, a system is described for analyzing an interior wall of a pipeline. The system may comprise a main body, a sample extraction subsystem, and a sample containment subsystem. The main body may be configurable to traverse through the pipeline. The sample extraction subsystem may be secured to the main body. The sample extraction subsystem may include an end effector. The end effector may be configurable to contact with and extract a sample of the interior wall of the pipeline. The sample extraction subsystem may also include a sample extraction body connected to the end effector. The sample extraction body may be configurable to move the end effector relative to the main body. The sample containment subsystem may be secured to the main body. The sample containment subsystem may include a plurality of sample containment sections operable to store samples. The sample containment subsystem may also include an input section operable to receive samples extracted by the end effector and provide the received samples into one of the sample containment sections. The sample containment subsystem may also include a sample containment section selection mechanism in communication with the sample containment sections. The sample containment section selection mechanism may be configurable to perform a selection of one of the sample containment sections to receive the samples from the input section.

In another exemplary embodiment, a method is described for treating an interior wall of a pipeline. The method may comprise providing a mechanical assembly. The mechanical assembly may include a main body and a contact assembly attachable to the main body. The method may further comprise providing a chemical assembly. The chemical assembly may include a front section having a cross-sectional portion configurable to resemble the geometrically-shaped cross-section of the pipeline. The chemical assembly may also include a rear section having a cross-sectional portion configurable to resemble and face the cross-sectional portion of the front section. The method may further comprise arranging the mechanical assembly serially in line with the chemical assembly by securing the chemical assembly to at least a portion of the mechanical assembly. The method may further comprise providing the arranged mechanical and chemical assemblies in the pipeline. The method may further comprise launching the arranged mechanical and chemical assemblies through the pipeline. The method may further comprise applying, by the contact assembly of the mechanical assembly, a first force to the interior wall of the pipeline. The applied first force may be sufficient to remove at least a portion of a corroded or scaled outermost layer present in the interior wall of the pipeline. The method may further comprise contacting, by the chemical assembly, a removal medium to the interior wall of the pipeline. The contacting of the removal medium may be operable to remove at least a portion of a corroded or scaled outermost layer of the interior wall of the pipeline.

BRIEF DESCRIPTION OF THE DRAWINGS

For a more complete understanding of the present disclosure, example embodiments, and their advantages, reference is now made to the following description taken in conjunction with the accompanying drawings, in which like reference numbers indicate like features, and.

Although similar reference numbers may be used to refer to similar elements in the figures for convenience, it can be appreciated that each of the various example embodiments may be considered to be distinct variations.

Figure 1A:
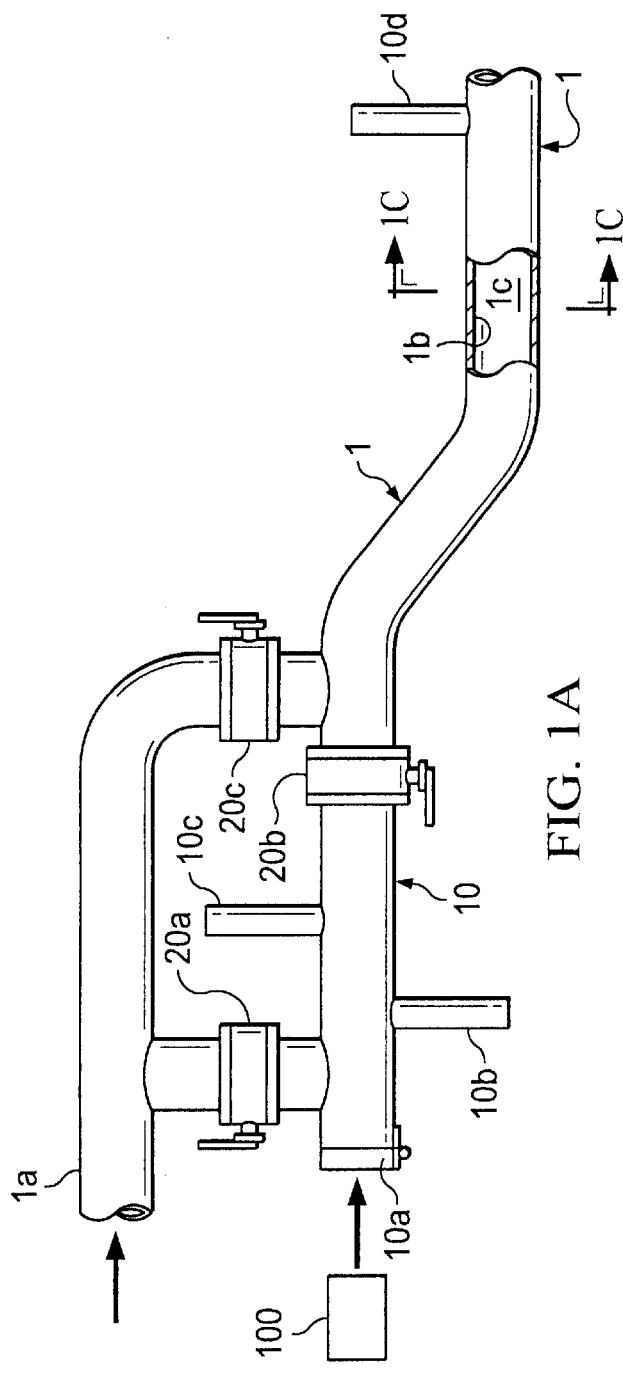
FIG. 1A is an example illustration of introducing an example embodiment of a system into a pipeline.

Example embodiments will now be described with reference to the accompanying drawings, which form a part of the present disclosure and which illustrate example embodiments which may be practiced. As used in the present disclosure and the appended claims, the terms "example embodiment", "exemplary embodiment", and "present embodiment" do not necessarily refer to a single embodiment, although they may, and various example embodiments may be readily combined and/or interchanged without departing from the scope or spirit of example embodiments. Furthermore, the terminology as used in the present disclosure and the appended claims is for the purpose of describing example embodiments only and is not intended to be limitations. In this respect, as used in the present disclosure and the appended claims, the term "in" may include "in" and "on", and the terms "a", "an", and "the" may include singular and plural references. Furthermore, as used in the present disclosure and the appended claims, the term "by" may also mean "from", depending on the context. Furthermore, as used in the present disclosure and the appended claims, the term "if" may also mean "when" or "upon", depending on the context. Furthermore, as used in the present disclosure and the appended claims, the words "and/or" may refer to and encompass any and all possible combinations of one or more of the associated listed items.

DETAILED DESCRIPTION

Pipeline decommissioning options available today include (1) the removal of the pipeline, either in whole or in part, or (2) the abandoning of the pipeline, either in whole or in part. It is recognized in the present disclosure that tradeoffs generally exist in respect to these pipeline decommissioning options. Such trade-offs may be understood by way of the following non-limiting examples.

In respect to the removal option, the process for performing such may include disassembling and/or cutting the pipeline into sections, removing the sections, and transporting the sections to a location for further treatment (e.g., to be cleaned, further cut and/or disassembled, recycled, and/or discarded). While such an option may effectively result in the removal of mercury (Hg) and/or other toxic substances from the locations previously housing the pipeline and therefore eliminate possible environmental impacts of such toxic substances to such locations, such an option, however, is also by far a much more costly option than abandoning the pipeline.

In respect to the abandoning option, the process for performing such may include draining the pipeline, followed by sealing and/or burying the ends of the pipeline. While such an option may be a far less costly option as compared to the above-mentioned removal option, known methods for performing such an option, however, do not effectively reduce or eliminate the residual mercury (Hg) and/or other toxic substances present in the abandoned pipelines and therefore leaves a possibility for such residual mercury (Hg) and/or other toxic substances to one day cause environmental impacts. Many countries around the world have recognized the potential harmful environmental impacts of residual mercury (Hg) and/or other toxic substances present in abandoned pipelines, and have either enacted or are preparing to enact legislations and/or regulations governing the acceptable amounts (e.g., concentrations) of mercury (Hg) and/or other toxic substances that can be present in abandoned pipelines. Thailand and certain other South East Asian countries are examples of such countries. Present example embodiments relate generally to systems, devices, controllers, and methods for use in, among other things, preparing, measuring, sampling, treating, conditioning, cleaning, and/or decommissioning pipelines. Example embodiments may be for use in measuring and/or sampling mercury (Hg) and/or other toxic substances present in/on an interior wall of pipelines. Example embodiments may also be for use in removing mercury (Hg) and/or other toxic substances from the interior wall of pipelines. Example embodiments will now be described below with reference to the accompanying drawings. It is to be understood that the principles described in the present disclosure can be applied outside of the context of decommissioning pipelines, such as performing maintenance of pipelines, performing repairs of pipelines, performing actions in other enclosed environments that are not readily accessible by humans, including underground environments, subsea environments, extreme weather conditions, substantially liquid-based environment, substantially gaseous-based environments, in a vacuum, in outer space, and/or under toxic and/or dangerous conditions, without departing from the teachings of the present disclosure.

The System (e.g., System 100).

Figure 1B:
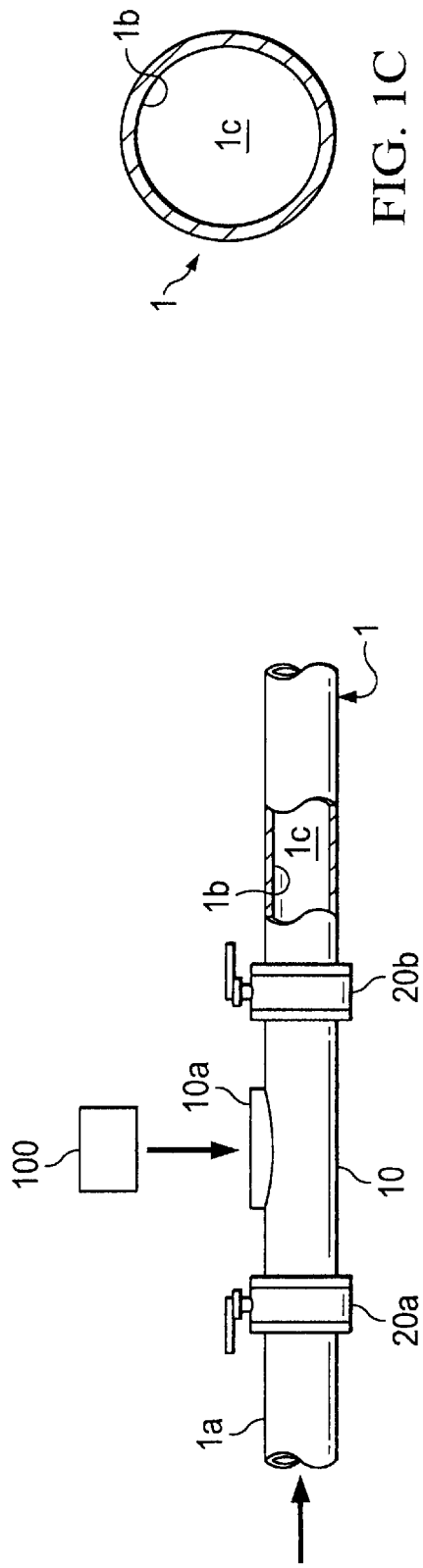
FIG. 1B is another example illustration of introducing an example embodiment of a system in a pipeline.

FIG. 1A and FIG. 1B illustrate an example embodiment of a system 100 configurable for use within a pipeline 1 to treat/maintain the pipeline 1 and/or prepare the pipeline 1 for decommissioning. A launcher 10, or the like, may be provided to introduce the system 100 into the pipeline 1. The launcher 10 may be an isolatable chamber in communication with the pipeline 1, a section of the pipeline 1, or the like. For example, when introducing the system 100 into the pipeline 1, the launcher 10 may first be isolated by actuating a valve 20a to a closed position and actuating an isolation valve 20b to a closed position. For the embodiment illustrated in FIG. 1A, an isolation valve 20c may also be actuated to a closed position. If necessary, residual gas present in the launcher 10 may be removed via section 10b, such as by introducing inert gas (e.g., nitrogen). The system 100 may then be inserted into the launcher 10 via an access door 10a. The access door 10a may be closed and the valves 20a and 20b may be actuated to an open position, thereby allowing high pressure medium (e.g., gas, liquid, and/or other medium) present in the downstream part 1a of the pipeline 1 to encourage the system 100 into the pipeline 1. For the embodiment illustrated in FIG. 1A, the isolation valve 20c may also be actuated to an open position to allow high pressure mixtures from the downstream part 1a to further encourage the system 100 into the pipeline 1. It is to be understood in the present disclosure that other methods, launchers, and systems may be used to insert, introduce, and/or encourage the system 100 into the pipeline 1 without departing from the teachings of the present disclosure.

Alternatively, the system 100 may be operable to travel through the pipeline 1 via other mechanisms including, but not limited to, a pulling system (such as a system having a chain, or the like, attached between a motor and the system 100, wherein the motor is operable to cause the system 100 to travel through the pipeline 1 by pulling the chain), a propeller-based subsystem attached to the system 100, a wheel-based subsystem attached to the system 100, and/or other transport mechanisms attached to or in communication with the system 100.

Figure 1C:
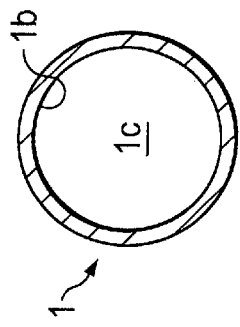
FIG. 1C is a cross-sectional illustration of an example pipeline.

In an example embodiment, the system 100 may comprise a mechanical assembly. The mechanical assembly may be configurable to treat an interior wall 1b of the pipeline 1 by contacting a contact assembly (e.g., a brush, rough surface, etc.) of the mechanical assembly to the interior wall 1b. For example, the mechanical assembly may be configurable to perform one or more of the following: clean the interior wall 1b, remove toxic chemicals from the interior wall 1b, remove a portion of an outermost layer of the interior wall 1b (e.g., a corroded and/or scaled outermost layer of the interior wall 1b), etc. As used in the present disclosure and illustrated in the cross-sectional illustration of FIG. 1C, an interior wall 1b of a pipeline 1 may refer to the wall 1b of the pipeline 1 that forms the interior channel 1c of the pipeline 1, the interior channel 1c being the volume 1c operable to allow mixtures to pass through the pipeline 1.

In another example embodiment, the system 100 may comprise a chemical assembly. The chemical assembly may be configurable to treat an interior wall 1b of the pipeline 1 by contacting a removal medium (e.g., an acid, mercury (Hg) stabilizer, scale removal compound, etc.) to the interior wall 1b. For example, the chemical assembly may be configurable to perform one or more of the following: clean the interior wall 1b, remove toxic chemicals from the interior wall 1b, remove an outermost layer of the interior wall 1b (e.g., a corroded and/or scaled outermost layer of the interior wall 1b), etc.

In another example embodiment, the system 100 may comprise a sampling assembly. The sampling assembly may be configurable to obtain a sample of an interior wall 1b of the pipeline 1. For example, the sampling assembly may be configurable to obtain the sample by using an end effector, or the like. The end effector may include, but is not limited to including, a gripper, cutter, scooper, scraper, driller, and/or laser.

In another example embodiment, the system 100 may comprise a measuring assembly. The measuring assembly may be configurable to perform an in-situ measurement of an interior wall 1b of the pipeline 1. For example, the measuring assembly may be configurable to perform a measurement of a quantity of a toxic substance (such as a concentration of mercury) present in the interior wall 1b (e.g., a corroded and/or scaled outermost layer of the interior wall 1b).

These and other example embodiments will now be further described below and with reference to the accompanying drawings.

Mechanical Assembly (e.g., Mechanical Assembly 200).

As illustrated in at least FIGS. 2A-O and 6A-F, the system 100 may comprise a mechanical assembly (e.g., mechanical assembly 200). The mechanical assembly 200 may be for use in treating (e.g., clean, remove toxic substances, remove portions of the interior wall 1b, remove at least a portion of a corroded or scaled outermost layer of the interior wall 1b, etc.) an interior wall 1b of a pipeline 1 having a geometrically-shaped cross-section. For example, the pipeline 1 may have a circular-shaped cross-section forming a circular-shaped cross-sectional interior channel 1c, as illustrated in at least FIG. 1C. It is to be understood in the present disclosure that the pipeline 1 may have a cross-section resembling a circle, oval, square, rectangle, and/or one or more other geometrical shapes without departing from the teachings of the present disclosure.

An example embodiment of the mechanical assembly 200 may comprise a main body. The mechanical assembly 200 may also comprise a contact assembly attachable or attached to the main body. The contact assembly may be configured in such a way that, when the mechanical assembly 200 is provided in the pipeline 1, at least a portion of the contact assembly may contact with and apply a force to the interior wall 1b of the pipeline 1. In this regard, the contact and/or force applied by the contact assembly may be operable to perform the treating of the interior wall 1b of the pipeline 1.

The contact and/or force applied by the contact assembly may be a contact and/or force applied in one or more directions in example embodiments. For example, the contact and/or force applied by the contact assembly may be a contact and/or force applied in a substantially or near radially outward direction (e.g., a direction perpendicular to the portion of the interior wall 1b being contacted with, and/or a direction perpendicular to the direction of movement of the system 100 through the pipeline). In addition to or alternatively, the contact and/or force applied by the contact assembly may be a contact and/or force applied in a substantially or near lateral direction. For example, the direction of the contact and/or force may be a direction substantially or nearly tangential to the portion of the interior wall 1b being contacted with (e.g., the contact and/or force that may occur when the system 100 is traveling through the pipeline 1). Another example of the substantially or nearly tangential direction may be the direction of the contact and/or force that may occur when the contact assembly is configured to move (e.g., rotate) relative to the main body and/or move (e.g., rotate) relative an axis formed by the main body (and/or other parts of the mechanical assembly 200). It is to be understood in the present disclosure that the direction of contact and/or force applied by the contact assembly may include one or more of these or other directions without departing from the teachings of the present disclosure, so long as the applied contact, applied force, and/or direction of the applied contact and/or applied force are operable to perform the treating of the interior wall 1b of the pipeline 1.

The force applied by the contact assembly to perform the treating of the interior wall 1b of the pipeline 1 may be between about 0.1 to 1,000 N/cm$^2$, or more or less.

Figure 2A:
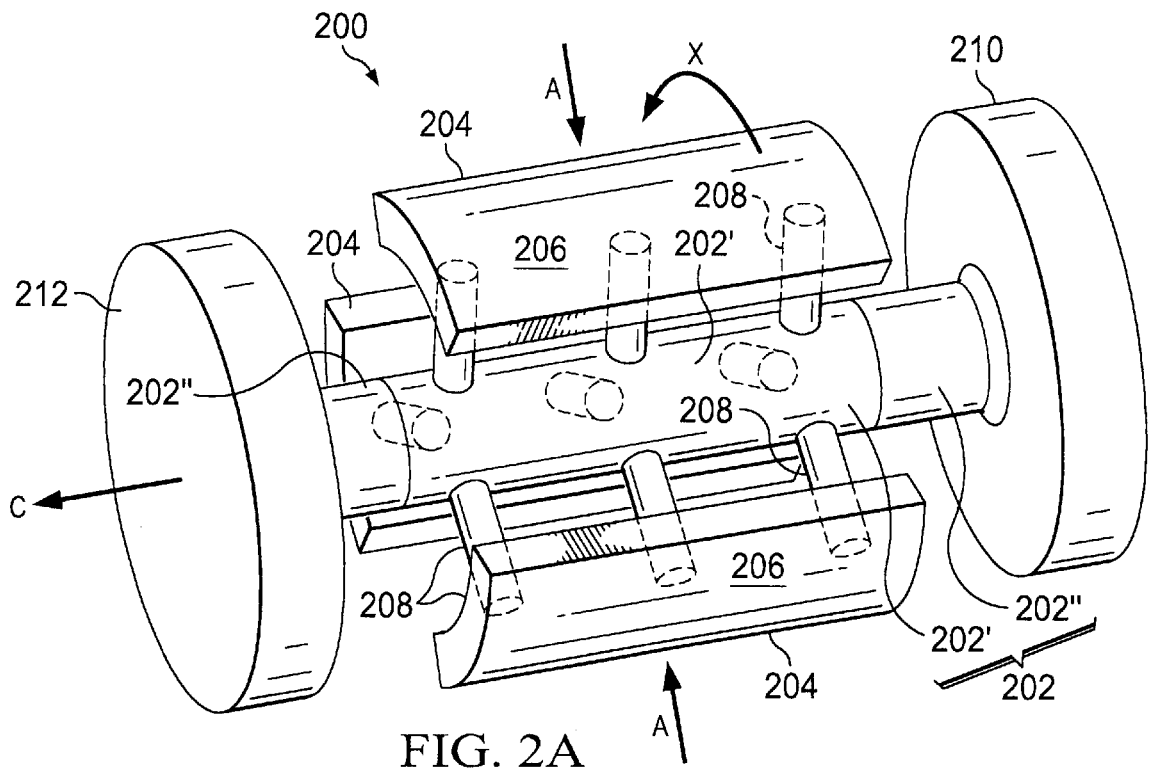
FIG. 2A is a perspective view illustration of an example embodiment of a system having a mechanical assembly with a set of contact members.

Example 1—Example Embodiment of a Mechanical Assembly Having a Set of Contact Members FIG. 2A depicts an example embodiment of the mechanical assembly 200. The mechanical assembly 200 may have a main body 202. The mechanical assembly 200 may also include a contact assembly 204. The contact assembly 204 may comprise a set of contact members 204 arranged around the main body 202. For example, as shown in FIG. 2A, the contact assembly 204 may comprise a set of three contact members 204 arranged radially around the main body 202. It is to be understood in the present disclosure that the contact assembly 204 may have a set of more or less than three contact members 204 without departing from the teachings of the present disclosure. For example, the contact assembly 204 may include a set of one, two, four, or more than four contact members 204.

One or more of the contact members 204 may have an interior portion 208 attachable to the main body 202. For example, as shown in FIG. 2A, the interior portion 208 may include an interior facing portion of the contact members 204 (e.g., facing the main body 202) and a structure operable to attach one or more of the contact members 204 to the main body 202. It is to be understood in the present disclosure that the interior portion 208 may be formed in one or more other shapes and configurations, including a shared structure among two or more contact members 206, without departing from the teachings of the present disclosure.

One or more of the contact members 204 may also have a contact region 206. The contact region 206 may be configured to face outwardly away from the main body 202. For example, each contact region 206 may be configured to face towards the interior wall 1b of the pipeline 1 when the mechanical assembly 200 is provided in the pipeline 1. The contact members 204 may be configured in such a way that, when the mechanical assembly 200 is provided in the pipeline 1, at least a portion of at least one of the contact regions 206 may contact with and apply the force to the interior wall 1b of the pipeline 1.

Figure 2B:
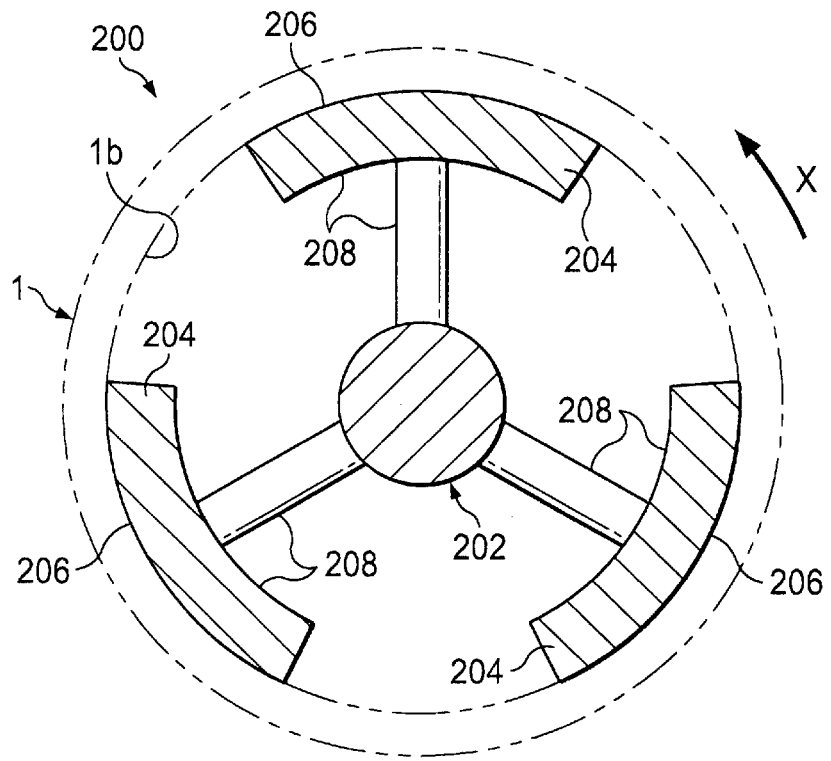
FIG. 2B is a cross-sectional view illustration of an example embodiment of a system having a mechanical assembly with a set of contact members.

Each contact region 206 may be formed in one or more of a plurality of shapes, sizes, structures, configurations, and compositions. For example, each contact region 206 may include substantially or relatively curved and/or flat surfaces and/or structures. As a more specific example, each contact region 206 may have a portion that is curved to resemble the curvature of the interior wall 1b of the pipeline 1. In addition to or alternatively, each contact region 206 may have a portion that is curved to enable contact with the curved portions of the interior wall 1b of the pipeline. In addition to or alternatively, each contact region 206 may include a plurality of thistles (such as metal-based thistles and/or other relatively strong and durably structured thistles of other compositions), protruding features and/or elements, or the like. For example, each contact region 206 may include brush-like structures having thistles, or the like, formed using steel-based (e.g., high speed steel or surface hardening steel) or other materials (e.g., artificial diamond or other carbon-based materials). FIG. 2D illustrates an example embodiment of a mechanical assembly 200 having an arrangement of brush-like contact regions 206. In addition to or alternatively, each contact region 206 may resemble a scraping tool, grinding tool, or the like. In addition to or alternatively, each contact region 206 may include surface(s) having rough and/or sharp surface area(s). For example, each of the rough and/or sharp features of such a surface may be formed in one or more of a plurality of shapes, including triangles, cones, cylinders, knife-edges, needles, and/or wire brushes. It is to be understood in the present disclosure that each contact region 206 may be formed in one or more of these or other shapes, sizes, structures, configurations, and/or compositions without departing from the teachings of the present disclosure, so long as the contact regions 206 are operable to perform the treating of the interior wall 1*b* of the pipeline 1.

In respect to the main body 202, the main body 202 may be a substantially elongated body having one or more parts spanning some, most, or all of the length of the mechanical assembly 200. The main body 202 may be a substantially cylindrical shaped body, or may include one or more other shapes and configurations. The main body 202 may include a first portion 202' and one or more second portions 202". As illustrated in FIG. 2A, the main body 202 may include a second portion 202" nearest to first end 210 and a second portion 202" nearest to second end 212. It is to be understood in the present disclosure that the second portion 202" of the main body 202 may be formed as separate independent elements, separate elements connected via an attachment (not shown) through first portion 202' of the main body 202, or a unitary element having a portion (not shown) passing through first portion 202' of the main body 202 without departing from the teachings of the present disclosure. In example embodiments, the first portion 202' and second portion 202" may be formed as a unitary element.

In example embodiments, the first portion 202' of the main body 202 may be the portion of the main body 202 that is attached or attachable to the contact assembly 204 (e.g., via interior portion(s) 208), as illustrated in FIG. 2A. The first portion 202' of the main body 202 may or may not be configurable to move (e.g., rotate) relative to the second portion 202" of the main body 202, another element of the mechanical assembly 200, and/or an imaginary axis formed by an element of the mechanical assembly 200. For example, as illustrated in FIG. 2A and FIG. 2B, which is a cross-sectional illustration of FIG. 2A along line A, the first portion 202' of the main body 202 may be configurable to rotate in direction X (and/or different from direction X), and in doing so, cause the contact members 206 to collectively rotate (i.e., cause the contact assembly 204 to rotate) in direction X (and/or different from direction X) relative to the second portion 202" and/or around the imaginary axis C. It is to be understood in the present disclosure that the first portion 202' of the main body 202 may not be movable and/or rotatable relative to the second portion 202" of the main body 202 and/or imaginary axis C.

The main body 202 may also include a first end 210 and/or second end 212 in example embodiments. The first end 210 and/or second end 212 may be provided so as to perform one or more functions, including, but not limited to, enabling the system 100 to travel through the pipeline 1 and providing stability for the system 100 while within and traveling through the pipeline 1. For example, when the system 100 is provided in a pipeline 1, when it is desired for the system 100 to travel in the direction depicted by imaginary axis C while in the pipeline 1, and when the system 100 is operable to travel via an externally-provided high pressure medium (e.g., gas, liquid, and/or other medium) providable to the first end 210 in the direction depicted by imaginary axis C, the first end 210 may be operable to receive the high pressured medium and cause the system 100 to travel through the pipeline 1 accordingly. When traveling through the pipeline 1, the system 100 may then perform, among other things, the treating of the interior wall 1*b* of the pipeline 1 via the mechanical assembly 200. The second end 212 may be similarly used when it is desired for the system 100 to travel through the pipeline 1 in an opposite direction to the direction depicted by imaginary axis C. In addition to or alternatively, the second end 212 may be used to assist in controlling the movement and/or position of the system 100 in the pipeline 1, such as by selectively controlling high pressured medium present on both ends of the system 100. In addition to or alternatively, the system 100 may travel through the pipeline 1 via other mechanisms, as described above and in the present disclosure.

The mechanical assembly 200 may also include a controller (not shown), and the controller may be housed, either in part or in whole, in the first portion 202' of the main body 202, the second portion 202" of the main body 202, the first end 210, the second end 220, and/or other parts of the system 100. As used in the present disclosure, the controller may include a processor configurable to control one or more elements of the mechanical assembly 200, other elements of the system 100, and/or a power source (not shown) used in providing power to the controller, one or more elements of the mechanical assembly 200, and/or other elements of the system 100. The controller may be any machine, computing device, or communication device. A network may be provided so as to enable the controller to, among other things, perform configuring of one or more elements of the system 100 (including those described above and in the present disclosure) and communicate with one or more other controllers and/or computing devices (not shown). The controller may be configurable to also communicate with a storage medium (memory) to store information gathered, such as performance parameters, number of rotations (if any) of the contact assembly, a quantity of force applied by the contact regions (such as an average, maximum, minimum, distribution over time, distribution based on location and/or distance travelled, etc.), etc.

In respect to the dimensions of the mechanical assembly 200, a cross-sectional dimension between the contact regions 206 of the mechanical assembly 200 and the central axis C (e.g., distance between an outermost portion of the contact region and the central axis C) may be more than, equal to, or less than the radius of the pipeline 1. For example, in situations wherein the contact regions 206 include brush-like structures having thistles, or the like, the said dimension may be more than or nearly equal to the radius of the pipeline 1. As another example, when one or more of the contact regions 206 are configurable to extend away from and retract towards the central axis C, the said dimension may extend to be more than or nearly equal to the radius of the pipeline 1 (which may be useful when traversing through a non-straight portion (e.g., bends or turns) of the pipeline 1). A dimension between ends 210 and 212 (i.e., overall length) may be selected based on, among other things, the minimum or smallest bend radius found in the non-straight portions of the overall pipeline 1 so as to ensure the mechanical assembly 200 is capable of traversing through such bends. In situations wherein the overall length of the mechanical assembly 200 exceeds the maximum allowable length based on considerations of the aforementioned minimum or smallest bend radius of the pipeline 1, the main body 202 may include one or more bendable, pivotable, actuatable, and/or flexible portions configurable to enable the mechanical assembly 200 to traverse through such non-straight portion of the pipeline 1. For example, the main body 202 of the mechanical assembly 200 may include a pivotable, actuatable, bendable, and/or flexible portion, such as in the first portion 202' and/or one or more of the second portions 202".

Figure 2C:
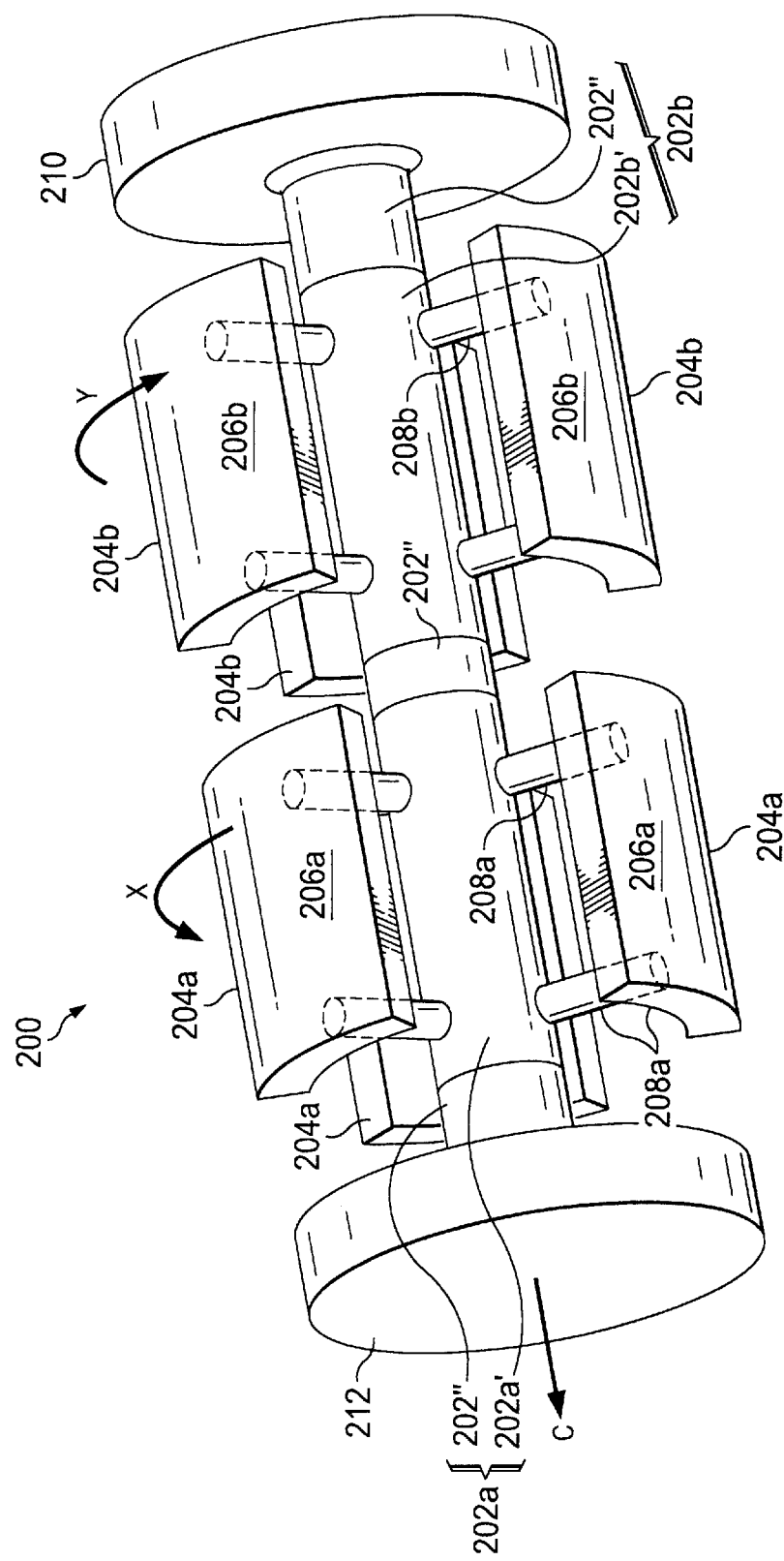
FIG. 2C is a perspective view illustration of another example embodiment of a system having a mechanical assembly with two sets of contact members in a serially in line configuration.
Figure 2D:
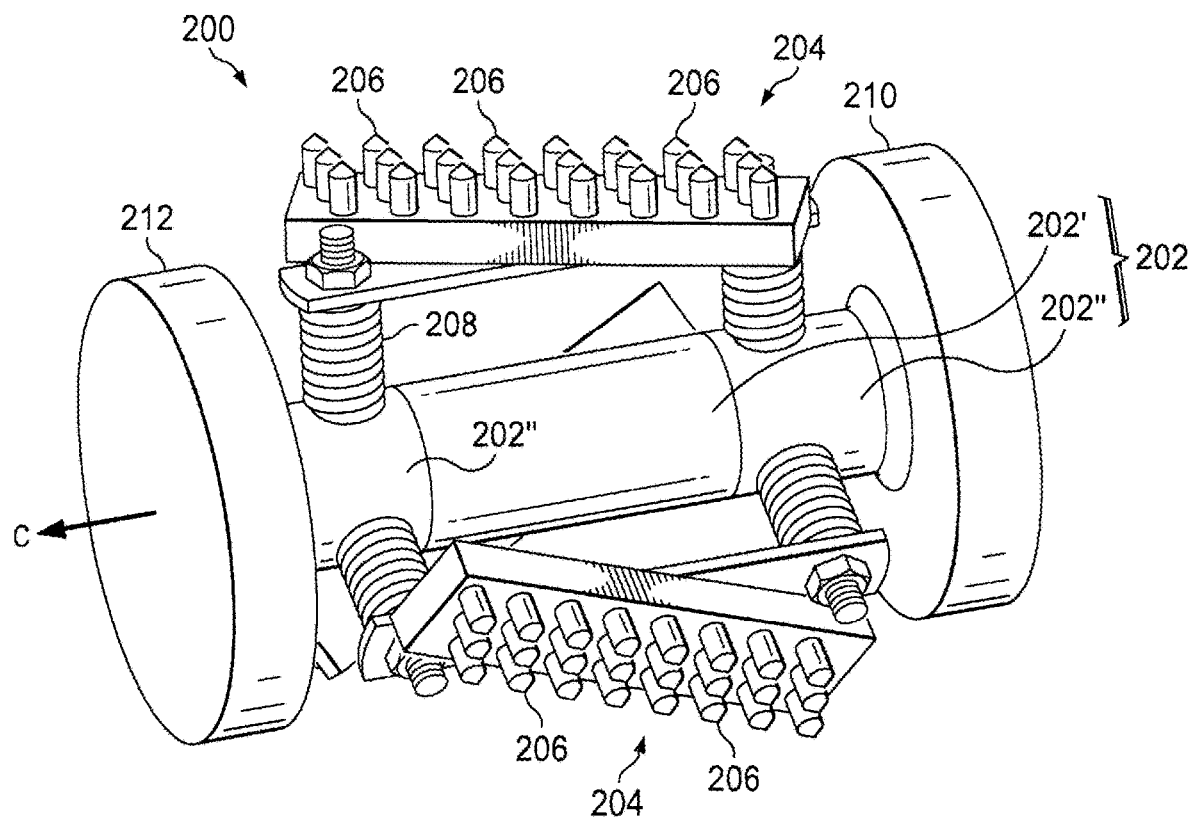
FIG. 2D is a perspective view illustration of another example embodiment of a system having a mechanical assembly with a set of contact members.

Example 2—Example Embodiment of a Mechanical Assembly Having a Plurality of Sets of Contact Members FIG. 2C illustrates another example embodiment of the mechanical assembly 200. The mechanical assembly 200 may have a main body with sections 202a and 202b. The mechanical assembly 200 may also include a contact assembly comprising a first set of contact members 204a arranged around section 202a of the main body (similar to the example embodiment described above in Example 1) and a second set of contact members 204b arranged around the section 202b of the main body (similar to the example embodiment described above in Example 1). For example, as shown in FIG. 2C, the contact assembly may comprise a first set of three contact members 204a arranged radially around the section 202a of the main body and a second set of three contact members 204b arranged radially around the section 202b of the main body. The second set of contact members 204b may be arranged serially in line with the first set of contact members 204a. It is to be understood in the present disclosure that the contact assembly may have first and second sets of more or less than three contact members 204a and three contact members 204b without departing from the teachings of the present disclosure. For example, the contact assembly may include a first set of one, two, four, or more than four contact members 204a and a second set of one, two, four, or more than four contact members 204b. It is also to be understood in the present disclosure that the contact assembly may comprise one or more other sets of contact members in addition to the first set of contact members 204a and second set of contact members 204b without departing from the teachings of the present disclosure.

One or more of the contact members 204a and 204b may have an interior portion 208a and 208b, respectively, attachable to the first section 202a and second section 202b, respectively, of the main body. For example, as shown in FIG. 2C, the interior portion 208a may include an interior facing portion of the contact members 204a (e.g., facing the first section 202a of the main body) and a structure operable to attach one or more of the contact members 204a to the first section 202a of the main body. Similarly, the interior portion 208b may include an interior facing portion of the contact members 204b (e.g., facing the second section 202b of the main body) and a structure operable to attach one or more of the contact members 204b to the second section 202b of the main body. It is to be understood in the present disclosure that the interior portions 208a and 208b may be formed in one or more other shapes and configurations, including a shared structure among two or more contact members 206a and/or contact members 206b, without departing from the teachings of the present disclosure.

One or more of the contact members 204a and 204b may also have a contact region 206a and 206b, respectively. The contact regions 206a and 206b may be configured to face outwardly away from the first section 202a and second section 202b, respectively, of the main body. For example, each contact region 206a and 206b may be configured to face towards the interior wall 1b of the pipeline 1 when the mechanical assembly 200 is provided in the pipeline 1. The contact members 204a and 204b may be configured in such a way that, when the mechanical assembly 200 is provided in the pipeline 1, at least a portion of at least one of the contact regions 206a and 206b may contact with and apply the force to the interior wall 1b of the pipeline 1.

Each contact region 206a and 206b may be formed in one or more of a plurality of shapes, sizes, structures, configurations, and compositions. For example, each contact region 206a and 206b may include substantially or relatively curved and/or flat surfaces and/or structures. As a more specific example, each contact region 206a and 206b may have a portion that is curved to resemble the curvature of the interior wall 1b of the pipeline 1. In addition to or alternatively, each contact region 206 may have a portion that is curved to enable contact with the curved portions of the interior wall 1b of the pipeline. In addition to or alternatively, each contact region 206a and 206b may include a plurality of thistles (such as metal-based thistles and/or other relatively strong and durably structured thistles of other compositions), protruding features and/or elements, or the like. For example, each contact region 206a and 206b may include brush-like structures having thistles, or the like, formed using steel-based (e.g., high speed steel or surface hardening steel) or other materials (e.g., artificial diamond or other carbon-based materials). In addition to or alternatively, each contact region 206a and 206b may resemble a scraping tool, grinding tool, or the like. In addition to or alternatively, each contact region 206a and 206b may include surface(s) having rough and/or sharp surface area(s). For example, each of the rough and/or sharp features of such a surface may be formed in one or more of a plurality of shapes, including triangles, cones, cylinders, knife-edges, needles, and/or wire brushes. It is to be understood in the present disclosure that each contact region 206a and 206b may be formed in one or more of these or other shapes, sizes, structures, configurations, and/or compositions without departing from the teachings of the present disclosure, so long as the contact regions 206a and 206b are operable to perform the treating of the interior wall 1b of the pipeline 1.

In respect to the main body, the first section 202a and second section 202b of the main body may each be a substantially elongated body having one or more parts spanning some, most, or all of the length of the mechanical assembly 200. The first section 202a and second section 202b of the main body 202 may each be a substantially cylindrical shaped body, or may include one or more other shapes and configurations.

The first section 202a of the main body may include a first portion 202a' and one or more second portions 202". As illustrated in FIG. 2C, the first section 202a of the main body may include a second portion 202" between first section 202a and second section 202b, as well as a second portion 202" nearest to second end 212. It is to be understood in the present disclosure that the second portion(s) 202" of the main body may be formed as separate independent elements, separate elements connected via an attachment (not shown) through first portion 202a' (and/or first portion 202b' of the second section 202b) of the main body, or a unitary element having a portion (not shown) passing through first portion 202*a*' (and/or first portion 202*b*' of the second section 202*b*) of the main body without departing from the teachings of the present disclosure. In example embodiments, the first portion 202*a*' and the second portion 202" may be formed as a unitary element.

In example embodiments, the first portion 202*a*' of the first section 202*a* may be the portion of the main body that is attached or attachable to the contact assembly 204*a* (e.g., via interior portion(s) 208*a*), as illustrated in FIG. 2C. The first portion 202*a*' of the first section 202*a* may or may not be configurable to move (e.g., rotate) relative to the second portion 202", another element of the mechanical assembly 200, and/or an imaginary axis formed by an element of the mechanical assembly 200. For example, as illustrated in FIG. 2C, the first portion 202*a*' of the first section 202*a* may be configurable to rotate in direction X (and/or different from direction X), and in doing so, cause the contact members 206*a* to collectively rotate (i.e., cause the contact assembly 204*a* to rotate) in direction X (and/or different from direction X) relative to the second portion 202" and/or around the imaginary axis C. It is to be understood in the present disclosure that the first portion 202*a*' of the first section 202*a* may not be movable and/or rotatable relative to the second portion 202" and/or imaginary axis C.

Similarly, the second section 202*b* of the main body may include a first portion 202*b*' and one or more second portions 202". As illustrated in FIG. 2C, the second section 202*b* of the main body may include a second portion 202" nearest to first end 210, and may (or may not) include a second portion 202" between first section 202*a* and second section 202*b*. It is to be understood in the present disclosure that the second portion(s) 202" of the main body may be formed as separate independent elements, separate elements connected via an attachment (not shown) through first portion 202*b*' (and/or first portion 202*a*' of the first section 202*a*) of the main body, or a unitary element having a portion (not shown) passing through first portion 202*b*' (and/or first portion 202*a*' of the first section 202*a*) of the main body without departing from the teachings of the present disclosure. In example embodiments, the first portion 202*b*' and the second portion 202" may be formed as a unitary element.

In example embodiments, the first portion 202*b*' of the second section 202*b* may be the portion of the main body that is attached or attachable to the contact assembly 204*b* (e.g., via interior portion(s) 208*b*), as illustrated in FIG. 2C. The first portion 202*b*' of the second section 202*b* may or may not be configurable to move (e.g., rotate) relative to the second portion 202", another element of the mechanical assembly 200, and/or an imaginary axis formed by an element of the mechanical assembly 200. For example, as illustrated in FIG. 2C, the first portion 202*b*' of the second section 202*b* may be configurable to rotate in direction Y (and/or different from direction Y), and in doing so, cause the contact members 206*b* to collectively rotate (i.e., cause the contact assembly 204*b* to rotate) in direction Y (and/or different from direction Y) relative to the second portion 202" and/or around the imaginary axis C. It is to be understood in the present disclosure that the first portion 202*b*' of the second section 202*b* may rotate in a direction that is the same as or different from the direction of rotation of the first portion 202*a*' of the first section 202*a*. It is also to be understood in the present disclosure that the first portion 202*b*' of the second section 202*b* may not be movable and/or rotatable relative to the second portion 202" and/or imaginary axis C.

As illustrated in the embodiment of FIG. 2C, the main body may also include a first end 210 and/or second end 212. The first end 210 and/or second end 212 may be provided so as to perform one or more functions, including, but not limited to, enabling the system 100 to travel through the pipeline 1 and providing stability for the system 100 while within and traveling through the pipeline 1. For example, when the system 100 is provided in a pipeline 1, when it is desired for the system 100 to travel in the direction depicted by imaginary axis C while in the pipeline 1, and when the system 100 is operable to travel via an externally-provided high pressure medium (e.g., gas, liquid, and/or other medium) providable to the first end 210 in the direction depicted by imaginary axis C, the first end 210 may be operable to receive the high pressured medium and cause the system 100 to travel through the pipeline 1 accordingly. When traveling through the pipeline 1, the system 100 may then perform, among other things, the treating of the interior wall 1*b* of the pipeline 1 via the mechanical assembly 200. The second end 212 may be similarly used when it is desired for the system 100 to travel through the pipeline 1 in an opposite direction to the direction depicted by imaginary axis C. In addition to or alternatively, the second end 212 may be used to assist in controlling the movement and/or position of the system 100 in the pipeline 1, such as by selectively controlling high pressured medium present on both ends of the system 100. In addition to or alternatively, the system 100 may travel through the pipeline 1 via other mechanisms, as described above and in the present disclosure. It is to be understood in the present disclosure that the mechanical assembly 200 may also include another first end (not shown) and/or another second end (not shown) between the first portion 202*a*' of the first section 202*a* and the first portion 202*b*' of the second section 202*b*, such as in situations wherein two mechanical assemblies (similar to the example embodiment described above in Example 1) are secured/attached together to form a single mechanical assembly or a serial arrangement of two mechanical assemblies.

The mechanical assembly 200 may also include a controller (not shown), and the controller may be housed, either in part or in whole, in the first portion 202*a*' of the first section 202*a*, the first portion 202*b*' of the second section 202*b*, the second portion 202" of the first section 202*a*, the second portion 202" of the second section 202*b*, the first end 210, the second end 220, and/or other elements of the system 100. The controller may be configurable to also communicate with a storage medium (memory) to store information gathered, such as performance parameters, number of rotations (if any) of the contact assembly, a quantity of force applied by the contact regions (such as an average, maximum, minimum, distribution over time, distribution based on location and/or distance travelled, etc.), etc. In the aforementioned example embodiment wherein the mechanical assembly 200 includes another first end (not shown) and/or another second end (not shown) between the first portion 202*a*' of the first section 202*a* and the first portion 202*b*' of the second section 202*b*, the mechanical assembly 200 may also include another controller (not shown) housed, either in part or in whole, in the aforementioned another first end (not shown) and/or another second end (not shown).

In respect to the dimensions of the mechanical assembly 200, a cross-sectional dimension between the contact regions 206*a* and 206*b* of the mechanical assembly 200 and the central axis C (e.g., distance between the outermost portion of the contact region and the central axis C) may be more than, equal to, or less than the radius of the pipeline 1. For example, in situations wherein the contact regions 206*a* and/or 206*b* include brush-like structures having thistles, or the like, the said dimension may be more than or nearly equal to the radius of the pipeline 1. As another example, when one or more of the contact regions 206a and 206b are configurable to extend away from and retract towards the central axis C, the said dimension may extend to be more than or nearly equal to the radius of the pipeline 1 (which may be useful when traversing through a non-straight portion (e.g., bends or turns) of the pipeline 1). A dimension between ends 210 and 212 (i.e., overall length) may be selected based on, among other things, the minimum or smallest bend radius found in the non-straight portions (e.g., bends or turns) of the overall pipeline 1 so as to ensure the mechanical assembly 200 is capable of traversing through such bends. In situations wherein the overall length of the mechanical assembly 200 exceeds the maximum allowable length based on considerations of the aforementioned minimum or smallest bend radius of the pipeline 1, the first section 202a, second section 202b, and/or a portion between the first section 202a and second section 202b (e.g., section 202") may include one or more bendable, pivotable, actuatable, and/or flexible portions configurable to enable the mechanical assembly 200 to traverse through such non-straight portion of the pipeline 1. For example, the first section 202a may include a pivotable, actuatable, bendable, and/or flexible portion, such as in the first portion 202a' and/or one or more of the second portions 202". As another example, the second section 202b may include a pivotable, actuatable, bendable, and/or flexible portion, such as in the first portion 202b' and/or one or more of the second portions 202".

Figure 2E:
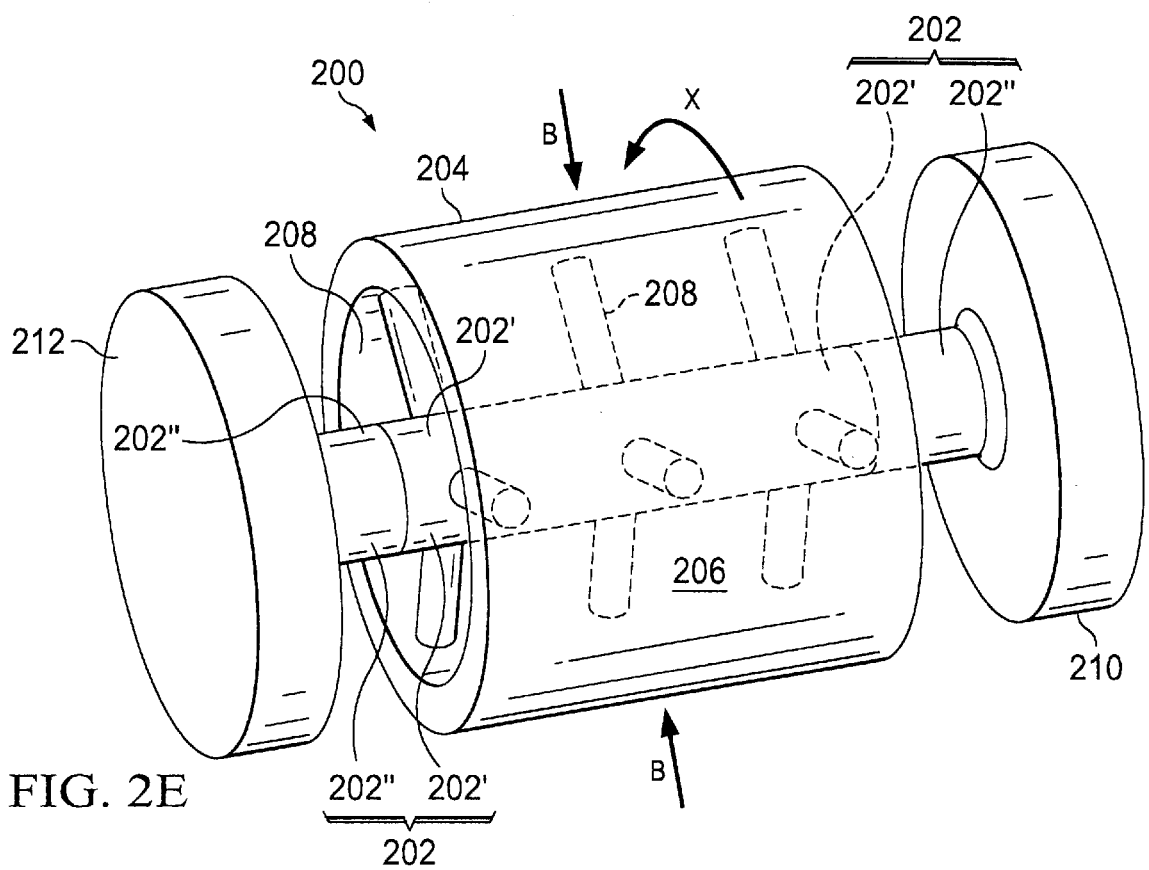
FIG. 2E is a perspective view illustration of another example embodiment of a system having a mechanical assembly with a contact member.

Example 3—Example Embodiment of a Mechanical Assembly Having a Single Contact Member As illustrated in FIG. 2E, another example embodiment of the mechanical assembly 200 may comprise a main body 202 and a contact assembly 204 having a contact member 204 formed around the main body 202. For example, as shown in FIG. 2E, the contact assembly 204 may comprise a cylindrically-shaped contact assembly 204 provided around the main body 202.

The contact member 204 may include an interior portion 208 attachable to the main body 202. For example, as shown in FIG. 2E, the interior portion 208 may include an interior facing portion of the contact member 204 (e.g., facing the main body 202) and a structure operable to attach the contact member 204 to the main body 202. It is to be understood in the present disclosure that the interior portion 208 may be formed in one or more other shapes and configurations without departing from the teachings of the present disclosure.

The contact member 204 may also include a contact region 206. The contact region 206 may be configured to face outwardly away from the main body 202. For example, the contact region 206 may be configured to face towards the interior wall 1b of the pipeline 1 when the mechanical assembly 200 is provided in the pipeline 1. The contact member 204 may be configured in such a way that, when the mechanical assembly 200 is provided in the pipeline 1, at least a portion of the contact region 206 may contact with and apply the force to the interior wall 1b of the pipeline 1.

The contact region 206 may be formed in one or more of a plurality of shapes, sizes, structures, configurations, sections, and compositions. For example, the contact region 206 may include one or more substantially or relatively curved and/or flat surface(s) and/or structure(s). As a more specific example, the contact region 206 may have at least a portion that is curved to resemble the curvature of the interior wall 1b of the pipeline 1. In addition to or alternatively, the contact region 206 may have a portion that is curved to enable contact with the curved portions of the interior wall 1b of the pipeline. In addition to or alternatively, the contact region 206 may include a plurality of thistles (such as metal-based thistles and/or other relatively strong and durably structured thistles of other compositions), protruding features and/or elements, or the like. For example, the contact region 206 may include brush-like structure(s) having thistles, or the like, formed using steel-based (e.g., high speed steel or surface hardening steel) or other materials (e.g., artificial diamond or other carbon-based materials). In addition to or alternatively, the contact region 206 may resemble a scraping tool, grinding tool, or the like. In addition to or alternatively, the contact region 206 may include surface(s) having rough and/or sharp surface area(s). For example, each of the rough and/or sharp features of such a surface may be formed in one or more of a plurality of shapes, including triangles, cones, cylinders, knife-edges, needles, and/or wire brushes. It is to be understood in the present disclosure that the contact region 206 may be formed in one or more of these or other shapes, sizes, structures, configurations, and/or compositions without departing from the teachings of the present disclosure, so long as the contact region 206 is operable to perform the treating of the interior wall 1b of the pipeline 1.

In respect to the main body 202, the main body 202 may be a substantially elongated body having one or more parts spanning some, most, or all of the length of the mechanical assembly 200. The main body 202 may be a substantially cylindrical shaped body, or may include one or more other shapes and configurations. The main body 202 may include a first portion 202' and one or more second portions 202". As illustrated in FIG. 2E, the main body 202 may include a second portion 202" nearest to first end 210 and a second portion 202" nearest to second end 212. It is to be understood in the present disclosure that the second portion 202" of the main body 202 may be formed as separate independent elements, separate elements connected via an attachment (not shown) through first portion 202' of the main body 202, or a unitary element having a portion (not shown) passing through first portion 202' of the main body 202 without departing from the teachings of the present disclosure. In example embodiments, the first portion 202' and second portion 202" may be formed as a unitary element.

Figure 2F:
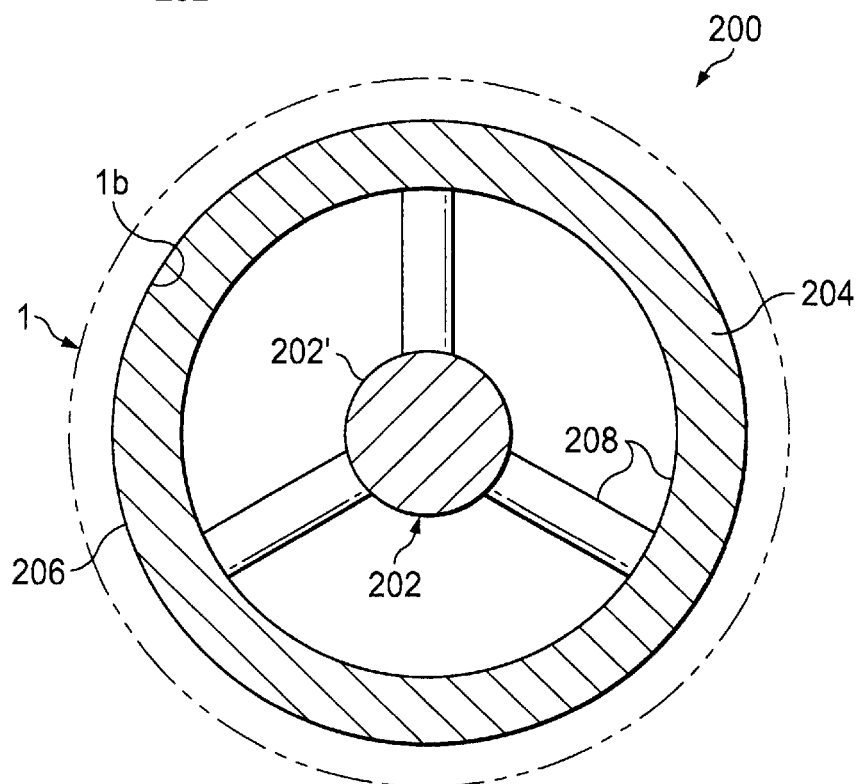
FIG. 2F is a cross-sectional view illustration of an example embodiment of a system having a mechanical assembly with a contact member.

In example embodiments, the first portion 202' of the main body 202 may be the portion of the main body 202 that is attached or attachable to the contact assembly 204 (e.g., via interior portion 208). The first portion 202' of the main body 202 may or may not be configurable to move (e.g., rotate) relative to the second portion 202" of the main body 202, another element of the mechanical assembly 200, and/or an imaginary axis formed by an element of the mechanical assembly 200. For example, as illustrated in FIG. 2E and FIG. 2F, which is a cross-sectional illustration of FIG. 2E along line B, the first portion 202' of the main body 202 may be configurable to rotate in direction X (and/or different from direction X), and in doing so, cause the contact members 206 to rotate (i.e., cause the contact assembly 204 to rotate) in direction X (and/or different from direction X) relative to the second portion 202" and/or around the imaginary axis C. It is to be understood in the present disclosure that the first portion 202' of the main body 202 may not be movable and/or rotatable relative to the second portion 202" of the main body 202 and/or imaginary axis C.

The main body 202 may also include a first end 210 and/or second end 212 in example embodiments. The first end 210 and/or second end 212 may be provided so as to perform one or more functions, including, but not limited to, enabling the system 100 to travel through the pipeline 1 and providing stability for the system 100 while within and traveling through the pipeline 1. For example, when the system 100 is provided in a pipeline 1, when it is desired for the system 100 to travel in the direction depicted by imaginary axis C while in the pipeline 1, and when the system 100 is operable to travel via an externally-provided high pressure medium (e.g., gas, liquid, and/or other medium) providable to the first end 210 in the direction depicted by imaginary axis C, the first end 210 may be operable to receive the high pressured medium and cause the system 100 to travel through the pipeline 1 accordingly. When traveling through the pipeline 1, the system 100 may then perform, among other things, the treating of the interior wall 1b of the pipeline 1 via the mechanical assembly 200. The second end 212 may be similarly used when it is desired for the system 100 to travel through the pipeline 1 in an opposite direction to the direction depicted by imaginary axis C. In addition to or alternatively, the second end 212 may be used to assist in controlling the movement and/or position of the system 100 in the pipeline 1, such as by selectively controlling high pressured mixtures present on both ends of the system 100.

The mechanical assembly 200 may also include a controller (not shown), and the controller may be housed, either in part or in whole, in the first portion 202' of the main body 202, the second portion 202" of the main body 202, the first end 210, the second end 220, and/or other parts of the system 100. The controller may be configurable to also communicate with a storage medium (memory) to store information gathered, such as performance parameters, number of rotations (if any) of the contact assembly, a quantity of force applied by the contact regions (such as an average, maximum, minimum, distribution over time, distribution based on location and/or distance travelled, etc.), etc.

In respect to the dimensions of the mechanical assembly 200, a cross-sectional dimension between the contact region 206 of the mechanical assembly 200 and the central axis C (e.g., distance between the outermost portion of the contact region and the central axis C) may be more than, equal to, or less than the radius of the pipeline 1. For example, in situations wherein the contact region 206 include brush-like structures having thistles, or the like, the said dimension may be more than or nearly equal to the radius of the pipeline 1. As another example, when one or more portions of the contact region 206 are configurable to extend away from and retract towards the central axis C, the said dimension may extend to be more than or nearly equal to the radius of the pipeline 1 (which may be useful when traversing through a non-straight portion (e.g., bends or turns) of the pipeline 1). A dimension between ends 210 and 212 (i.e., overall length) may be selected based on, among other things, the minimum or smallest bend radius found in the non-straight portions (e.g., bends or turns) of the overall pipeline 1 so as to ensure the mechanical assembly 200 is capable of traversing through such bends. In situations wherein the overall length of the mechanical assembly 200 exceeds the maximum allowable length based on considerations of the aforementioned minimum or smallest bend radius of the pipeline 1, the main body 202 may include one or more bendable, pivotable, actuatable, and/or flexible portions configurable to enable the mechanical assembly 200 to traverse through such non-straight portion of the pipeline 1. In such a situation, the contact assembly 204 may also include one or more bendable, pivotable, actuatable, and/or flexible portions, or the contact assembly 204 may be divided into two or more sections along its length. For example, the main body 202 of the mechanical assembly 200 may include a pivotable, actuatable, bendable, and/or flexible portion, such as in the first portion 202' and/or one or more of the second portions 202".

Figure 2G:
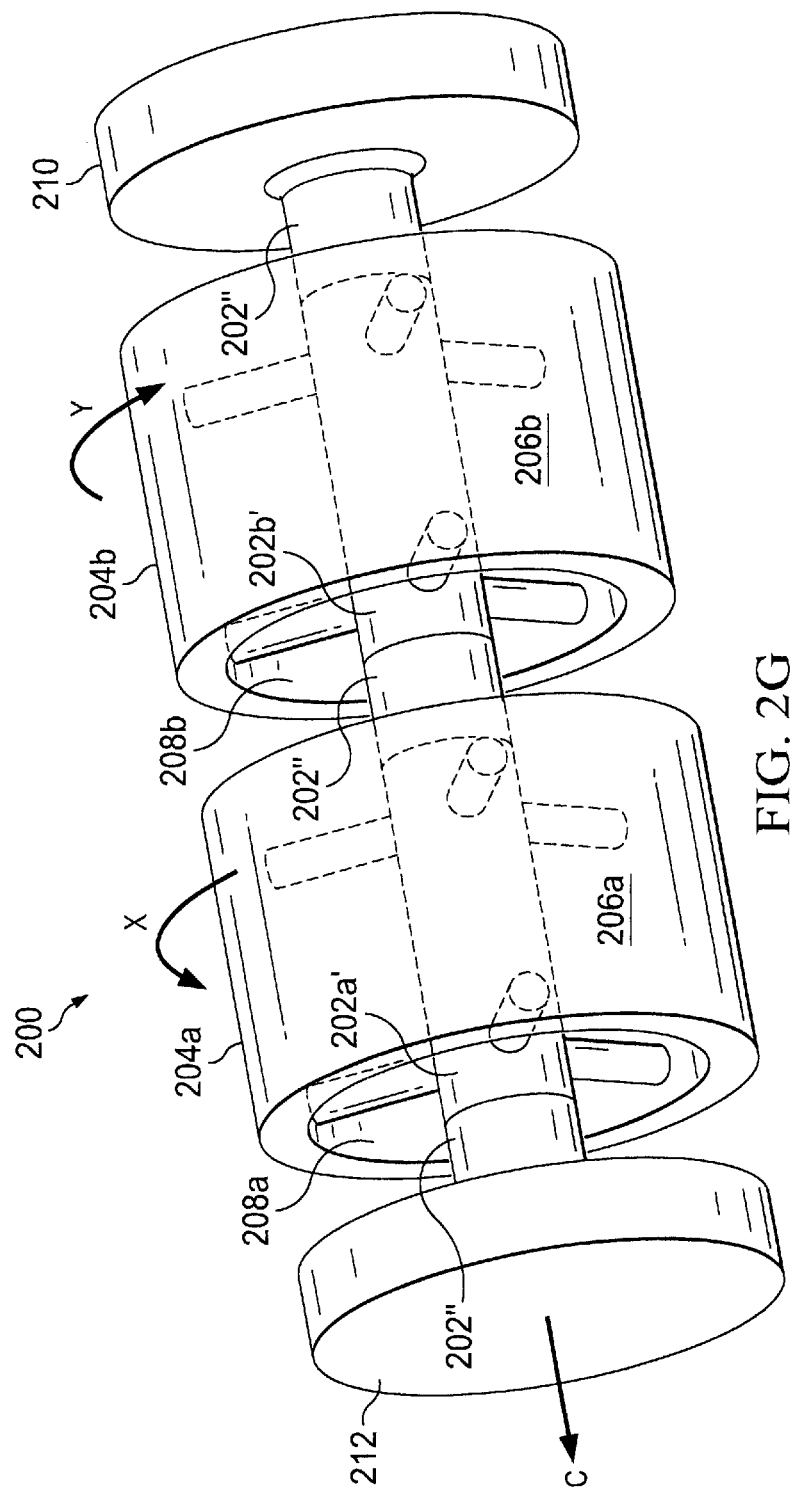
FIG. 2G is a cross-sectional view illustration of another example embodiment of a system having a mechanical assembly with two contact members in a serially in line configuration.

Example 4—Example Embodiment of a Mechanical Assembly Having a Plurality of Single Contact Members FIG. 2G illustrates another example embodiment of the mechanical assembly 200. The mechanical assembly 200 may have a main body with sections 202a and 202b. The mechanical assembly 200 may also include a contact assembly comprising a first contact member 204a formed around section 202a of the main body (similar to the example embodiment described above in Example 3) and a second contact member 204b formed around the section 202b of the main body (similar to the example embodiment described above in Example 3). For example, as shown in FIG. 2G, the contact assembly may comprise a first cylindrically-shaped contact member 204a provided around the section 202a of the main body and a second cylindrically-shaped contact member 204b provided around the section 202b of the main body. The second contact member 204b may be arranged serially in line with the first contact member 204a. It is to be understood in the present disclosure that the contact assembly may comprise one or more other cylindrically-shaped contact members (or other contact members described in the present disclosure) in addition to the first contact member 204a and second contact member 204b without departing from the teachings of the present disclosure.

One or more of the contact members 204a and 204b may have an interior portion 208a and 208b, respectively, attachable to the first section 202a and second section 202b, respectively, of the main body. For example, as shown in FIG. 2G, the interior portion 208a may include an interior facing portion of the contact member 204a (e.g., facing the first section 202a of the main body) and a structure operable to attach the contact member 204a to the first section 202a of the main body. Similarly, the interior portion 208b may include an interior facing portion of the contact member 204b (e.g., facing the second section 202b of the main body) and a structure operable to attach the contact member 204b to the second section 202b of the main body. It is to be understood in the present disclosure that the interior portions 208a and 208b may be formed in one or more other shapes and configurations without departing from the teachings of the present disclosure.

One or more of the contact members 204a and 204b may also have a contact region 206a and 206b, respectively. The contact regions 206a and 206b may be configured to face outwardly away from the first section 202a and second section 202b, respectively, of the main body. For example, each contact region 206a and 206b may be configured to face towards the interior wall 1b of the pipeline 1 when the mechanical assembly 200 is provided in the pipeline 1. The contact members 204a and 204b may be configured in such a way that, when the mechanical assembly 200 is provided in the pipeline 1, at least a portion of at least one of the contact regions 206a and 206b may contact with and apply the force to the interior wall 1b of the pipeline 1.

Each contact region 206a and 206b may be formed in one or more of a plurality of shapes, sizes, structures, configurations, sections, and compositions. For example, each contact region 206a and 206b may include one or more substantially or relatively curved and/or flat surfaces and/or structures. As a more specific example, each contact region 206a and 206b may have a portion that is curved to resemble the curvature of the interior wall 1b of the pipeline 1. In addition to or alternatively, each contact region 206a and 206b may have a portion that is curved to enable contact with the curved portions of the interior wall 1b of the pipeline. In addition to or alternatively, each contact region 206a and 206b may include a plurality of thistles (such as metal-based thistles and/or other relatively strong and durably structured thistles of other compositions), protruding features and/or elements, or the like. For example, each contact region 206a and 206b may include brush-like structure(s) having thistles, or the like, formed using steel-based (e.g., high speed steel or surface hardening steel) or other materials (e.g., artificial diamond or other carbon-based materials). In addition to or alternatively, each contact region 206a and 206b may resemble a scraping tool, grinding tool, or the like. In addition to or alternatively, each contact region 206a and 206b may include surface(s) having rough and/or sharp surface area(s). For example, each of the rough and/or sharp features of such a surface may be formed in one or more of a plurality of shapes, including triangles, cones, cylinders, knife-edges, needles, and/or wire brushes. It is to be understood in the present disclosure that each contact region 206a and 206b may be formed in one or more of these or other shapes, sizes, structures, configurations, and/or compositions without departing from the teachings of the present disclosure, so long as the contact regions 206a and 206b are operable to perform the treating of the interior wall 1b of the pipeline 1.

In respect to the main body, the first section 202a and second section 202b of the main body may each be a substantially elongated body having one or more parts spanning some, most, or all of the length of the mechanical assembly 200. The first section 202a and second section 202b of the main body may each be a substantially cylindrical shaped body, or may include one or more other shapes and configurations.

The first section 202a of the main body may include a first portion 202a' and one or more second portions 202". As illustrated in FIG. 2G, the first section 202a of the main body may include a second portion 202" between first section 202a and second section 202b, as well as a second portion 202" nearest to second end 212. It is to be understood in the present disclosure that the second portion(s) 202" of the main body may be formed as separate independent elements, separate elements connected via an attachment (not shown) through first portion 202a' (and/or first portion 202b' of the second section 202b) of the main body, or a unitary element having a portion (not shown) passing through first portion 202a' (and/or first portion 202b' of the second section 202b) of the main body without departing from the teachings of the present disclosure. In example embodiments, the first portion 202a' and the second portion 202" may be formed as a unitary element.

In example embodiments, the first portion 202a' of the first section 202a may be the portion of the main body that is attached or attachable to the contact assembly 204a (e.g., via interior portion 208a), as illustrated in FIG. 2G. The first portion 202a' of the first section 202a may or may not be configurable to move (e.g., rotate) relative to the second portion 202", another element of the mechanical assembly 200, and/or an imaginary axis formed by an element of the mechanical assembly 200. For example, as illustrated in FIG. 2G, the first portion 202a' of the first section 202a may be configurable to rotate in direction X (and/or different from direction X), and in doing so, cause the contact member 206a to rotate (i.e., cause the contact assembly 204a to rotate) in direction X (and/or different from direction X) relative to the second portion 202" and/or around the imaginary axis C. It is to be understood in the present disclosure that the first portion 202a' of the first section 202a may not be movable and/or rotatable relative to the second portion 202" and/or imaginary axis C.

Similarly, the second section 202b of the main body may include a first portion 202b' and one or more second portions 202". As illustrated in FIG. 2G, the second section 202b of the main body may include a second portion 202" nearest to first end 210, and may (or may not) include a second portion 202" between first section 202a and second section 202b. It is to be understood in the present disclosure that the second portion(s) 202" of the main body may be formed as separate independent elements, separate elements connected via an attachment (not shown) through first portion 202b' (and/or first portion 202a' of the first section 202a) of the main body, or a unitary element having a portion (not shown) passing through first portion 202b' (and/or first portion 202a' of the first section 202a) of the main body without departing from the teachings of the present disclosure. In example embodiments, the first portion 202b' and the second portion 202" may be formed as a unitary element.

In example embodiments, the first portion 202b' of the second section 202b may be the portion of the main body that is attached or attachable to the contact assembly 204b (e.g., via interior portion 208b), as illustrated in FIG. 2G. The first portion 202b' of the second section 202b may or may not be configurable to move (e.g., rotate) relative to the second portion 202", another element of the mechanical assembly 200, and/or an imaginary axis formed by an element of the mechanical assembly 200. For example, as illustrated in FIG. 2G, the first portion 202b' of the second section 202b may be configurable to rotate in direction Y (and/or different from direction Y), and in doing so, cause the contact member 206b to rotate (i.e., cause the contact assembly 204b to rotate) in direction Y (and/or different from direction Y) relative to the second portion 202" and/or around the imaginary axis C. It is to be understood in the present disclosure that the first portion 202b' of the second section 202b may rotate in a direction that is the same as or different from the direction of rotation of the first portion 202a' of the first section 202a. It is also to be understood in the present disclosure that the first portion 202b' of the second section 202b may not be movable and/or rotatable relative to the second portion 202" and/or imaginary axis C.

As illustrated in the embodiment of FIG. 2G, the main body may also include a first end 210 and/or second end 212. The first end 210 and/or second end 212 may be provided so as to perform one or more functions, including, but not limited to, enabling the system 100 to travel through the pipeline 1 and providing stability for the system 100 while within and traveling through the pipeline 1. For example, when the system 100 is provided in a pipeline 1, when it is desired for the system 100 to travel in the direction depicted by imaginary axis C while in the pipeline 1, and when the system 100 is operable to travel via an externally-provided high pressure medium (e.g., gas, liquid, and/or other medium) providable to the first end 210 in the direction depicted by imaginary axis C, the first end 210 may be operable to receive the high pressured medium and cause the system 100 to travel through the pipeline 1 accordingly. When traveling through the pipeline 1, the system 100 may then perform, among other things, the treating of the interior wall 1b of the pipeline 1 via the mechanical assembly 200. The second end 212 may be similarly used when it is desired for the system 100 to travel through the pipeline 1 in an opposite direction to the direction depicted by imaginary axis C. In addition to or alternatively, the second end 212 may be used to assist in controlling the movement and/or position of the system 100 in the pipeline 1, such as by selectively controlling high pressured medium present on both ends of the system 100. In addition to or alternatively, the system 100 may travel through the pipeline 1 via other mechanisms, as described above and in the present disclosure. It is to be understood in the present disclosure that the mechanical assembly 200 may also include another first end (not shown) and/or another second end (not shown) between the first portion 202a' of the first section 202a and the first portion 202b' of the second section 202b, such as in situations wherein two mechanical assemblies (similar to the example embodiment described above in Example 1) are secured/attached together to form a single mechanical assembly or a serial arrangement of two mechanical assemblies.

The mechanical assembly 200 may also include a controller (not shown), and the controller may be housed, either in part or in whole, in the first portion 202a' of the first section 202a, the first portion 202b' of the second section 202b, the second portion 202" of the first section 202a, the second portion 202" of the second section 202b, the first end 210, the second 212, and/or other elements of the system 100. The controller may be configurable to also communicate with a storage medium (memory) to store information gathered, such as performance parameters, number of rotations (if any) of the contact assembly, a quantity of force applied by the contact regions (such as an average, maximum, minimum, distribution over time, distribution based on location and/or distance travelled, etc.). In the aforementioned example embodiment wherein the mechanical assembly 200 includes another first end (not shown) and/or another second end (not shown) between the first portion 202a' of the first section 202a and the first portion 202b' of the second section 202b, the mechanical assembly 200 may also include another controller (not shown) housed, either in part or in whole, in the aforementioned another first end (not shown) and/or another second end (not shown).

In respect to the dimensions of the mechanical assembly 200, a cross-sectional dimension between the contact regions 206a and 206b of the mechanical assembly 200 and the central axis C (e.g., distance between the outermost portion of the contact region and the central axis C) may be more than, equal to, or less than the radius of the pipeline 1. For example, in situations wherein the contact regions 206a and/or 206b include brush-like structures having thistles, or the like, the said dimension may be more than or nearly equal to the radius of the pipeline 1. A dimension between ends 210 and 212 (i.e., overall length) may be selected based on, among other things, the minimum or smallest bend radius found in the non-straight portions (e.g., bends or turns) of the overall pipeline 1 so as to ensure the mechanical assembly 200 is capable of traversing through such bends. In situations wherein the overall length of the mechanical assembly 200 exceeds the maximum allowable length based on considerations of the aforementioned minimum or smallest bend radius of the pipeline 1, the first section of the main body, second section of the main body, and/or a portion between the first and second sections of the main body (e.g., section 202") may include one or more bendable, pivotable, actuatable, and/or flexible portions configurable to enable the mechanical assembly 200 to traverse through such non-straight portion of the pipeline 1. For example, the first section 202a may include a pivotable, actuatable, bendable, and/or flexible portion, such as in the first portion 202a' and/or one or more of the second portions 202". As another example, the second section 202b may include a pivotable, actuatable, bendable, and/or flexible portion, such as in the first portion 202b' and/or one or more of the second portions 202".

Figure 2H:
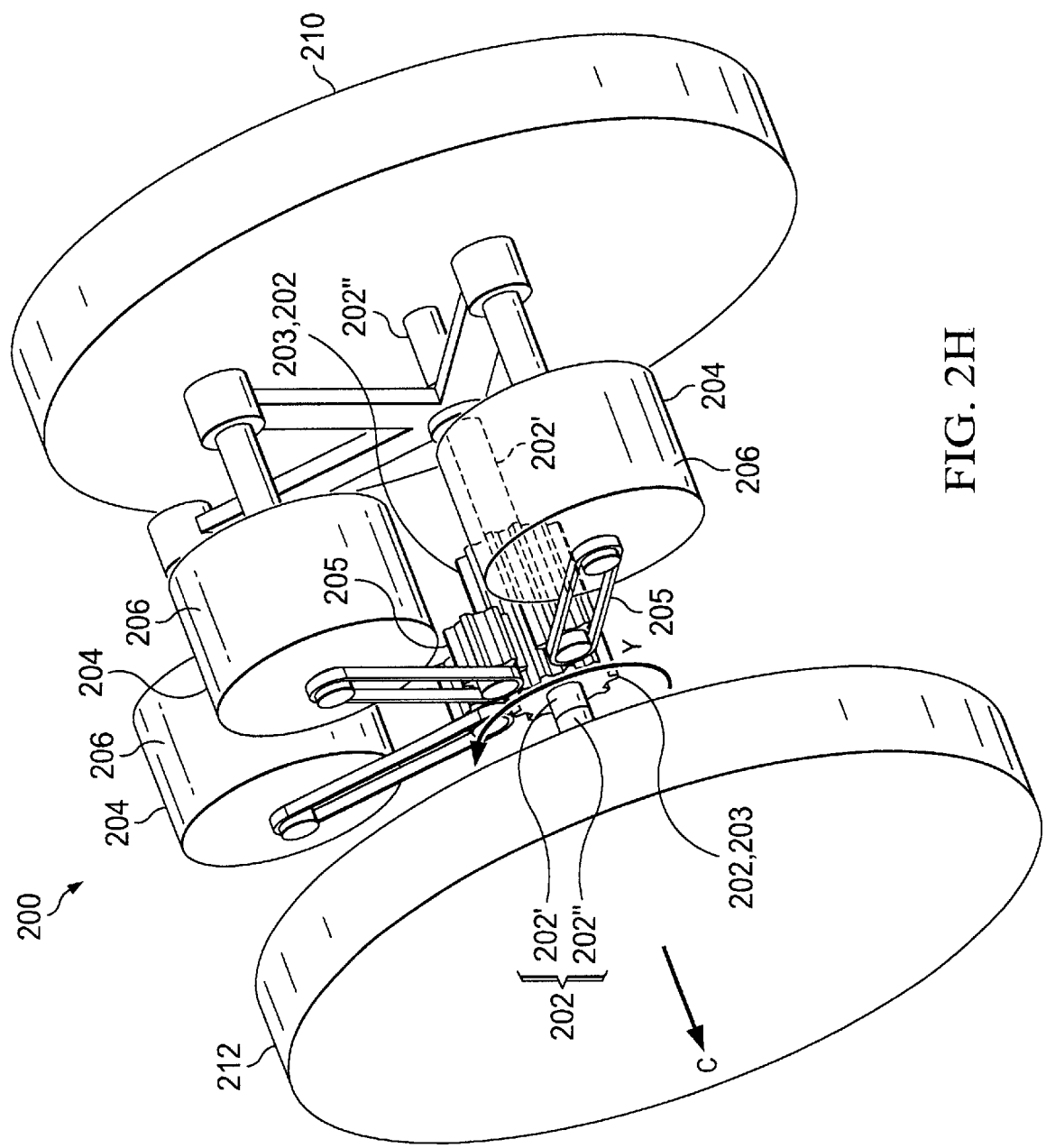
FIG. 2H is a perspective view illustration of an example embodiment of a system having a mechanical assembly with a first planetary arrangement.
Figure 2I:
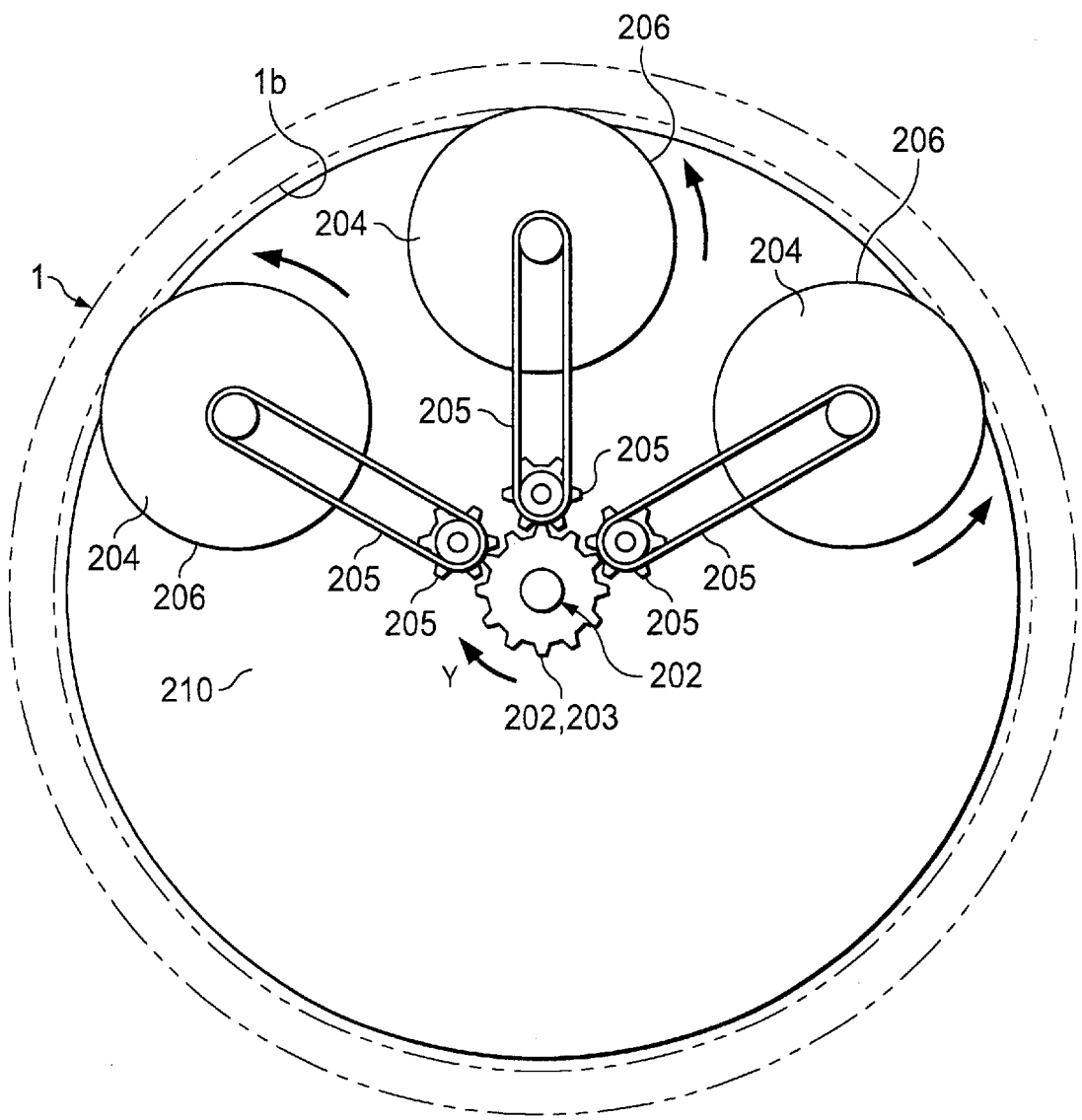
FIG. 2I is a cross-sectional view illustration of an example embodiment of a system having a mechanical assembly with a first planetary arrangement.

Example 5—Example Embodiment of a Mechanical Assembly Having a Set of Contact Members Arranged in a First Planetary Arrangement FIG. 2H and FIG. 2I depict another example embodiment of the mechanical assembly 200 having a main body 202 and a contact assembly. The contact assembly may be arranged in a first planetary arrangement around the main body 202. As used in the present disclosure, references to a "first planetary arrangement" may include an arrangement of gears, belts, and/or the like, whereby one or more planet gears (e.g., planet gear 204) are configurable to be rotatable relative to its own central axis (i.e., axis of the planet gear).

The first planetary arrangement of the contact assembly may include a sun gear 203 (which may also be considered as a part of the main body 202 in some example embodiments) and a plurality of planet gears 204. The sun gear 202, 203 may be configurable to rotate around its central axis (i.e., axis of the sun gear 202, 203) when driven by a power source (not shown). For example, as shown in FIGS. 2H and 2I, the sun gear 202, 203 may rotate in direction X (and/or different from direction X) when driven by a power source. The plurality of planet gears 204 may be arranged radially around the sun gear 202, 203 and may be in communication with the sun gear 202, 203. For example, when the sun gear 202, 203 is driven by a power source, the sun gear 202, 203 may, in turn, drive each planet gear 204 to rotate around its own central axis (i.e., axis of each planet gear 204), as depicted by direction Y (and/or different from direction Y). As shown in FIGS. 2H and 2I, the contact assembly may comprise a set of three planet gears 204 arranged radially around the sun gear 202, 203. It is to be understood in the present disclosure that the contact assembly may have a set of more or less than three planet gears 204 without departing from the teachings of the present disclosure. For example, the contact assembly may include a set of one, two, four, or more than four planet gears 204.

In example embodiments, the sun gear 202, 203 may be configurable to drive each of the planet gears 204 via an intermediate gear assembly 205, which may enable the size of each gear and/or the gear ratio of the overall first planetary arrangement to be selectable based on, among other things, the size of the pipeline 1 and/or required torque to be applied by the planet gears 204. It is to be understood in the present disclosure that each intermediate gear assembly 205 may be formed with one or more intermediate gears, belts, or the like, so as to collectively enable the sun gear 202, 203 to drive one of the planet gears 204.

The contact assembly may further comprise a plurality of contact regions 206. Each contact region 206 may be formed on at least a portion of an exterior circumferential or perimeter portion of each planet gear 204 in example embodiments. Each contact region 206 may be configurable to face outwardly away from the central axis of its corresponding planet gear 204. For example, at least a portion of each contact region 206 may be configured to face towards the interior wall 1b of the pipeline 1 when the mechanical assembly 200 is provided in the pipeline 1. The contact assembly may be configured in such a way that, when the mechanical assembly 200 is provided in the pipeline 1 and when the sun gear 202, 203 drives the planet gears 204, at least a portion of at least one of the contact regions 206 may contact with and apply the force to the interior wall 1b of the pipeline 1. As shown in FIGS. 2H and 2I, the contact assembly may comprise a set of three contact regions 206. It is to be understood in the present disclosure that the contact assembly may have a set of more or less than three contact regions 206 without departing from the teachings of the present disclosure. For example, the contact assembly may include a set of one, two, four, or more than four contact regions 206.

Each contact region 206 may be formed in one or more of a plurality of shapes, sizes, structures, configurations, and compositions. For example, each contact region 206 may include substantially or relatively curved and/or flat surfaces and/or structures. As a more specific example, each contact region 206 may have a portion that is curved to enable contact with the curved portions of the planet gear 204. In addition to or alternatively, each contact region 206 may include a plurality of thistles (such as metal-based thistles and/or other relatively strong and durably structured thistles of other compositions), protruding features and/or elements, or the like. For example, each contact region 206 may include brush-like structures having thistles, or the like, formed using steel-based (e.g., high speed steel or surface hardening steel) or other materials (e.g., artificial diamond or other carbon-based materials. In addition to or alternatively, each contact region 206 may resemble a scraping tool, grinding tool, or the like. In addition to or alternatively, each contact region 206 may include surface(s) having rough and/or sharp surface area(s). For example, each of the rough and/or sharp features of such a surface may be formed in one or more of a plurality of shapes, including triangles, cones, cylinders, knife-edges, needles, and/or wire brushes. It is to be understood in the present disclosure that each contact region 206 may be formed in one or more of these or other shapes, sizes, structures, configurations, and/or compositions without departing from the teachings of the present disclosure, so long as the contact regions 206 are operable to perform the treating of the interior wall 1b of the pipeline 1.

In respect to the main body 202, the main body 202 may be a substantially elongated body having one or more parts spanning some, most, or all of the length of the mechanical assembly 200. The main body 202 may be a substantially cylindrical shaped body, or may include one or more other shapes and configurations. The main body 202 may include a first portion 202' and one or more second portions 202". As illustrated in FIG. 2H, the main body 202 may include a second portion 202" nearest to first end 210 and a second portion 202" nearest to second end 212. It is to be understood in the present disclosure that the second portion(s) 202" of the main body 202 may be formed as separate independent elements, separate elements connected via an attachment (not shown) through first portion 202' of the main body 202, or a unitary element having a portion (not shown) passing through first portion 202' of the main body 202 without departing from the teachings of the present disclosure. In example embodiments, the first portion 202' and second portion 202" may be formed as a unitary element.

In example embodiments, the first portion 202' of the main body 202 may be the portion of the main body 202 that is attached or attachable to the contact assembly 204 (i.e., the sun gear 202, 203, intermediate gear assembly 205, planet gears 204, and contact regions 206), as illustrated in FIG. 2H. The first portion 202' of the main body 202 may or may not be configurable to move (e.g., rotate) relative to the second portion 202" of the main body 202, another element of the mechanical assembly 200, and/or an imaginary axis formed by an element of the mechanical assembly 200. For example, as illustrated in FIGS. 2H and 2I, the first portion 202' of the main body 202 may be configurable to rotate in direction Y (and/or different from direction Y) and in doing so, cause the planet gears 204 (and contact regions 206) to collectively rotate in direction Y (and/or different from direction Y) relative to the second portion 202" and/or around the imaginary axis C. It is to be understood in the present disclosure that the first portion 202' of the main body 202 may not be movable and/or rotatable relative to the second portion 202" of the main body 202 and/or imaginary axis C.

The main body 202 may also include a first end 210 and/or second end 212 in example embodiments. The first end 210 and/or second end 212 may be provided so as to perform one or more functions, including, but not limited to, enabling the system 100 to travel through the pipeline 1 and providing stability for the system 100 while within and traveling through the pipeline 1. For example, when the system 100 is provided in a pipeline 1, when it is desired for the system 100 to travel in the direction depicted by imaginary axis C while in the pipeline 1, and when the system 100 is operable to travel via an externally-provided high pressure medium (e.g., gas, liquid, and/or other medium) providable to the first end 210 in the direction depicted by imaginary axis C, the first end 210 may be operable to receive the high pressured medium and cause the system 100 to travel through the pipeline 1 accordingly. When traveling through the pipeline 1, the system 100 may then perform, among other things, the treating of the interior wall 1b of the pipeline 1 via the mechanical assembly 200. The second end 212 may be similarly used when it is desired for the system 100 to travel through the pipeline 1 in an opposite direction to the direction depicted by imaginary axis C. In addition to or alternatively, the second end 212 may be used to assist in controlling the movement and/or position of the system 100 in the pipeline 1, such as by selectively controlling high pressured medium present on both ends of the system 100.

The mechanical assembly 200 may also include a controller (not shown), and the controller may be housed, either in part or in whole, in the first portion 202' of the main body 202, the second portion 202" of the main body 202, the first end 210, the second end 220, and/or other parts of the system 100. The controller may be configurable to also communicate with a storage medium (memory) to store information gathered, such as performance parameters, number of rotations (if any) of the contact assembly, a quantity of force applied by the contact regions (such as an average, maximum, minimum, distribution over time, distribution based on location and/or distance travelled, etc.), etc.

In respect to the dimensions of the mechanical assembly 200, a cross-sectional dimension between the contact regions 206 of the mechanical assembly 200 and the central axis C (e.g., distance between the outermost portion of the contact region and the central axis C) may be more than, equal to, or less than the radius of the pipeline 1. For example, in situations wherein the contact regions 206 include brush-like structures having thistles, or the like, the said dimension may be more than or nearly equal to the radius of the pipeline 1. As another example, when one or more of the contact regions 206 are configurable to extend away from and retract towards the central axis of its planet gear 204 and/or the central axis C, the said dimension may extend to be more than or nearly equal to the radius of the pipeline 1 (which may be useful when traversing through a non-straight portion (e.g., bends or turns) of the pipeline 1). A dimension between ends 210 and 212 (i.e., overall length) may be selected based on, among other things, the minimum or smallest bend radius found in the non-straight portions (e.g., bends or turns) of the overall pipeline 1 so as to ensure the mechanical assembly 200 is capable of traversing through such bends. In situations wherein the overall length of the mechanical assembly 200 exceeds the maximum allowable length based on considerations of the aforementioned minimum or smallest bend radius of the pipeline 1, the main body 202 may include one or more bendable, pivotable, actuatable, and/or flexible portions configurable to enable the mechanical assembly 200 to traverse through such non-straight portion of the pipeline 1. For example, the main body 202 of the mechanical assembly 200 may include a pivotable, actuatable, bendable, and/or flexible portion, such as in the first portion 202' and/or one or more of the second portions 202".

Figure 2J:
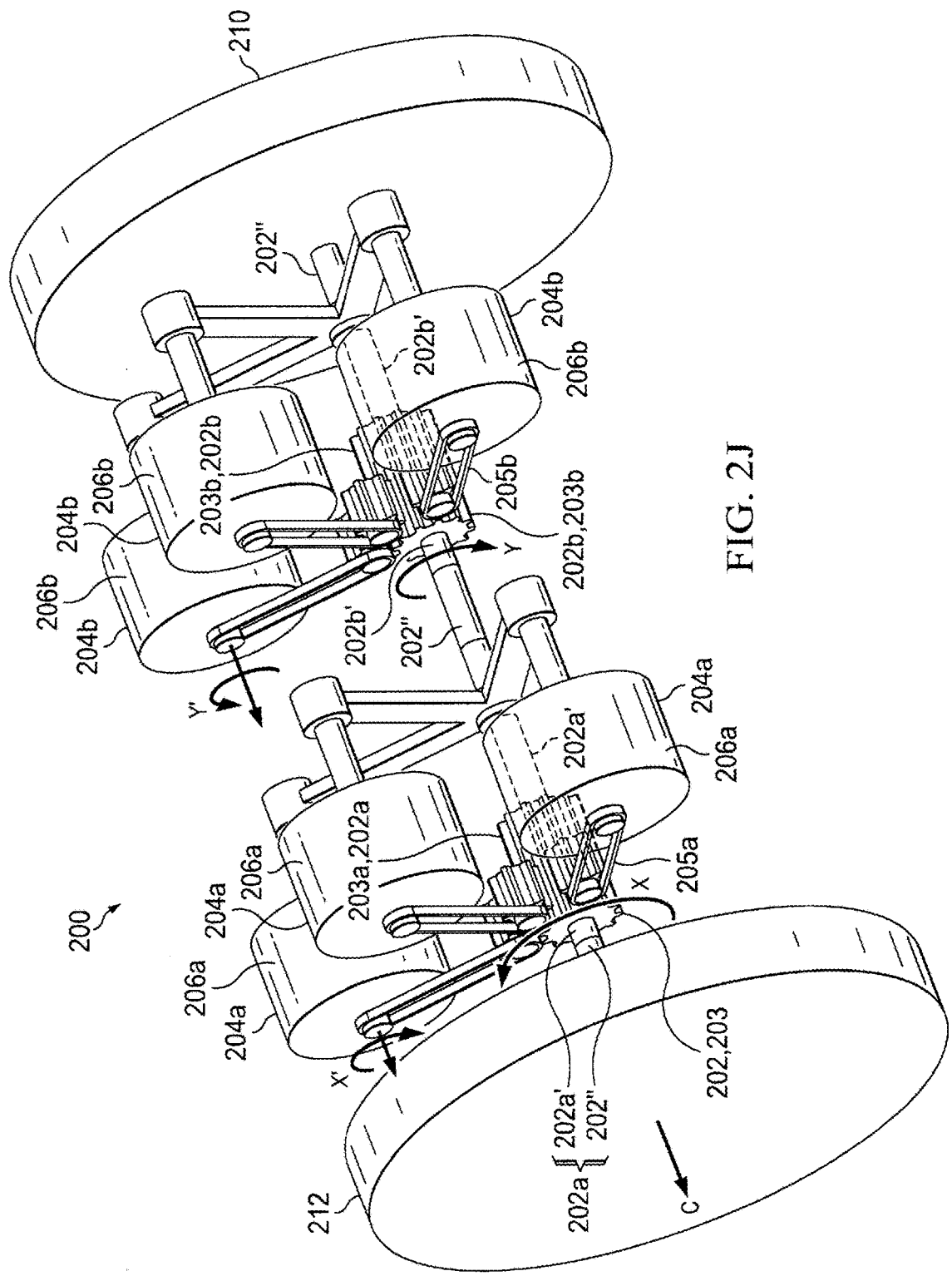
FIG. 2J is a perspective view illustration of another example embodiment of a system having a mechanical assembly with two first planetary arrangements in a serially in line configuration.

Example 6—Example Embodiment of a Mechanical Assembly Having a Plurality of Sets of Contact Members Arranged in the First Planetary Arrangement FIG. 2J depicts another example embodiment of the mechanical assembly 200 having a main body with sections 202a and 202b. The mechanical assembly 200 may also include a contact assembly. The contact assembly may be arranged in a serial arrangement of a first planetary arrangement around section 202a of the main body (similar to the example embodiment described above in Example 5) and another first planetary arrangement around section 202b of the main body (similar to the example embodiment described above in Example 5). It is to be understood in the present disclosure that the contact assembly may comprise one or more other first planetary arrangements (and/or other planetary arrangements, such as the second planetary arrangement described below in Example 7 and the present disclosure) in addition to (or in replacement of) the first planetary arrangement around section 202a and/or the first planetary arrangement around section 202b without departing from the teachings of the present disclosure.

The first planetary arrangement around section 202a may include a first sun gear 203a (which may also be considered as a part of the first section 202a of the main body in some example embodiments) and a plurality of first planet gears 204a. The first sun gear 202a, 203a may be configurable to rotate around its central axis (i.e., axis of the sun gear 202a, 203a) when driven by a first power source (not shown). For example, as shown in FIG. 2J, the first sun gear 202a, 203a may rotate in direction X (and/or different from direction X) when driven by a first power source. The plurality of first planet gears 204a may be arranged radially around the first sun gear 202a, 203a and may be in communication with the first sun gear 202a, 203a. For example, when the first sun gear 202a, 203a is driven by a first power source, the first sun gear 202a, 203a may, in turn, drive each first planet gear 204a to rotate around its own central axis (i.e., axis of each planet gear 204a), as depicted by direction X' (and/or different from direction X'). As shown in FIG. 2J, the first planetary arrangement around section 202a may comprise a set of three first planet gears 204a arranged radially around the section 202a of the main body. It is to be understood in the present disclosure that the first planetary arrangement around section 202a may have a set of more or less than three first planet gears 204a without departing from the teachings of the present disclosure. For example, the first planetary arrangement around section 202a may include a first set of one, two, four, or more than four first planet gears 204a.

The first planetary arrangement around section 202b may include a second sun gear 203b (which may also be considered as a part of the second section 202b of the main body in some example embodiments) and a plurality of second planet gears 204b. The second sun gear 202b, 203b may be configurable to rotate around its central axis (i.e., axis of the sun gear 202b, 203b) when driven by a second power source (and/or the first power source) (not shown). For example, as shown in FIG. 2J, the second sun gear 202b, 203b may rotate in direction Y (and/or different from direction Y) when driven by a second power source. The plurality of second planet gears 204b may be arranged radially around the second sun gear 202b, 203b and may be in communication with the second sun gear 202b, 203b. For example, when the second sun gear 202b, 203b is driven by a second power source, the second sun gear 202b, 203b may, in turn, drive each second planet gear 204b to rotate around its own central axis (i.e., axis of each planet gear 204b), as depicted by direction Y' (and/or different from direction Y'). As shown in FIG. 2J, the first planetary arrangement around section 202b may comprise a set of three second planet gears 204b arranged radially around the section 202b of the main body. It is to be understood in the present disclosure that the first planetary arrangement around section 202b may have a set of more or less than three second planet gears 204b without departing from the teachings of the present disclosure. For example, the first planetary arrangement around section 202b may include a first set of one, two, four, or more than four second planet gears 204b.

In example embodiments, the first sun gear 202a, 203a may be configurable to drive each of the first planet gears 204a via a first intermediate gear assembly 205a, which may enable the size of each gear and/or the gear ratio of the overall first planetary gear assembly to be selectable based on, among other things, the size of the pipeline 1 and/or required torque to be applied by the planet gears 204a. It is to be understood in the present disclosure that each first intermediate gear assembly 205a may be formed with one or more intermediate gears, belts, or the like, so as to collectively enable the first sun gear 202a, 203a to drive one of the first planet gears 204a.

Similarly, the second sun gear 202b, 203b may be configurable to drive each of the second planet gears 204b via a second intermediate gear assembly 205b, which may enable the size of each gear and/or the gear ratio of the overall second planetary gear assembly to be selectable based on, among other things, the size of the pipeline 1 and/or required torque to be applied by the planet gears 204b. It is to be understood in the present disclosure that each second intermediate gear assembly 205b may be formed with one or more intermediate gears, belts, or the like, so as to collectively enable the second sun gear 202b, 203b to drive one of the second planet gears 204b.

The contact assembly may further comprise a plurality of first contact regions 206a and second contact regions 206b. Each first contact region 206a and each second contact region 206b may be formed on at least a portion of an exterior circumferential or perimeter portion of each first planet gear 204a and each second planet gear 204b, respectively, in example embodiments. Each first contact region 206a and each second contact region 206b may be configured to face outwardly away from the central axis of its corresponding first planet gear 204a and second planet gear 204b, respectively. For example, at least a portion of each first contact region 206a and second contact region 206b may be configurable to face towards the interior wall 1b of the pipeline 1 when the mechanical assembly 200 is provided in the pipeline 1. The contact assembly may be configured in such a way that, when the mechanical assembly 200 is provided in the pipeline 1 and when the first sun gear 202a, 203a and second sun gear 202b, 203b drive the planet gears 204a and 204b, respectively, at least a portion of at least one of the first contact regions 206a and at least a portion of at least one of the second contact regions 206b, respectively, may contact with and apply the force to the interior wall 1b of the pipeline 1.

As shown in FIG. 2J, the first planetary arrangement around section 202a may comprise a set of three contact regions 206a arranged radially around the section 202a of the main body. It is to be understood in the present disclosure that the first planetary arrangement around section 202a may have a set of more or less than three contact regions 206a without departing from the teachings of the present disclosure. For example, the first planetary arrangement around section 202a may include a first set of one, two, four, or more than four contact regions 206a. Furthermore, the first planetary arrangement around section 202b may comprise a set of three contact regions 206b arranged radially around the section 202b of the main body. It is to be understood in the present disclosure that the first planetary arrangement around section 202b may have a set of more or less than three contact regions 206b without departing from the teachings of the present disclosure. For example, the first planetary arrangement around section 202b may include a first set of one, two, four, or more than four contact regions 206b.

Each first contact region 206a and each second contact region 206b may be formed in one or more of a plurality of shapes, sizes, structures, configurations, and compositions. For example, each first contact region 206a and each second contact region 206b may include substantially or relatively curved and/or flat surfaces and/or structures. As a more specific example, each first contact region 206a and each second contact region 206b may have a portion that is curved to resemble the curvature of the first planet gear 204a and second planet gear 204b, respectively. In addition to or alternatively, each contact region 206a and 206b may have a portion that is curved to enable contact with the curved portions of the interior wall 1b of the pipeline 1. In addition to or alternatively, each first contact region 206a and each second contact region 206b may include a plurality of thistles (such as metal-based thistles and/or other relatively strong and durably structured thistles of other compositions), protruding features and/or elements, or the like. For example, each first contact region 206a and each second contact region 206b may include brush-like structures having thistles, or the like, formed using steel-based (e.g., high speed steel or surface hardening steel) or other materials (e.g., artificial diamond or other carbon-based materials. In addition to or alternatively, each first contact region 206a and each second contact region 206b may resemble a scraping tool, grinding tool, or the like. In addition to or alternatively, each first contact region 206a and each second contact region 206b may include surface(s) having rough and/or sharp surface area(s). For example, each of the rough and/or sharp features of such a surface may be formed in one or more of a plurality of shapes, including triangles, cones, cylinders, knife-edges, needles, and/or wire brushes. It is to be understood in the present disclosure that each first contact region 206a and each second contact region 206b may be formed in one or more of these or other shapes, sizes, structures, configurations, and/or compositions without departing from the teachings of the present disclosure, so long as the first contact regions 206a and second contact regions 206b are operable to perform the treating of the interior wall 1b of the pipeline 1.

In respect to the main body 202, the first section 202a and second section 202b of the main body may each be a substantially elongated body having one or more parts spanning some, most, or all of the length of the mechanical assembly 200. The first section 202a and second section 202b of the main body may each be a substantially cylindrical shaped body, or may include one or more other shapes and configurations.

The first section 202a of the main body may include a first portion 202a' and one or more second portions 202". As illustrated in FIG. 2J, the first section 202a of the main body may include a second portion 202" between first section 202a and second section 202b, as well as a second portion 202" nearest to second end 212. It is to be understood in the present disclosure that the second portion(s) 202" of the main body may be formed as separate independent elements, separate elements connected via an attachment (not shown) through first portion 202a' (and/or first portion 202b' of the second section 202b) of the main body, or a unitary element having a portion (not shown) passing through first portion 202a' (and/or first portion 202b' of the second section 202b) of the main body without departing from the teachings of the present disclosure. In example embodiments, the first portion 202a' and second portion 202" may be formed as a unitary element.

In example embodiments, the first portion 202a' of the first section 202a may be the portion of the main body that is attached or attachable to the first of the first planetary arrangements (i.e., the first sun gear 202a, 203a, first intermediate gear assembly 205a, first planet gears 204a, and first contact regions 206a), as illustrated in FIG. 2J. The first portion 202a' of the first section 202a may or may not be configurable to move (e.g., rotate) relative to the second portion 202" of the main body, another element of the mechanical assembly 200, and/or an imaginary axis formed by an element of the mechanical assembly 200. For example, as illustrated in FIG. 2J, the first portion 202a' of the first section 202a may be configurable to rotate in direction Y (and/or different from direction Y), and in doing so, cause the first planet gears 204a (and first contact regions 206a) to collectively rotate in direction Y (and/or different from direction Y) relative to the second portion 202" and/or around the imaginary axis C. It is to be understood in the present disclosure that the first portion 202a' of the first section 202a may not be movable and/or rotatable relative to the second portion 202" of the main body and/or imaginary axis C.

Similarly, the second section 202b of the main body may include a first portion 202b' and one or more second portions 202". As illustrated in FIG. 2J, the second section 202b of the main body may include a second portion 202" nearest to the first end 210, as well as a second portion 202" between first section 202a and second section 202b. It is to be understood in the present disclosure that the second portion(s) 202" of the main body may be formed as separate independent elements, separate elements connected via an attachment (not shown) through first portion 202b' (and/or first portion 202a' of the first section 202a) of the main body, or a unitary element having a portion (not shown) passing through first portion 202b' (and/or first portion 202a' of the first section 202a) of the main body without departing from the teachings of the present disclosure. In example embodiments, the first portion 202b' and second portion 202" may be formed as a unitary element.

In example embodiments, the first portion 202b' of the second section 202b may be the portion of the main body that is attached or attachable to the second of the first planetary arrangements (i.e., the second sun gear 202b, 203b, second intermediate gear assembly 205b, second planet gears 204b, and second contact regions 206b), as illustrated in FIG. 2J. The first portion 202b' of the second section 202b may or may not be configurable to move (e.g., rotate) relative to the second portion 202" of the main body, another element of the mechanical assembly 200, and/or an imaginary axis formed by an element of the mechanical assembly 200. For example, as illustrated in FIG. 2J, the first portion 202b' of the second section 202b may be configurable to rotate in direction X (and/or different from direction X), and in doing so, cause the second planet gears 204b (and second contact regions 206b) to collectively rotate in direction X (and/or different from direction X) relative to the second portion 202" and/or around the imaginary axis C. It is to be understood in the present disclosure that the first portion 202b' of the second section 202b may rotate in a direction that is the same as or different from the direction of rotation of the first portion 202a' of the first section 202a. It is also to be understood in the present disclosure that the first portion 202b' of the second section 202b may not be movable and/or rotatable relative to the second portion 202" of the main body and/or imaginary axis C.

As illustrated in the embodiment of FIG. 2J, the main body may also include a first end 210 and/or second end 212. The first end 210 and/or second end 212 may be provided so as to perform one or more functions, including, but not limited to, enabling the system 100 to travel through the pipeline 1 and providing stability for the system 100 while within and traveling through the pipeline 1. For example, when the system 100 is provided in a pipeline 1, when it is desired for the system 100 to travel in the direction depicted by imaginary axis C while in the pipeline 1, and when the system 100 is operable to travel via an externally-provided high pressure medium (e.g., gas, liquid, and/or other medium) providable to the first end 210 in the direction depicted by imaginary axis C, the first end 210 may be operable to receive the high pressured medium and cause the system 100 to travel through the pipeline 1 accordingly. When traveling through the pipeline 1, the system 100 may then perform, among other things, the treating of the interior wall 1b of the pipeline 1 via the mechanical assembly 200. The second end 212 may be similarly used when it is desired for the system 100 to travel through the pipeline 1 in an opposite direction to the direction depicted by imaginary axis C. In addition to or alternatively, the system 100 may travel through the pipeline 1 via other mechanisms, including those described above and in the present disclosure. In addition to or alternatively, the second end 212 may be used to assist in controlling the movement and/or position of the system 100 in the pipeline 1, such as by selectively controlling high pressured medium present on both ends of the system 100. It is to be understood in the present disclosure that the mechanical assembly 200 may also include another first end (not shown) and/or another second end (not shown) between the first portion 202a' of the first section 202a and the first portion 202b' of the second section 202b, such as in situations wherein two mechanical assemblies (similar to the example embodiment described above in Example 1) are secured/attached together to form a single mechanical assembly or a serial arrangement of two mechanical assemblies.

The mechanical assembly 200 may also include a controller (not shown), and the controller may be housed, either in part or in whole, in the first portion 202a' of the first section 202a, first portion 202b' of the second section 202b, the second portion 202" of the first section 202a, the second portion 202" of the second section 202b, the first end 210, the second end 220, and/or other parts of the system 100. The controller may be configurable to also communicate with a storage medium (memory) to store information gathered, such as performance parameters, number of rotations (if any) of the contact assembly, a quantity of force applied by the contact regions (such as an average, maximum, minimum, distribution over time, distribution based on location and/or distance travelled, etc.). In the aforementioned example embodiment wherein the mechanical assembly 200 includes another first end (not shown) and/or another second end (not shown) between the first portion 202a' of the first section 202a and the first portion 202b' of the second section 202b, the mechanical assembly 200 may also include another controller (not shown) housed, either in part or in whole, in the aforementioned another first end (not shown) and/or another second end (not shown).

In respect to the dimensions of the mechanical assembly 200, a cross-sectional dimension between the contact regions 206a and 206b of the mechanical assembly 200 and the central axis C (e.g., distance between the outermost portion of the contact region and the central axis C) may be more than, equal to, or less than the radius of the pipeline 1. For example, in situations wherein the contact regions 206a and/or 206b include brush-like structures having thistles, or the like, the said dimension may be more than or nearly equal to the radius of the pipeline 1. As another example, when one or more of the contact regions 206a and 206b are configurable to extend away from and retract towards the central axis of its planet gear 204a and 204b, respectively, and/or the central axis C, the said dimension may extend to be more than or nearly equal to the radius of the pipeline 1 (which may be useful when traversing through a non-straight portion (e.g., bends or turns) of the pipeline 1). A dimension between ends 210 and 212 (i.e., overall length) may be selected based on, among other things, the minimum or smallest bend radius found in the non-straight portions (e.g., bends or turns) of the overall pipeline 1 so as to ensure the mechanical assembly 200 is capable of traversing through such bends. In situations wherein the overall length of the mechanical assembly 200 exceeds the maximum allowable length based on considerations of the aforementioned minimum or smallest bend radius of the pipeline 1, the first section 202a, second section 202b, and/or a portion between the first section 202a and second section 202b (e.g., section 202") may include one or more bendable, pivotable, actuatable, and/or flexible portions configurable to enable the mechanical assembly 200 to traverse through such non-straight portion of the pipeline 1. For example, the first section 202a may include a pivotable, actuatable, bendable, and/or flexible portion, such as in the first portion 202a' and/or one or more of the second portions 202". As another example, the second section 202b may include a pivotable, actuatable, bendable, and/or flexible portion, such as in the first portion 202b' and/or one or more of the second portions 202".

Figure 2K:
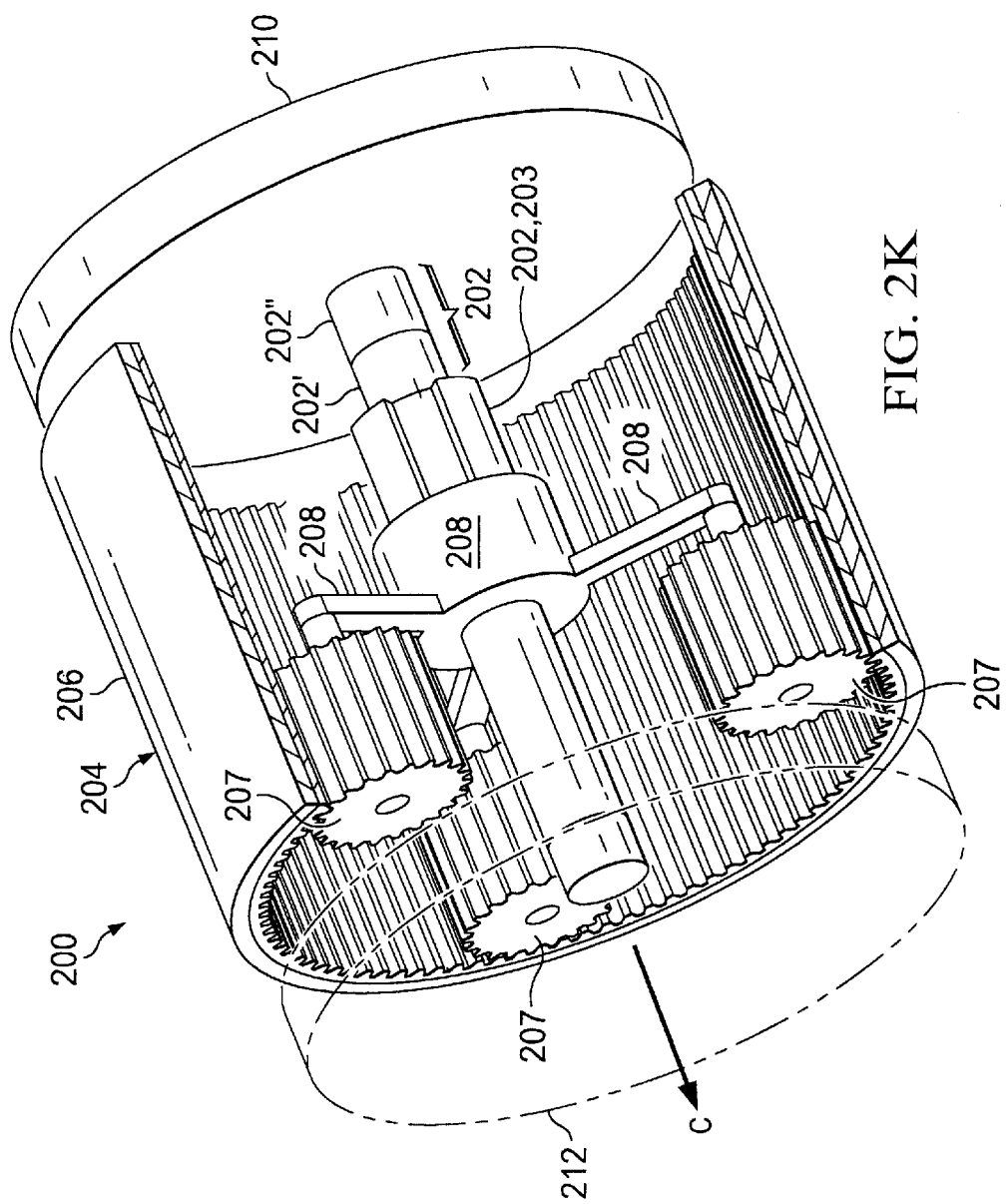
FIG. 2K is a perspective view illustration of another example embodiment of a system having a mechanical assembly with a second planetary arrangement.
Figure 2L:
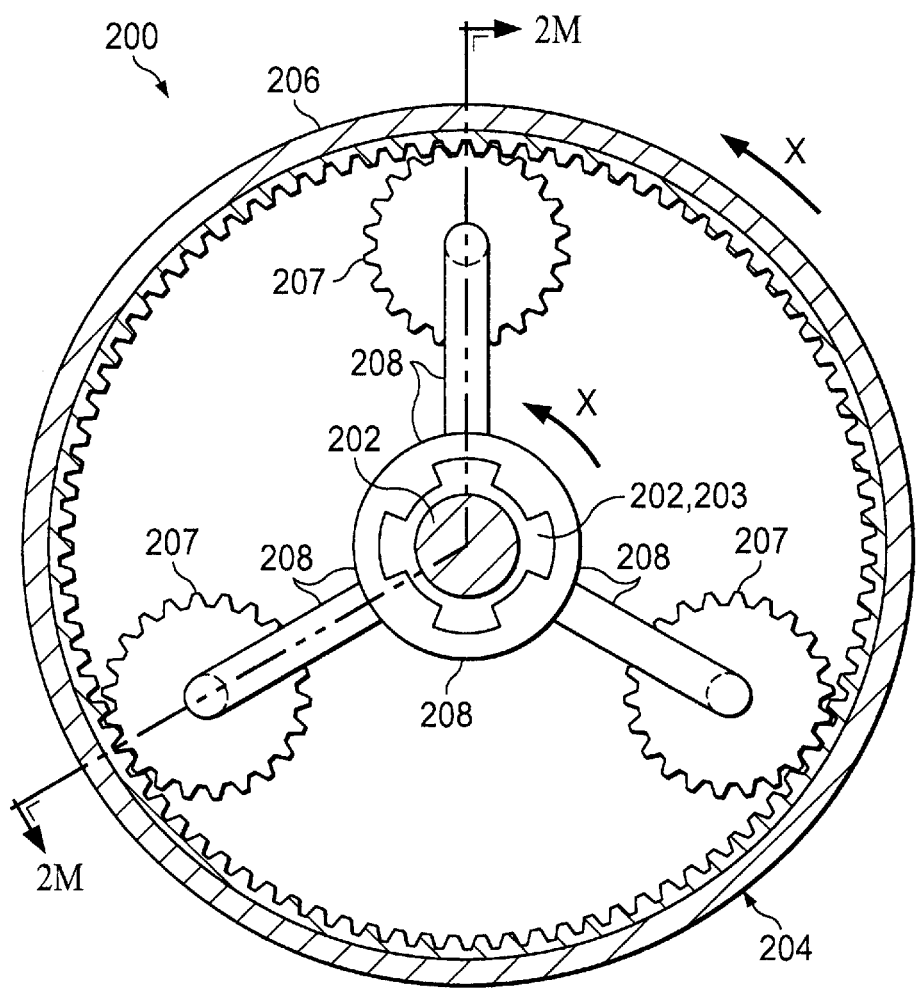
FIG. 2L is a cross-sectional view illustration of an example embodiment of a system having a mechanical assembly with a second planetary arrangement.
Figure 2M:
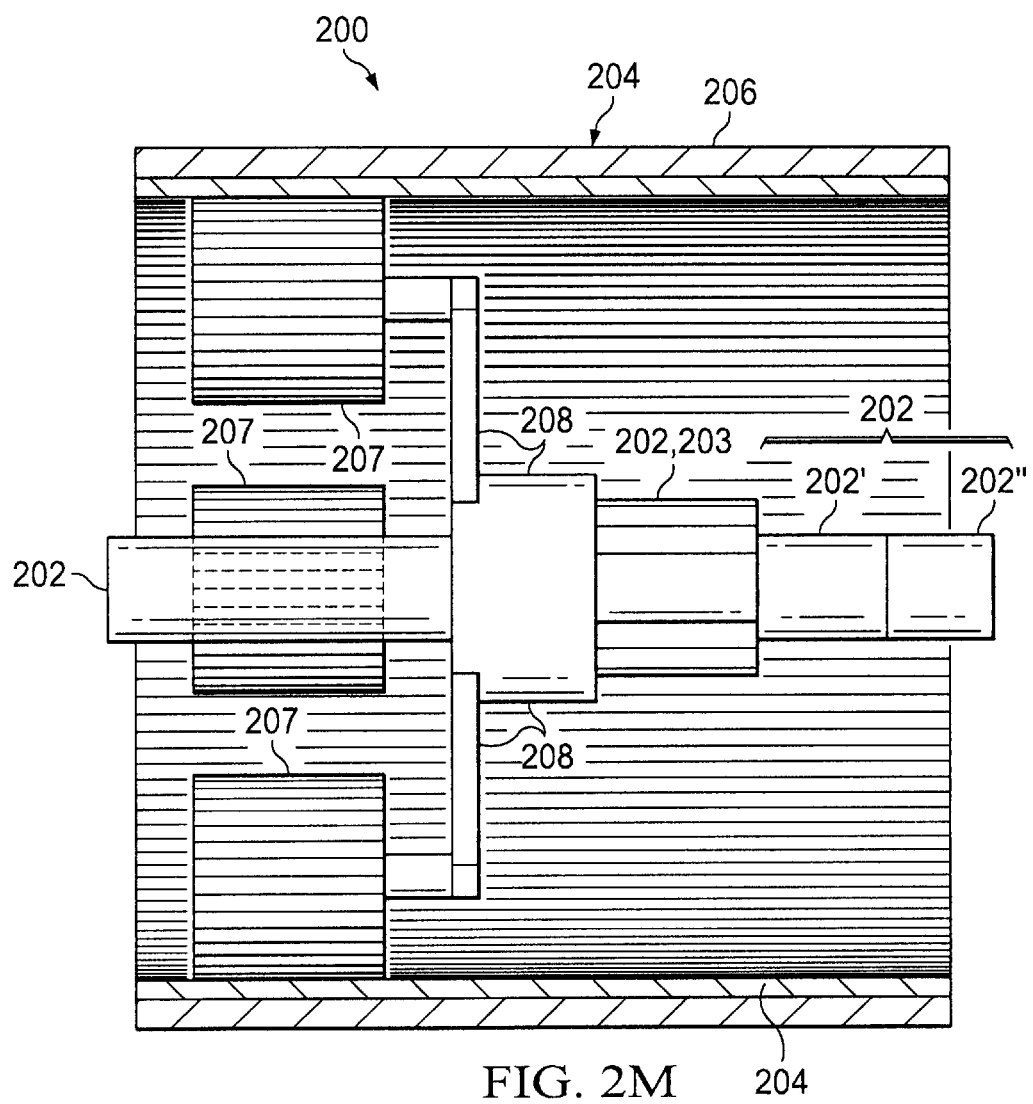
FIG. 2M is a side view illustration of an example embodiment of a system having a mechanical assembly with a second planetary arrangement.

Example 7—Example Embodiment of a Mechanical Assembly Having a Set of Contact Members Arranged in a Second Planetary Arrangement FIG. 2K, FIG. 2L, and FIG. 2M depict another example embodiment of the mechanical assembly 200 having a main body 202 and a contact assembly. The contact assembly may be arranged in a second planetary arrangement around the main body 202. As used in the present disclosure, references to a "second planetary arrangement" may include an arrangement of gears, belts, and/or the like, whereby one or more planet gears (e.g., planet gear 207) are configurable to not rotate relative to its own central axis (i.e., axis of the planet gear).

The second planetary arrangement of the contact assembly may include a sun gear 203 (which may also be considered as a part of the main body 202 in some example embodiments), a plurality of planet gears 207, a planet carrier 208, and a ring gear 204. The ring gear 204 may be a rigidly formed geometric structure (e.g., a rigid cylindrical shaped structure), a substantially flexible geometric structure (e.g., a flexible cylindrical shaped structure), a partially rigid and/or flexible geometric structure, and/or the like. For example, when the ring gear 204 includes a substantially or partially flexible geometric structure, one or more portions of the planet carrier 208 may be operable to fixably and/or adaptively extend outwardly (and/or retract inwardly) to contact with a portion of an interior wall 1b of the pipeline 1. In such an example, the one or more portions of the planet carrier 208 may be configurable to adaptively extend outwardly (and/or retract inwardly) relative to the central axis C. The sun gear 202, 203 may be configurable to rotate around its central axis (i.e., axis of the sun gear 202, 203) when driven by a power source (not shown). For example, as shown in FIGS. 2K and 2L, the sun gear 202, 203 may rotate in direction X (and/or different from direction X) when driven by a power source. The planet carrier 208 may be arranged in communication with the sun gear 202, 203, and the plurality of planet gears 207 may be arranged radially around the sun gear 202, 203 and in communication with the planet carrier 208. For example, when the sun gear 202, 203 is driven by a power source to rotate, the sun gear 202, 203 may, in turn, drive the planet carrier 208 to rotate. The planet carrier 208 may, in turn, drive the planet gears 207 to collectively rotate around the sun gear 202, 203, as depicted by direction X (and/or different from direction X) in FIG. 2L. However, as each of the planet gears 207 are configurable in such a way as to not rotate around its own central axis (i.e., axis of each planet gear 207), the collective rotation of the planet gears 207 will, in turn, drive the ring gear 204 to rotate, as depicted by direction X (and/or different from direction X). As shown in FIGS. 2K and 2L, the contact assembly may comprise a set of three planet gears 207 arranged radially around the sun gear 202, 203. It is to be understood in the present disclosure that the contact assembly may have a set of more or less than three planet gears 207 without departing from the teachings of the present disclosure. For example, the contact assembly may include a set of one, two, four, or more than four planet gears 207.

The contact assembly may further comprise a contact region 206. The contact region 206 may be formed on at least a portion of an exterior circumferential or perimeter portion of the ring gear 204 in example embodiments. The contact region 206 may be configurable to face outwardly away from the central axis of the ring gear 204 (or the sun gear 202, 203). For example, at least a portion of the contact region 206 may be configurable to face towards the interior wall 1b of the pipeline 1 when the mechanical assembly 200 is provided in the pipeline 1. The contact assembly may be configured in such a way that, when the mechanical assembly 200 is provided in the pipeline 1 and when the sun gear 202, 203 drives the planet gears 207, at least a portion of the contact region 206 may contact with and apply the force to the interior wall 1b of the pipeline 1.

The contact region 206 may be formed in one or more of a plurality of shapes, sizes, structures, configurations, sections, and compositions. For example, the contact region 206 may include one or more substantially or relatively curved and/or flat surfaces and/or structures. As a more specific example, the contact region 206 may have a portion that is curved to enable contact with the curved portions of the interior wall 1b of the pipeline 1. In addition to or alternatively, the contact region 206 may include a plurality of thistles (such as metal-based thistles and/or other relatively strong and durably structured thistles of other compositions), protruding features and/or elements, or the like. For example, the contact region 206 may include brush-like structures having thistles, or the like, formed using steel-based (e.g., high speed steel or surface hardening steel) or other materials (e.g., artificial diamond or other carbon-based materials. In addition to or alternatively, the contact region 206 may resemble a scraping tool, grinding tool, or the like. In addition to or alternatively, the contact region 206 may include surface(s) having rough and/or sharp surface area(s). For example, each of the rough and/or sharp features of such a surface may be formed in one or more of a plurality of shapes, including triangles, cones, cylinders, knife-edges, needles, and/or wire brushes. It is to be understood in the present disclosure that the contact region 206 may be formed in one or more of these or other shapes, sizes, structures, configurations, and/or compositions without departing from the teachings of the present disclosure, so long as the contact region 206 is operable to perform the treating of the interior wall 1b of the pipeline 1.

In respect to the main body 202, the main body 202 may be a substantially elongated body having one or more parts spanning some, most, or all of the length of the mechanical assembly 200. The main body 202 may be a substantially cylindrical shaped body, or may include one or more other shapes and configurations. The main body 202 may include a first portion 202' and one or more second portions 202". As illustrated in FIG. 2H, the main body 202 may include a second portion 202" nearest to first end 210 and a second portion 202" nearest to second end 212. It is to be understood in the present disclosure that the second portion(s) 202" of the main body 202 may be formed as separate independent elements, separate elements connected via an attachment (not shown) through first portion 202' of the main body 202, or a unitary element having a portion (not shown) passing through first portion 202' of the main body 202 without departing from the teachings of the present disclosure. In example embodiments, the first portion 202' and second portion 202" may be formed as a unitary element.

In example embodiments, the first portion 202' of the main body 202 may be the portion of the main body 202 that is attached or attachable to the contact assembly (i.e., the sun gear 202, 203, planet carrier 208, planet gears 207, ring gear 204, and contact regions 206), as illustrated in FIGS. 2K and 2M.

The main body 202 may also include a first end 210 and/or second end 212 in example embodiments. The first end 210 and/or second end 212 may be provided so as to perform one or more functions, including, but not limited to, enabling the system 100 to travel through the pipeline 1 and providing stability for the system 100 while within and traveling through the pipeline 1. For example, when the system 100 is provided in a pipeline 1, when it is desired for the system 100 to travel in the direction depicted by imaginary axis C while in the pipeline 1, and when the system 100 is operable to travel via an externally-provided high pressure medium (e.g., gas, liquid, and/or other medium) providable to the first end 210 in the direction depicted by imaginary axis C, the first end 210 may be operable to receive the high pressured medium and cause the system 100 to travel through the pipeline 1 accordingly. When traveling through the pipeline 1, the system 100 may then perform, among other things, the treating of the interior wall 1b of the pipeline 1 via the mechanical assembly 200. The second end 212 may be similarly used when it is desired for the system 100 to travel through the pipeline 1 in an opposite direction to the direction depicted by imaginary axis C. In addition to or alternatively, the second end 212 may be used to assist in controlling the movement and/or position of the system 100 in the pipeline 1, such as by selectively controlling high pressured medium present on both ends of the system 100. In addition to or alternatively, the system 100 may travel through the pipeline 1 via other mechanisms, including those described above and in the present disclosure.

The mechanical assembly 200 may also include a controller (not shown), and the controller may be housed, either in part or in whole, in the first portion 202' of the main body 202, the second portion 202" of the main body 202, the first end 210, the second end 220, and/or other parts of the system 100. The controller may be configurable to also communicate with a storage medium (memory) to store information gathered, such as performance parameters, number of rotations (if any) of the contact assembly, a quantity of force applied by the contact regions (such as an average, maximum, minimum, distribution over time, distribution based on location and/or distance travelled, etc.), etc.

In respect to the dimensions of the mechanical assembly 200, a cross-sectional dimension between the contact regions 206 of the mechanical assembly 200 and the central axis C (e.g., distance between the outermost portion of the contact region and the central axis C) may be more than, equal to, or less than the radius of the pipeline 1. For example, in situations wherein the contact regions 206 include brush-like structures having thistles, or the like, the said dimension may be more than or nearly equal to the radius of the pipeline 1. As another example, when one or more of the contact regions 206 are configurable to extend away from and retract towards the central axis of its planet gear 207 and/or the central axis C, the said dimension may extend to be more than or nearly equal to the radius of the pipeline 1 (which may be useful when traversing through a non-straight portion (e.g., bends or turns) of the pipeline 1). A dimension between ends 210 and 212 (i.e., overall length) may be selected based on, among other things, the minimum or smallest bend radius found in the non-straight portions (e.g., bends or turns) of the overall pipeline 1 so as to ensure the mechanical assembly 200 is capable of traversing through such bends. In situations wherein the overall length of the mechanical assembly 200 exceeds the maximum allowable length based on considerations of the aforementioned minimum or smallest bend radius of the pipeline 1, the main body 202 may include one or more bendable, pivotable, actuatable, and/or flexible portions configurable to enable the mechanical assembly 200 to traverse through such non-straight portion of the pipeline 1. For example, the main body 202 of the mechanical assembly 200 may include a pivotable, actuatable, bendable, and/or flexible portion, such as in the first portion 202' and/or one or more of the second portions 202".

Figure 2N:
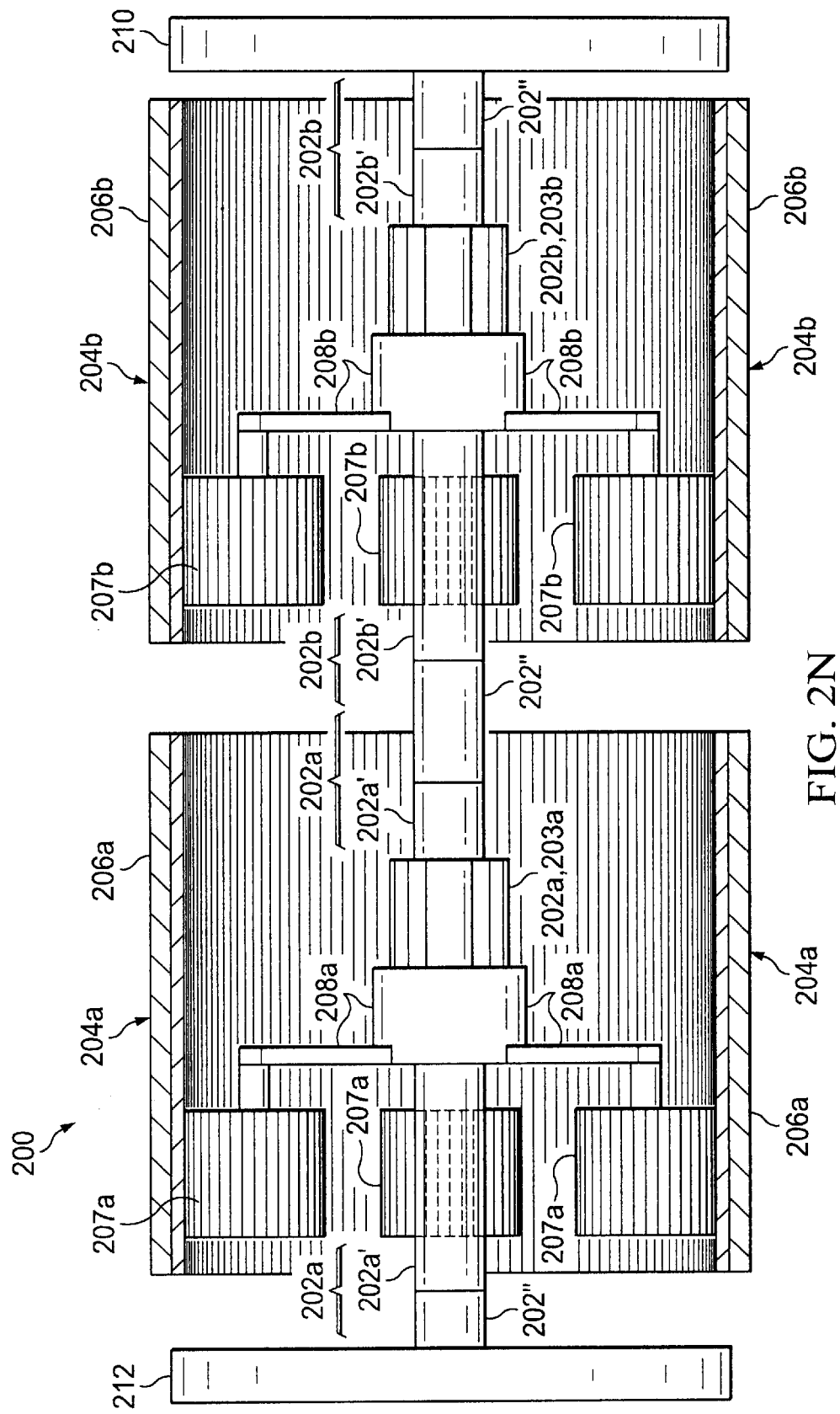
FIG. 2N is a side view illustration of another example embodiment of a system having a mechanical assembly with two second planetary arrangements in a serially in line configuration.
Figure 2O:
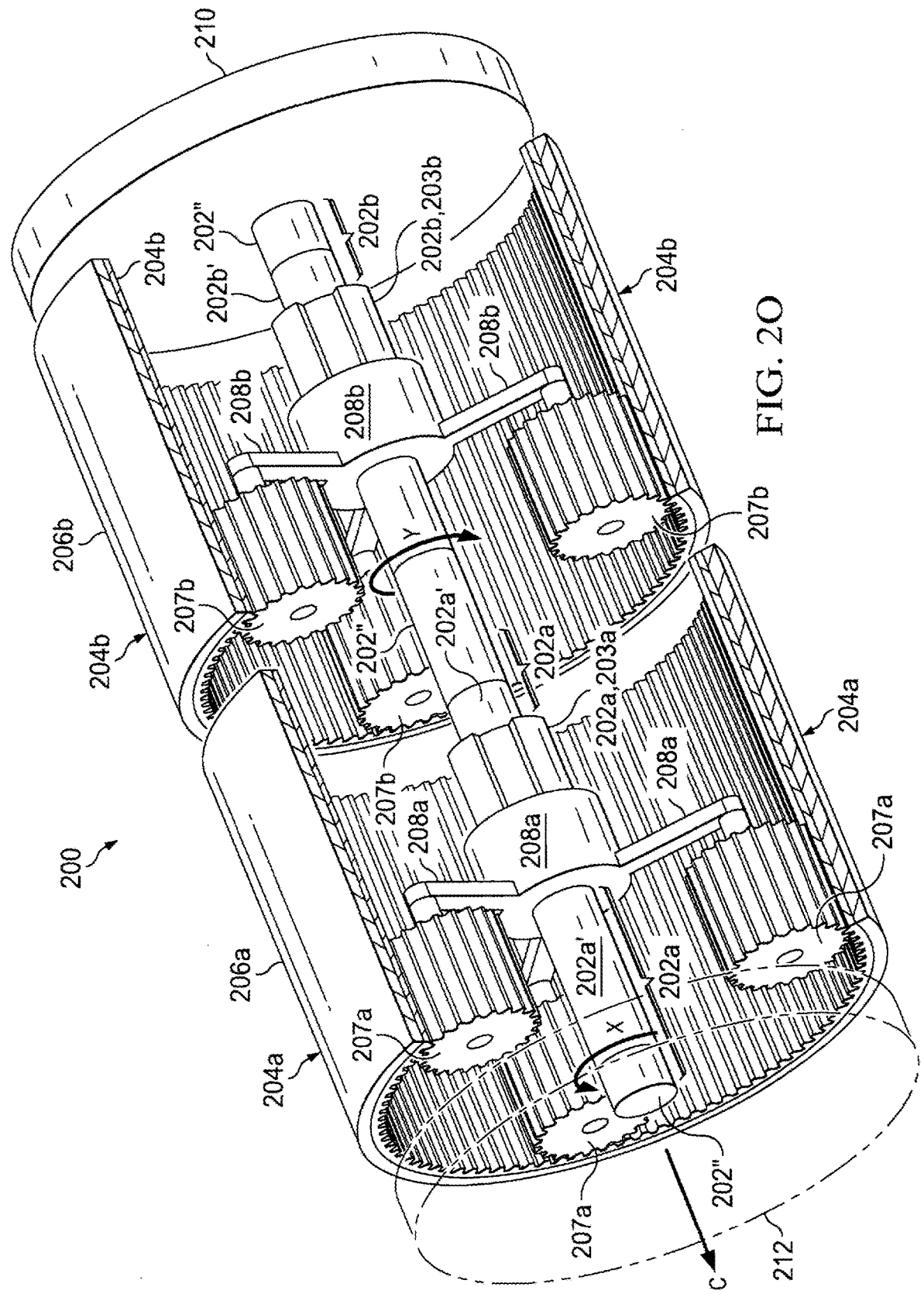
FIG. 2O is a perspective view illustration of an example embodiment of a system having a mechanical assembly with two second planetary arrangements in a serially in line configuration.

Example 8—Example Embodiment of a Mechanical Assembly Having a Plurality of Sets of Contact Members Arranged in the Second Planetary Arrangement FIG. 2N and FIG. 2O depict another example embodiment of the mechanical assembly 200 having a main body with sections 202a and 202b. The mechanical assembly 200 may also include a contact assembly. The contact assembly may be arranged in, for example, a serial arrangement of a second planetary arrangement around section 202a of the main body (similar to the example embodiment described above in Example 7) and another second planetary arrangement around section 202b of the main body (similar to the example embodiment described above in Example 7). It is to be understood in the present disclosure that either one of the aforementioned second planetary arrangements (around sections 202a and 202b) may be replaced with a first planetary arrangement (similar to the example embodiment described above in Example 5) without departing from the teachings of the present disclosure. It is also to be understood in the present disclosure that the contact assembly may comprise one or more other second planetary arrangements (or first planetary arrangements) in addition to (or in replacement of) the second planetary arrangement around section 202a and/or the second planetary arrangement around section 202b without departing from the teachings of the present disclosure.

The second planetary arrangement around section 202a may include a first sun gear 203a (which may also be considered as a part of the first section 202a of the main body in some example embodiments), a plurality of first planet gears 207a, a first planet carrier 208a, and a first ring gear 204a. The first ring gear 204a may be a rigidly formed geometric structure (e.g., a rigid cylindrical shaped structure), a substantially flexible geometric structure (e.g., a flexible cylindrical shaped structure), a partially rigid and/or flexible geometric structure, and/or the like. For example, when the first ring gear 204a includes a substantially or partially flexible geometric structure, one or more portions of the first planet carrier 208a may be operable to fixably and/or adaptively extend outwardly (and/or retract inwardly) to contact with a portion of an interior wall 1b of the pipeline 1. In such an example, the one or more portions of the first planet carrier 208a may be configurable to adaptively extend outwardly (and/or retract inwardly) relative to the central axis C. The first sun gear 202a, 203a may be configurable to rotate around its central axis (i.e., axis of the first sun gear 202a, 203a) when driven by a first power source (not shown). For example, as shown in FIG. 2O, the first sun gear 202a, 203a may rotate in direction X (and/or different from direction X) when driven by a first power source. The first planet carrier 208a may be arranged in communication with the first sun gear 202a, 203a, and the plurality of first planet gears 207a may be arranged radially around the first sun gear 202a, 203a and in communication with the first planet carrier 208a. For example, when the first sun gear 202a, 203a is driven by a first power source to rotate, the first sun gear 202a, 203a may, in turn, drive the first planet carrier 208a to rotate. The first planet carrier 208a may, in turn, drive the first planet gears 207a to collectively rotate around the first sun gear 202a, 203a, as depicted by direction X (and/or different from direction X). However, as each of the first planet gears 207 is configured in such a way as to not rotate around its own central axis (i.e., axis of each planet gear 207), the collective rotation of the first planet gears 207a will, in turn, drive the first ring gear 204a to rotate, as depicted by direction X (and/or different from direction X). As shown in FIG. 2N, the contact assembly may comprise a set of three first planet gears 207a arranged radially around the first sun gear 202a, 203a. It is to be understood in the present disclosure that the contact assembly may have a set of more or less than three first planet gears 207a without departing from the teachings of the present disclosure. For example, the contact assembly may include a set of one, two, four, or more than four first planet gears 207a.

The second planetary arrangement around section 202b may include a second sun gear 203b (which may also be considered as a part of the second section 202b of the main body in some example embodiments), a plurality of second planet gears 207b, a second planet carrier 208b, and a second ring gear 204b. The second ring gear 204b may be a rigidly formed geometric structure (e.g., a rigid cylindrical shaped structure), a substantially flexible geometric structure (e.g., a flexible cylindrical shaped structure), a partially rigid and/or flexible geometric structure, and/or the like. For example, when the second ring gear 204b includes a substantially or partially flexible geometric structure, one or more portions of the second planet carrier 208b may be operable to fixably and/or adaptively extend outwardly (and/or retract inwardly) to contact with a portion of an interior wall 1b of the pipeline 1. In such an example, the one or more portions of the second planet carrier 208b may be configurable to adaptively extend outwardly (and/or retract inwardly) relative to the central axis C. The second sun gear 202b, 203b may be configurable to rotate around its central axis (i.e., axis of the second sun gear 202b, 203b) when driven by a second power source (not shown). For example, as shown in FIG. 2J, the second sun gear 202b, 203b may rotate in direction Y (and/or different from direction Y) when driven by a second power source. The second planet carrier 208b may be arranged in communication with the second sun gear 202b, 203b, and the plurality of second planet gears 207b may be arranged radially around the second sun gear 202b, 203b and in communication with the second planet carrier 208b. For example, when the second sun gear 202b, 203b is driven by a second power source to rotate, the second sun gear 202b, 203b may, in turn, drive the second planet carrier 208b to rotate. The second planet carrier 208b may, in turn, drive the second planet gears 207b to collectively rotate around the second sun gear 202b, 203b, as depicted by direction Y (and/or different from direction Y). However, as each of the second planet gears 207 is configured in such a way that it is prevented from rotating around its own central axis, the collective rotation of the second planet gears 207b will, in turn, drive the second ring gear 204b to rotate, as depicted by direction Y (and/or different from direction Y). As shown in FIG. 2N, the contact assembly may comprise a set of three second planet gears 207b arranged radially around the second sun gear 202b, 203b. It is to be understood in the present disclosure that the contact assembly may have a set of more or less than three second planet gears 207b without departing from the teachings of the present disclosure. For example, the contact assembly may include a set of one, two, four, or more than four second planet gears 207b.

The contact assembly may further comprise a first contact region 206a. The first contact region 206a may be formed on at least a portion of an exterior circumferential or perimeter portion of the first ring gear 204a in example embodiments. The first contact region 206a may be configurable to face outwardly away from the central axis of the first ring gear 204a (or the first sun gear 202a, 203a). For example, at least a portion of the first contact region 206a may be configured to face towards the interior wall 1b of the pipeline 1 when the mechanical assembly 200 is provided in the pipeline 1. The contact assembly may be configured in such a way that, when the mechanical assembly 200 is provided in the pipeline 1 and when the first sun gear 202a, 202b is driven by the first power source, at least a portion of the first contact region 206a may contact with and apply the force to the interior wall 1b of the pipeline 1. As shown in FIGS. 2N and 2O, the contact assembly may comprise a set of three first contact regions 206a. It is to be understood in the present disclosure that the contact assembly may have a set of more or less than three first contact regions 206a without departing from the teachings of the present disclosure. For example, the contact assembly may include a set of one, two, four, or more than four first contact regions 206a.

The contact assembly may further comprise a second contact region 206b. The second contact region 206b may be formed on at least a portion of an exterior circumferential or perimeter portion of the second ring gear 204b in example embodiments. The second contact region 206b may be configured to face outwardly away from the central axis of the second ring gear 204b (or the second sun gear 202b, 203b). For example, at least a portion of the second contact region 206b may be configured to face towards the interior wall 1b of the pipeline 1 when the mechanical assembly 200 is provided in the pipeline 1. The contact assembly may be configured in such a way that, when the mechanical assembly 200 is provided in the pipeline 1 and when the second sun gear 202b, 203b is driven by the second power source, at least a portion of the second contact region 206b may contact with and apply the force to the interior wall 1b of the pipeline 1. As shown in FIGS. 2N and 2O, the contact assembly may comprise a set of three second contact regions 206b. It is to be understood in the present disclosure that the contact assembly may have a set of more or less than three second contact regions 206b without departing from the teachings of the present disclosure. For example, the contact assembly may include a set of one, two, four, or more than four second contact regions 206b.

The first contact region 206a and the second contact region 206b may be formed in one or more of a plurality of shapes, sizes, structures, configurations, and compositions. For example, the first contact region 206a and the second contact region 206b may include substantially or relatively curved and/or flat surfaces and/or structures. As a more specific example, the first contact region 206a and the second contact region 206b may have a portion that is curved to enable contact with the curved portions of the interior wall 1b of the pipeline 1. In addition to or alternatively, the first contact region 206a and the second contact region 206b may include a plurality of thistles (such as metal-based thistles and/or other relatively strong and durably structured thistles of other compositions), protruding features and/or elements, or the like. For example, the first contact region 206a and the second contact region 206b may include brush-like structures having thistles, or the like, formed using steel-based (e.g., high speed steel or surface hardening steel) or other materials (e.g., artificial diamond or other carbon-based materials. In addition to or alternatively, the first contact region 206a and the second contact region 206b may resemble a scraping tool, grinding tool, or the like. In addition to or alternatively, the first contact region 206a and the second contact region 206b may include surface(s) having rough and/or sharp surface area(s). For example, each of the rough and/or sharp features of such a surface may be formed in one or more of a plurality of shapes, including triangles, cones, cylinders, knife-edges, needles, and/or wire brushes. It is to be understood in the present disclosure that the first contact region 206a and the second contact region 206b may be formed in one or more of these or other shapes, sizes, structures, configurations, and/or compositions without departing from the teachings of the present disclosure, so long as the first contact region 206a and second contact region 206b are operable to perform the treating of the interior wall 1b of the pipeline 1.

In respect to the main body 202, the first section 202a and second section 202b of the main body may each be a substantially elongated body having one or more parts spanning some, most, or all of the length of the mechanical assembly 200. The first section 202a and second section 202b of the main body may each be a substantially cylindrical shaped body, or may include one or more other shapes and configurations.

The first section 202a of the main body may include a first portion 202a' and one or more second portions 202". As illustrated in FIGS. 2N and 2O, the first section 202a of the main body may include a second portion 202" between first section 202a and second section 202b, as well as a second portion 202" nearest to second end 212. It is to be understood in the present disclosure that the second portion(s) 202" of the main body may be formed as separate independent elements, separate elements connected via an attachment (not shown) through first portion 202a' (and/or first portion 202b' of the second section 202b) of the main body, or a unitary element having a portion (not shown) passing through first portion 202a' (and/or first portion 202b' of the second section 202b) of the main body without departing from the teachings of the present disclosure. In example embodiments, the first portion 202a' and second portion 202" may be formed as a unitary element.

In example embodiments, the first portion 202a' of the first section 202a may be the portion of the main body that is attached or attachable to the first of the second planetary arrangements (i.e., the first sun gear 202a, 203a, first planet gears 207a, first planet carrier 208a, first ring gear 204a, and first contact region 206a), as illustrated in FIGS. 2N and 2O.

Similarly, the second section 202b of the main body may include a first portion 202b' and one or more second portions 202". As illustrated in FIGS. 2N and 2O, the second section 202b of the main body may include a second portion 202" nearest to the first end 210, and may (or may not) include a second portion 202" between first section 202a and second section 202b. It is to be understood in the present disclosure that the second portion(s) 202" of the main body may be formed as separate independent elements, separate elements connected via an attachment (not shown) through first portion 202b' (and/or first portion 202a' of the first section 202a) of the main body, or a unitary element having a portion (not shown) passing through first portion 202b' (and/or first portion 202a' of the first section 202a) of the main body without departing from the teachings of the present disclosure. In example embodiments, the first portion 202b' and second portion 202" may be formed as a unitary element.

In example embodiments, the first portion 202b' of the second section 202b may be the portion of the main body that is attached or attachable to the second of the first planetary arrangements (i.e., the second sun gear 202b, 203b, second planet gears 207b, second planet carrier 208b, second ring gear 204b, and second contact region 206b), as illustrated in FIGS. 2N and 2O.

As illustrated in the embodiment of FIGS. 2N and 2O, the main body may also include a first end 210 and/or second end 212. The first end 210 and/or second end 212 may be provided so as to perform one or more functions, including, but not limited to, enabling the system 100 to travel through the pipeline 1 and providing stability for the system 100 while within and traveling through the pipeline 1. For example, when the system 100 is provided in a pipeline 1, when it is desired for the system 100 to travel in the direction depicted by imaginary axis C while in the pipeline 1, and when the system 100 is operable to travel via an externally-provided high pressure medium (e.g., gas, liquid, and/or other medium) providable to the first end 210 in the direction depicted by imaginary axis C, the first end 210 may be operable to receive the high pressured medium and cause the system 100 to travel through the pipeline 1 accordingly. When traveling through the pipeline 1, the system 100 may then perform, among other things, the treating of the interior wall 1b of the pipeline 1 via the mechanical assembly 200. The second end 212 may be similarly used when it is desired for the system 100 to travel through the pipeline 1 in an opposite direction to the direction depicted by imaginary axis C. In addition to or alternatively, the second end 212 may be used to assist in controlling the movement and/or position of the system 100 in the pipeline 1, such as by selectively controlling high pressured medium present on both ends of the system 100. In addition to or alternatively, the system 100 may travel through the pipeline 1 via other mechanisms, including those described above and in the present disclosure. It is to be understood in the present disclosure that the mechanical assembly 200 may also include another first end (not shown) and/or another second end (not shown) between the first portion 202a' of the first section 202a and the first portion 202b' of the second section 202b, such as in situations wherein two mechanical assemblies (similar to the example embodiment described above in Example 1) are secured/attached together to form a single mechanical assembly or a serial arrangement of two mechanical assemblies.

The mechanical assembly 200 may also include a controller (not shown), and the controller may be housed, either in part or in whole, in the first portion 202a' of the first section 202a, first portion 202b' of the second section 202b, the second portion 202" of the first section 202a, the second portion 202" of the second section 202b, the first end 210, the second end 220, and/or other parts of the system 100. The controller may be configurable to also communicate with a storage medium (memory) to store information gathered, such as performance parameters, number of rotations (if any) of the contact assembly, a quantity of force applied by the contact regions (such as an average, maximum, minimum, distribution over time, distribution based on location and/or distance travelled, etc.). In the aforementioned example embodiment wherein the mechanical assembly 200 includes another first end (not shown) and/or another second end (not shown) between the first portion 202a' of the first section 202a and the first portion 202b' of the second section 202*b*, the mechanical assembly 200 may also include another controller (not shown) housed, either in part or in whole, in the aforementioned another first end (not shown) and/or another second end (not shown).

In respect to the dimensions of the mechanical assembly 200, a cross-sectional dimension between the contact regions 206*a* and 206*b* of the mechanical assembly 200 and the central axis C (e.g., distance between the outermost portion of the contact region and the central axis C) may be more than, equal to, or less than the radius of the pipeline 1. For example, in situations wherein the contact regions 206*a* and/or 206*b* include brush-like structures having thistles, or the like, the said dimension may be more than or nearly equal to the radius of the pipeline 1. A dimension between ends 210 and 212 (i.e., overall length) may be selected based on, among other things, the minimum or smallest bend radius found in the non-straight portions (e.g., bends or turns) of the overall pipeline 1 so as to ensure the mechanical assembly 200 is capable of traversing through such bends. In situations wherein the overall length of the mechanical assembly 200 exceeds the maximum allowable length based on considerations of the aforementioned minimum or smallest bend radius of the pipeline 1, the first section 202*a*, second section 202*b*, and/or a portion between the first section 202*a* and second section 202*b* (e.g., section 202") may include one or more bendable, pivotable, actuatable, and/or flexible portions configurable to enable the mechanical assembly 200 to traverse through such non-straight portion of the pipeline 1. For example, the first section 202*a* may include a pivotable, actuatable, bendable, and/or flexible portion, such as in the first portion 202*a*' and/or one or more of the second portions 202". As another example, the second section 202*b* may include a pivotable, actuatable, bendable, and/or flexible portion, such as in the first portion 202*b*' and/or one or more of the second portions 202".

Chemical Assembly (e.g., Chemical Assembly 300).

Figure 3A:
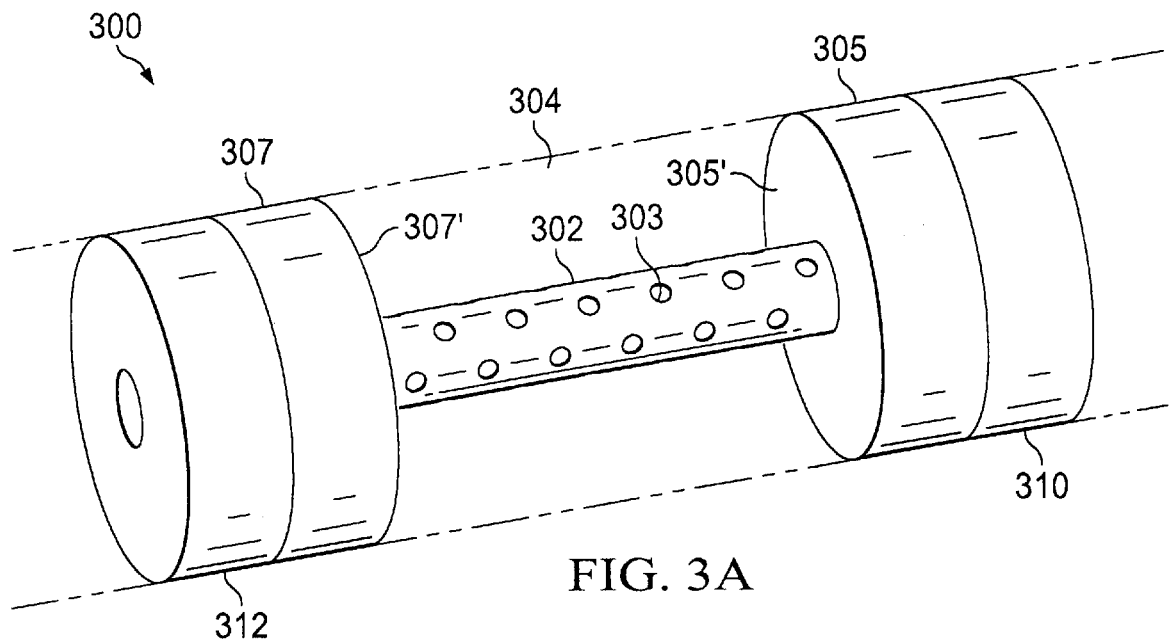
FIG. 3A is a perspective view illustration of an example embodiment of a system having a chemical assembly.
Figure 3D:
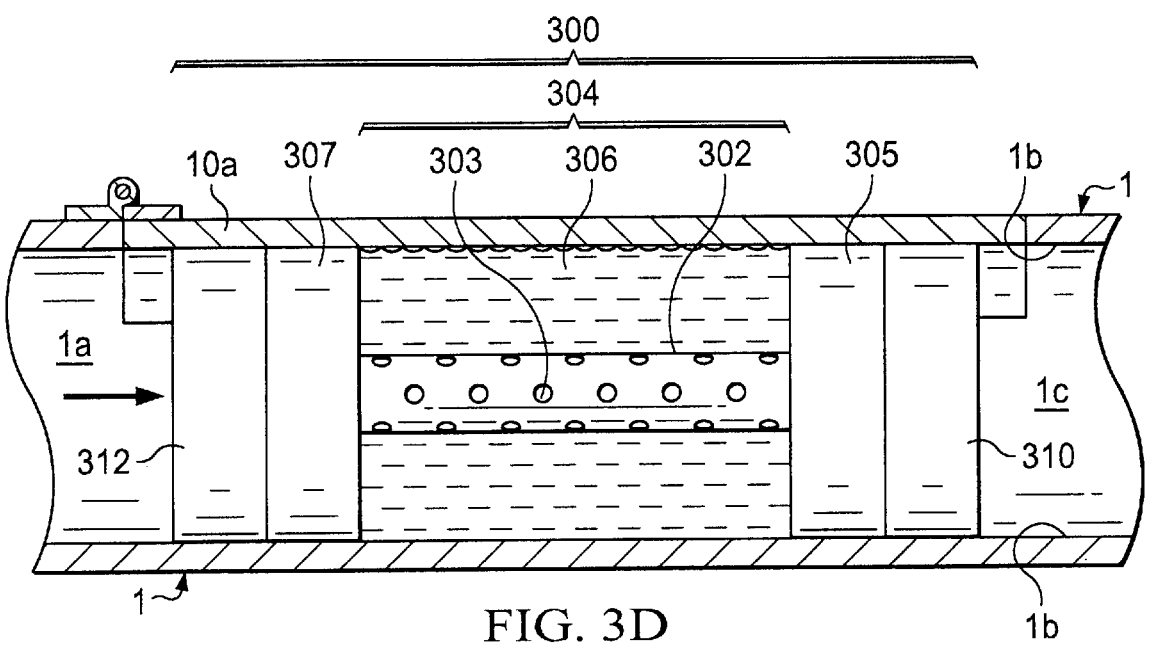
FIG. 3D is another side view illustration of an example embodiment of a system having a chemical assembly housing a removal medium.
Figure 3B:
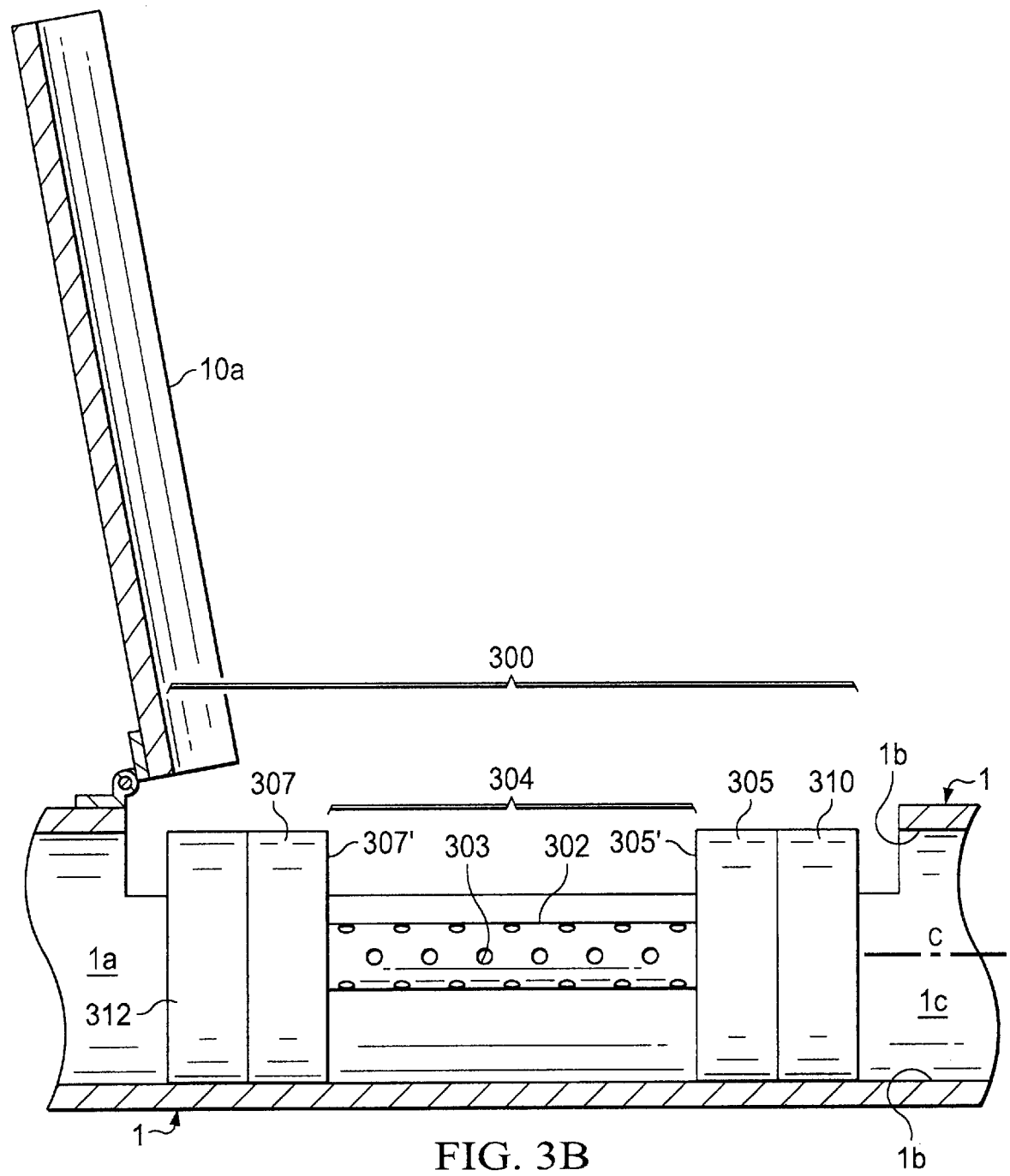
FIG. 3B is a side view illustration of an example embodiment of a system having a chemical assembly inserted into a pipeline.
Figure 3C:
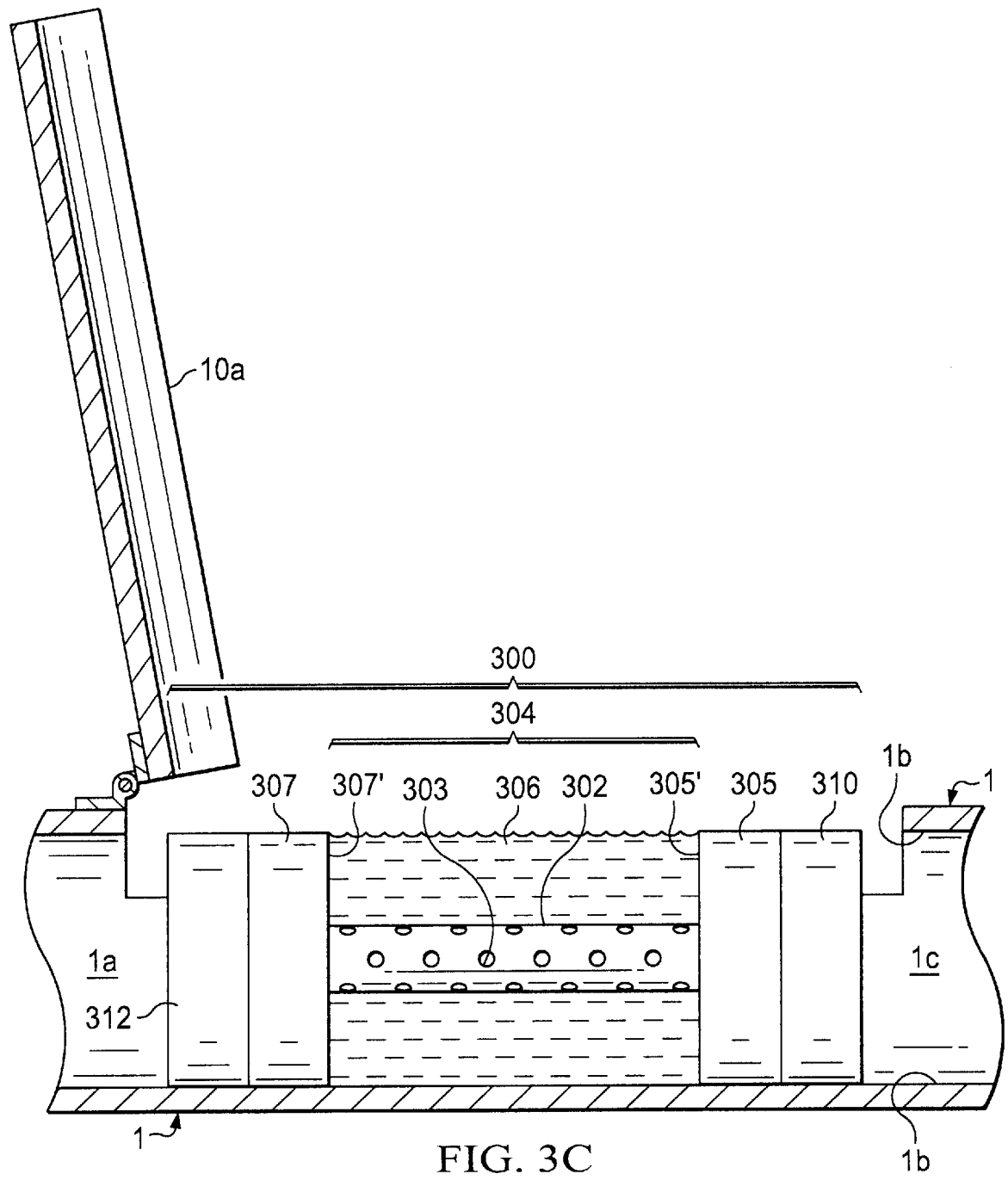
FIG. 3C is a side view illustration of an example embodiment of a system having a chemical assembly housing a removal medium.
Figure 3E:
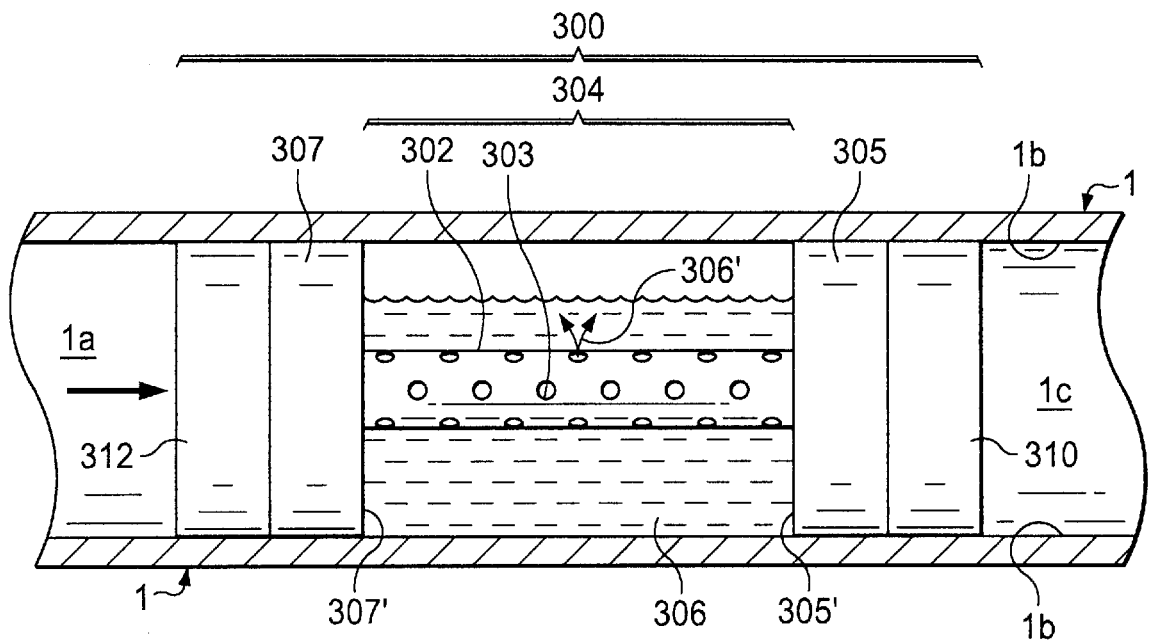
FIG. 3E is another side view illustration of an example embodiment of a system having a chemical assembly housing a removal medium, and some of the removal medium being consumed.

As illustrated in FIG. 3A, the system 100 may also comprise a chemical assembly (e.g., chemical assembly 300). An example embodiment of the chemical assembly 300 may comprise a front section (e.g., front section 305) and a rear section (e.g., rear section 307). The front section 305 may have a cross-sectional portion (e.g., cross-sectional portion 305') configurable or configured to resemble the geometrically-shaped cross-section of the pipeline 1. Similarly, the rear section 307 may have a cross-sectional portion (e.g., cross-sectional portion 307') configurable or configured to resemble and face the cross-sectional portion 305' of the front section 305. The chemical assembly 300 may also comprise a chamber (e.g., chamber 304). The chamber 304 may be formable by a cooperation of the cross-sectional portion 305' of the front section 305, the cross-sectional portion 307' of the rear section 307, and the interior wall 1*b* of the pipeline 1 when the chemical assembly 300 is provided in the pipeline 1. The chemical assembly 300 may be provided into the pipeline 1 in one or more of a plurality of ways, such as using a launcher (e.g., launcher 10, as illustrated in FIG. 1A) or via a door 10*a*, as illustrated in FIG. 1B and FIG. 3B. In example embodiments, the chamber 304 may be operable to receive and substantially house a liquid-based removal medium (e.g., removal medium 306), such as via a pipe (such as a pipe 10*c* in the launcher 10 illustrated in FIG. 1A and/or a pipe 10*d* at another location in the pipeline 1) and/or a door 10*a*, as illustrated in FIG. 3C. For example, the removal medium 306 may include one or more acids, mercury (Hg) stabilizers, scale removal compounds, water-based mixtures, inhibitors, and/or other liquid-based mixtures. FIG. 3D illustrates an example embodiment of the chemical assembly 300 housing the removal medium 306 and ready for transport through the pipeline 1. It is recognized in the present disclosure that, as the chemical assembly 300 is transported through the pipeline 1, a quantity of the housed removal medium 306 may gradually reduce through use on the interior wall 1*b* of the pipeline and/or leakage through the cross-sectional portion 305' and/or cross-sectional portion 307', as illustrated in FIG. 3E.

The chemical assembly 300 may further comprise an elongated mid section (e.g., elongated mid section 302). The elongated mid section 302 may be operable to connect the front section 305 to the rear section 307. In example embodiments, the elongated mid section 302 may include one or more flexible portions operable to enable the chemical assembly 300 to traverse through a non-straight portion of the pipeline 1 (such as a bend or a turn).

In example embodiments, the volume of the chamber 304 may be selectively configurable by selectively adjusting a length of the elongated mid section 302. For example, in situations wherein the quantity (or volume) of the housed removal medium 306 reduces, the volume of the chamber 304 may be selectively configured to reduce accordingly by selectively reducing the length of the elongated mid section 302.

In addition to or alternatively, the volume of the chamber 304 may be selectively configurable by selectively adjusting a volume of the elongated mid section 302 itself. For example, in situations wherein the quantity (e.g., volume) of the housed removal medium 306 reduces, the volume of the chamber 304 may be selectively configured to reduce accordingly by selectively increasing the volume of the elongated mid section 302. For example, at least a portion of the elongated mid section 302 may be inflatable and/or actuatable to reduce the volume of the chamber 304.

In example embodiments, the chemical assembly 300 may be configurable to perform a first monitoring. The first monitoring may be a monitoring of, among other things, a quantity (e.g., volume) of the removal medium 306 currently housed in the chamber 304. The chemical assembly 300 may also be configurable to perform a second monitoring. The second monitoring may be a monitoring of, among other things, a current volume of the chamber 304. In this regard, the elongated mid section 302 may be selectively adjusted, as described above and in the present disclosure, to reduce the volume of the chamber 304 when the first monitoring and/or the second monitoring indicates that the quantity (e.g., volume) of the removal medium 306 currently in the chamber 304 is below the current volume of the chamber 304 by a predetermined threshold value. For example, such a predetermined threshold value may be based on a percentage of the volume of the chamber 304, such as 1-50% of the volume of the chamber 304.

Figure 3F:
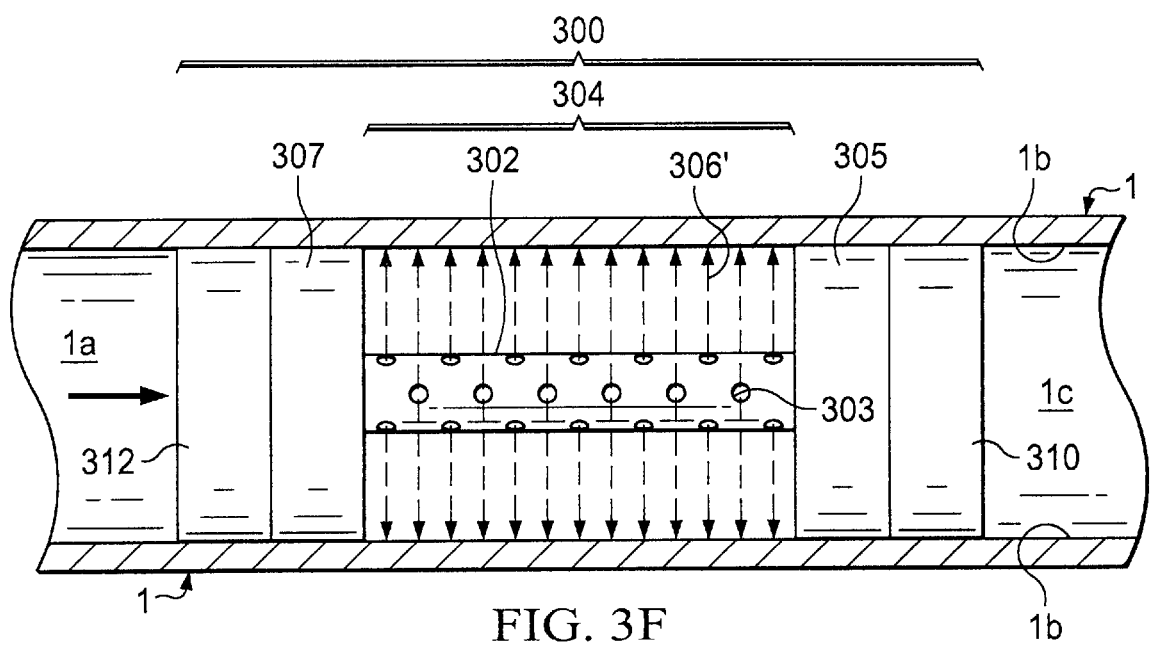
FIG. 3F is another side view illustration of an example embodiment of a system having a chemical assembly with release units releasing removal medium.

In example embodiments, the chemical assembly 300 may further comprise a container unit operable to house a supply of removal medium. The removal medium may include one or more acids, mercury (Hg) stabilizers, scale removal compounds, water-based mixtures, inhibitors, and/or other liquid-based mixtures. The chemical assembly 300 may further comprise one or more release units (e.g., release units 303) connected to, formed in/on, and/or in communication with the container unit. The container unit may be provided in front section 305, rear section 307, section 310, and/or section 312. The one or more release units 303 may be configurable to access the removal medium housed in the container unit and provide at least a portion of the removal medium 306' housed in the container unit to the chamber 304 and/or the interior wall 1*b* of the pipeline 1 via the chamber 304. For example, as illustrated in FIG. 3E, one or more of the release units 303 may be operable to provide removal medium 306' into the chamber 304. As another example, as illustrated in FIG. 3F, one or more of the release units 303 may be operable to provide removal medium 306' and/or other liquid-based mixtures into the chamber 304 and/or directly onto the interior wall 1b of the pipeline 1. For example, the one or more release units 303 may be configurable to provide a high-pressured spray (e.g., a hydroblast) comprising removal medium 306' onto the interior wall 1b of the pipeline. It is recognized in the present disclosure that such applying of removal medium 306' in the form of a high-pressured spray may be operable to cause and/or assist in causing residual mercury (Hg), other toxic substances, and/or a portion of a corroded or scaled outermost layer of the interior wall 1b of the pipeline 1 to be removed from the interior wall 1b of the pipeline 1.

Figure 3G:
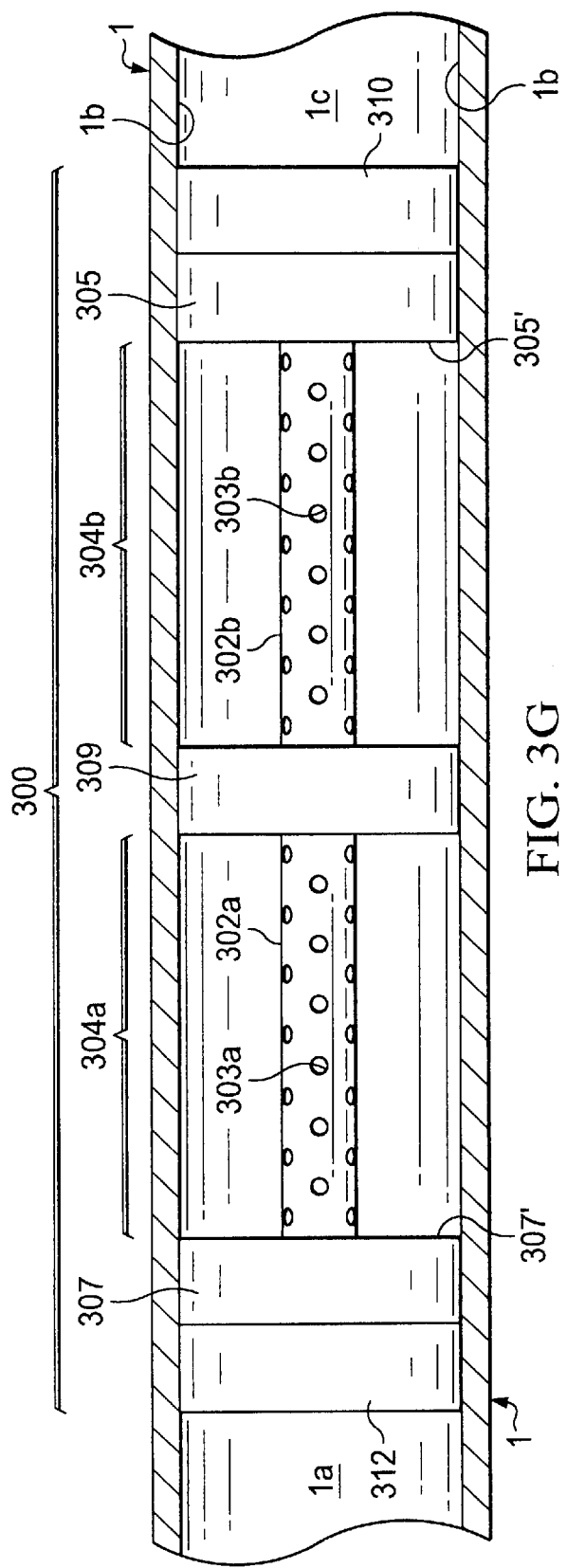
FIG. 3G is a side view illustration of another example embodiment of a system having a chemical assembly with two chambers in a serially in line configuration.

As illustrated in FIG. 3G, the chemical assembly 300 may comprise more than one chamber. For example, the chemical assembly 300 may be formed as two separate chambers 304a and 304b divided by a divider 309, which may include, among other things, a wall, membrane, filter, container, etc. In this regard, the chemical assembly 300 may also include two separate elongated mid sections 302a and 302b, and each elongated mid section 302a and 302b may have its own release units 303a and 303b, respectively, and its own container unit (not shown). Alternatively, the chemical assembly 300 may be formed as a single chamber, which in turn is divided into 2 separate subchambers 304a and 304b by a dividing wall 309. In this regard, the chemical assembly 300 may include one single elongated mid section divided into two sections 302a and 302b, and each section 302a and 302b may have its own release units 303a and 303b, respectively, and a shared container unit (not shown).

In example embodiments, the chemical assembly 300 may be configurable to perform a monitoring a quantity (e.g., volume) of the removal medium 306 currently housed in the chamber 304. In this regard, the one or more release units 303 may be selectively configured, as described above and in the present disclosure, to access the removal medium housed in the container unit and provide at least a portion of the removal medium housed in the container unit to the interior wall 1b of the pipeline 1 via the chamber 304 when the monitoring indicates that the quantity (e.g., volume) of the removal medium present in the chamber 304 is below a predetermined threshold value. For example, such a predetermined threshold value may be based on a percentage of the volume of the chamber 304, such as 50-99%, or more preferably 85-95%, of the volume of the chamber 304. Furthermore, the chemical assembly 300 may be configurable to perform a monitoring of one or more properties of the removal medium 306 within the chamber 304 and/or in the container unit. For example, the chemical assembly 300 may be configurable to monitor pH level, density, color, turbidity, temperature, etc. of the removal medium 306 within the chamber 304 and/or in the container unit.

The chemical assembly 300 may also include section 310 and/or section 312. Section 310 and/or section 312 may be provided so as to perform one or more functions, including, but not limited to, enabling the system 100 to travel through the pipeline 1 and providing stability for the system 100 while within and traveling through the pipeline 1. For example, when the system 100 is provided in a pipeline 1, when it is desired for the system 100 to travel in the direction depicted by imaginary axis C while in the pipeline 1, and when the system 100 is operable to travel via an externally-provided high pressure medium (e.g., gas, liquid, and/or other medium) providable to the section 312 in the direction depicted by imaginary axis C, section 312 may be operable to receive the high pressured medium and cause the system 100 to travel through the pipeline 1 accordingly. In addition to or alternatively, the system 100 may travel through the pipeline 1 via other mechanisms, including those described above and in the present disclosure. When traveling through the pipeline 1, the system 100 may then perform, among other things, the treating of the interior wall 1b of the pipeline 1 via the chemical assembly 300. The section 310 may be similarly used when it is desired for the system 100 to travel through the pipeline 1 in an opposite direction to the direction depicted by imaginary axis C. In addition to or alternatively, the section 310 may be used to assist in controlling the movement and/or position of the system 100 in the pipeline 1, such as by selectively controlling high pressured medium present on both ends of the system 100.

The chemical assembly 300 may also include a controller (not shown), and the controller may be housed, either in part or in whole, in the front section 305, the rear section 307, section 310, section 312, and/or other parts of the system 100. The controller may be configurable to also communicate with a storage medium (memory) to store information gathered, such as performance parameters, consumption of removal medium (if any, such as an average, maximum, minimum, distribution over time, distribution based on location and/or distance travelled, etc.), volume of the chamber, volume of the removal medium, consumption of removal medium from container unit (if provided), etc.

In respect to the dimensions of the chemical assembly 300, a largest dimension of the cross-sectional portions 305' and 307' may be more than, equal to, or less than the radius of the pipeline 1. For example, in situations wherein the cross-sectional portions 305' and 307' include a flexible outer perimeter portion, or the like, the said dimension may be more than or equal to the radius of the pipeline 1. A dimension between ends 310 and 312 (i.e., overall length) may be selected based on, among other things, the minimum or smallest bend radius found in the non-straight portions (e.g., bends or turns) of the overall pipeline 1 so as to ensure the chemical assembly 200 is capable of traversing through such bends. In situations wherein the overall length of the chemical assembly 300 exceeds the maximum allowable length based on considerations of the aforementioned minimum or smallest bend radius of the pipeline 1, the elongated mid section 302 may include one or more bendable, pivotable, actuatable, and/or flexible portions configurable to enable the chemical assembly 300 to traverse through such non-straight portion of the pipeline 1.

Sampling Assembly (E.G., Sampling Assembly 400).

Figure 4A:
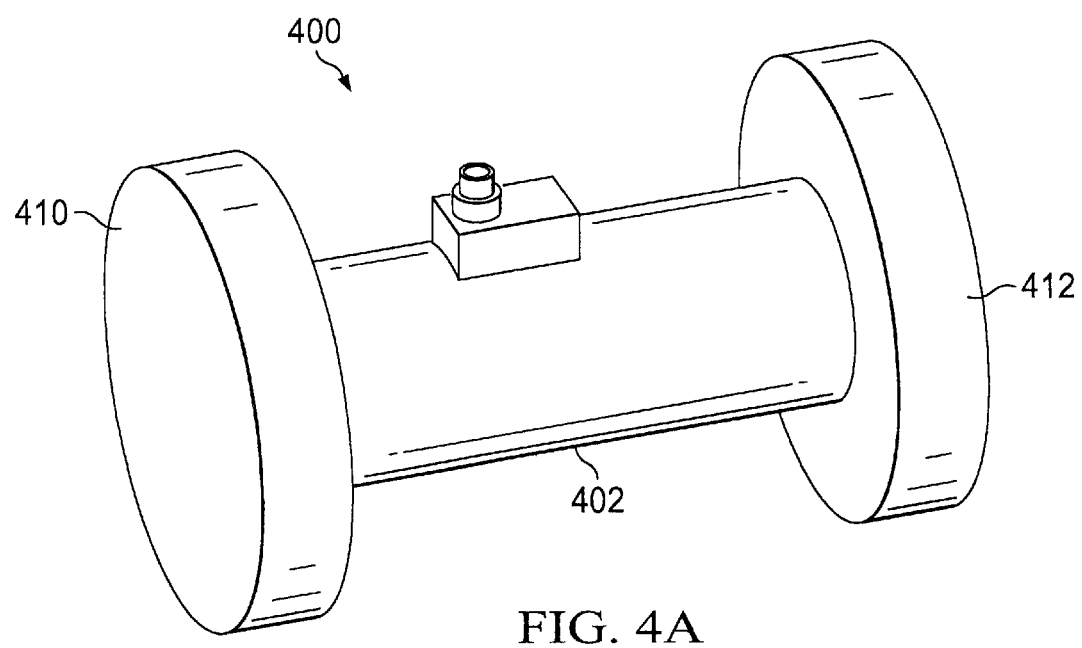
FIG. 4A is a perspective view illustration of an example embodiment of a system having a sampling assembly.

As illustrated in FIG. 4A, the system 100 may also comprise a sampling assembly (e.g., sampling assembly 400). An example embodiment of the sampling assembly 400 may comprise a main body (e.g., main body 402). The main body 402 may comprise and/or be in communication with section 410 and/or 412, and may be configurable to traverse through the pipeline 1. The main body 402 may also correspond to or be in communication with the main body of one or more of the systems 100, 200, 300, 500 described above and in the present disclosure. For example, the sampling assembly 400 may be integrated or incorporated with one or more of the systems 100, 200, 300, 500 described above and in the present disclosure. In addition to or alternatively, the sampling assembly 400 may be attachable or attached to one or more of the systems 100, 200, 300, 500 described above and in the present disclosure, such as an attachment in a serially in line arrangement. In addition to or alternatively, the sampling assembly 400 may be a standalone system operable to function separately and/or independently from one of the systems 100, 200, 300, 500. For example, the sampling assembly 400 may be provided to travel through the pipeline 1 to perform one or more sampling actions in the pipeline 1 before and/or after the one or more of the systems 100, 200, 300, 500 are provided in the pipeline 1 to perform the treating of the pipeline 1.

Figure 4B:
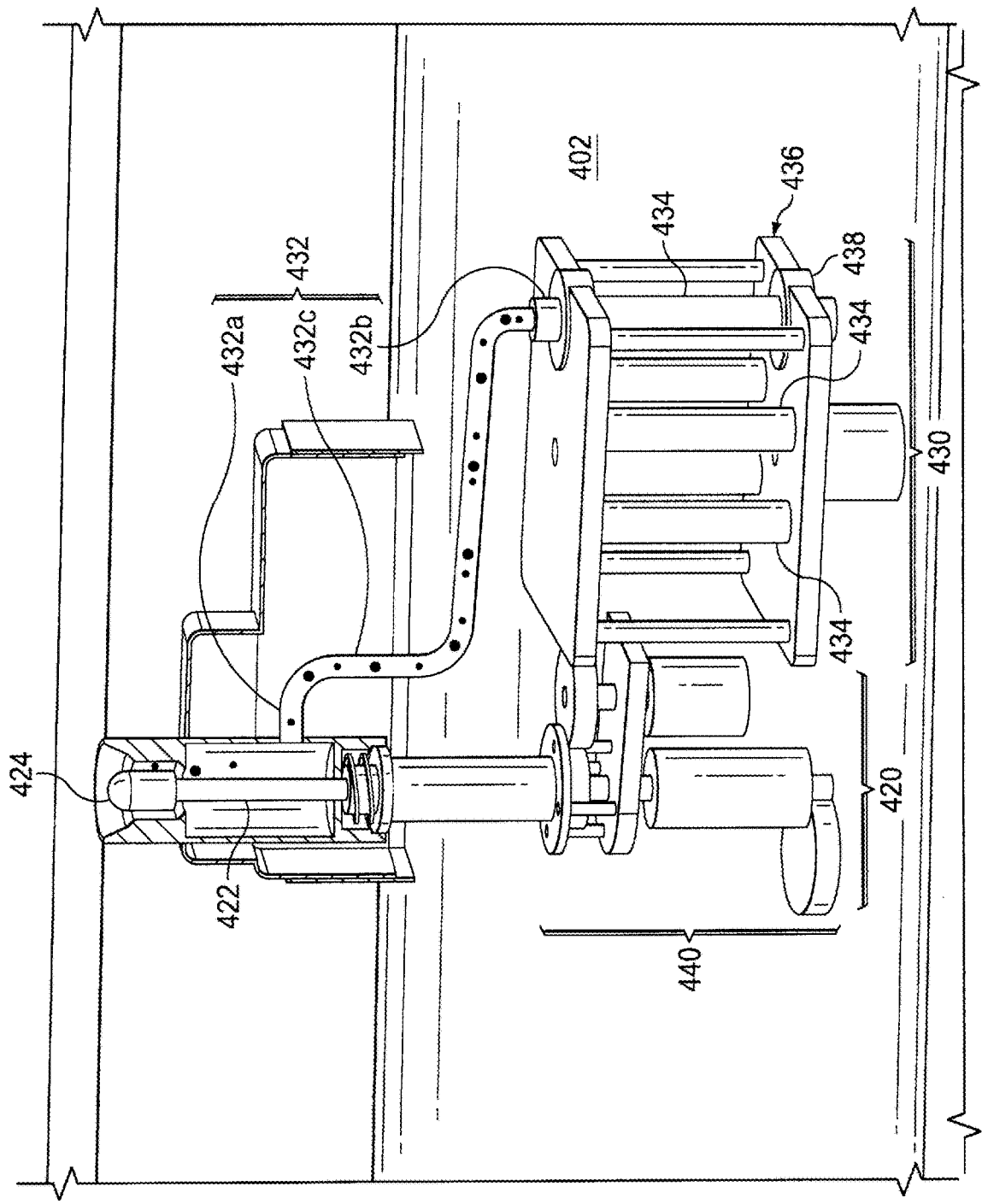
FIG. 4B is a perspective view illustration of an example embodiment of a system having a sampling assembly.

As illustrated in FIG. 4B, the sampling assembly 400 may include a sample extraction subsystem 420. The sample extraction subsystem 420 may be securable or secured to the main body 402 (or main body 202, 302, or 502). The sample extraction subsystem 420 may include a sample extraction body 422 and an end effector 424, or the like, attachable or attached to the sample extraction body 422.

The sample extraction body 422 may be configurable to control a movement and/or position of the end effector 424. For example, the sample extraction body 422 may be configurable to control the end effector 424 to move outwardly away from the main body 402 and towards the interior wall 1b of the pipeline 1, which may enable the end effector 424 to collect a sample of the interior wall 1b of the pipeline. The sample extraction body 422 may also be configurable to control the end effector 424 to move inwardly towards the main body 402 (and/or other element of the sampling assembly 400, such as the sample containment subsystem 430), which may enable the end effector 424 to provide a sample collected by the end effector 424 to the sample containment subsystem 430.

The sample extraction body 422 may be formed as any body configurable to control the position and/or movement of the end effector 424, and may include one or more portions that are retractable, extendible, pivotable, rotatable, bendable, and/or actuatable in other ways. For example, as illustrated in FIG. 4B, the sample extraction body 422 may be configurable to extend and retract. The sample extraction subsystem 420 may also include other elements operable to support the sample extraction body 422 and/or end effector 424 including, but not limited to, a controller and/or power supply (e.g., controller and/or power supply 440), gear systems, springs, etc. The controller may be configurable to also communicate with a storage medium (memory) to store information gathered, such as performance parameters, sampling locations within the pipeline 1, sample sizes (such as an average, maximum, minimum, distribution over time, distribution based on location and/or distance travelled, etc.), etc.

The end effector 424 may be any instrument or device configurable to obtain a sample of an interior wall 1b of the pipeline. The end effector 424 may include, but is not limited to including, a gripper, cutter, scooper, scraper, driller, grinder, and/or laser emitting device. The end effector 424 may also include one or more portions configurable to retract, extend, pivot, rotate, bend, and/or actuate in other ways so as to move and/or position an end portion of the end effector 424 relative to the interior wall 1b of the pipeline 1.

The sampling assembly 400 may also include a sample containment subsystem 430. The sample containment subsystem 430 may be securable or secured to the main body 402. The sample containment subsystem 430 may comprise an input section 432 in communication with the sample extraction subsystem 420. The input section 432 may be configurable to receive samples obtained by the sample extraction subsystem 420 (e.g., by the end effector 424). The input section 432 may also be configurable to provide the received samples into one or more sample containment sections 434. As illustrated in FIG. 4B, the input section 432 may include a portion 432a for receiving the sample from the sample extraction subsystem 420, as well as a portion 432b for providing the received sample to the sample containment subsystem 430. The input section 432 may also include a channel 432c, or the like, for transporting the samples between portion 432a and 432b. It is to be understood in the present disclosure that the portions 432a and 432b may be the same opening and the input section 432 may not include channel 432c without departing from the teachings of the present disclosure.

The sample containment subsystem 430 may also comprise one or more sample containment sections 434, as illustrated in FIG. 4B. Each sample containment section 434 may be operable to store samples obtained by the sample extraction subsystem 420 (e.g., by the end effector 424). For example, the sample containment subsystem 430 may comprise between about 1 to 100 sample containment sections 434, or more or less. Each sample containment section 434 may also include a drainage section (not shown), such as a drain or filter, which may enable the removal of undesired elements from the collected and stored samples, such as liquids. Selection of the number of sample containment sections 434 may be based on, among other things, the number of desired samples to obtain, the length of the pipeline 1, etc.

The sample containment subsystem 430 may also include a sample containment section selection mechanism 436. The sample containment section selection mechanism 436 may be in communication with the one or more sample containment sections 434. More specifically, the sample containment section selection mechanism 436 may be operable to securely hold each of the sample containment sections 434. Furthermore, the sample containment section selection mechanism 436 may be configurable to select one or more sample containment sections 434 for receiving an extracted sample. For example, as illustrated in FIG. 4B, the sample containment section selection mechanism 436 may be configurable to move one or more sample containment sections 434 to a location near to or attached to the input section 432 so as to receive the extracted sample. Similarly, the sample containment section selection mechanism 436 may be configurable to move one or more sample containment sections 434 away from a location near to or attached to the input section 432 so as to allow a desired sample containment section 434 to be near to or attached to the input section 432. The sample containment section selection mechanism 436 may be configured in any form or structure, such as a turn-table format, conveyor-belt type format, lift-place-and-return type format, etc. The sample containment section selection mechanism 436 may also include a drainage section 438, which may include a filter, pump, or the like, for removing undesired elements from the sample, such as liquids.

The sample containment subsystem 430 may also include other elements operable to support the storage and arrangement of received/extracted samples including, but not limited to, a controller and/or power supply (e.g., controller and/or power supply 440), gear systems, springs, etc. In an example embodiment, the controller may be configurable to identify, keep track of, and/or estimate a location in and/or distance travelled through the pipeline 1, and also communicate with a storage medium (memory) to store information gathered. The controller may also be configurable to identify a location in respect of which a sample is obtained by the sample extraction subsystem 420 and/or a characteristic or property of the obtained sample. For example, the controller may be configurable to correlate, identify, and/or correspond the origin/extracted location of each sample contained in each sample containment section 434. As another example, the controller may be configurable to determine a size, volume, weight, density, and/or other characteristic or property of the obtained sample. It is recognized in the present disclosure that such identifying of the origin or extraction location of a contaminated sample (i.e., a sample having a high or unacceptable amount of mercury (Hg) and/or toxic substances) may enable an operator to configure one or more of the systems 100, 200, 300, and/or 500 to subsequently perform further treatment of that particular identified location. The controller may be configurable to also communicate with a storage medium (memory) to store the information gathered.

The sampling assembly 400 may also include an orientation control subsystem (not shown) operable to control and/or regulate an orientation of the sampling assembly 400 relative to the pipeline 1. For example, the orientation control subsystem may include a gyroscope for measuring a deviation of orientation from a predetermined position, a weighted portion operable to encourage the sampling assembly 400 to remain or return to a predetermined position, a motor for driving one or more portions of the sampling assembly 400 (such as the sample extraction subsystem 420 or end effector 424) to change its orientation, position, and/or location relative to another portion of the sampling assembly 400 (such as an end 410 and/or 412), or the like.

The sampling assembly 400 may also include a sample activation subsystem (not shown) operable to control when the sampling assembly 400 is to extract a sample and/or when the sampling assembly 400 is to not extract a sample. For example, the sample activation subsystem may be operable to control the sampling assembly 400 to not extract a sample when the sampling assembly 400 is detected to be moving (e.g., being driven by an externally provided high pressure medium, as described above and in the present disclosure), to have a change in speed, to have a change in location, or the like. Similarly, the sample activation subsystem may be operable to control the sample assembly 400 to extract a sample when the sampling assembly 400 is detected to be stationary (i.e., not moving), to have no change in location, or the like.

In respect to section 410 and section 412, section 410 and/or section 412 may be provided so as to perform one or more functions, including, but not limited to, enabling the system 100 to travel through the pipeline 1 and providing stability for the system 100 while within and traveling through the pipeline 1. For example, when the system 100 is provided in a pipeline 1, when it is desired for the system 100 to travel in the direction depicted by imaginary axis C while in the pipeline 1, and when the system 100 is operable to travel via an externally-provided high pressure medium (e.g., gas, liquid, and/or other medium) providable to the section 412 in the direction depicted by imaginary axis C, section 412 may be operable to receive the high pressured medium and cause the system 100 to travel through the pipeline 1 accordingly. In addition to or alternatively, the system 100 may travel through the pipeline 1 via other mechanisms, including those described above and in the present disclosure. When traveling through the pipeline 1, the system 100 may then perform, among other things, sampling of the interior wall 1b of the pipeline 1 via the sampling assembly 400. The section 410 may be similarly used when it is desired for the system 100 to travel through the pipeline 1 in an opposite direction to the direction depicted by imaginary axis C. In addition to or alternatively, the section 410 may be used to assist in controlling the movement and/or position of the system 100 in the pipeline 1, such as by selectively controlling high pressured medium present on both ends of the system 100. In addition to or alternatively, the sampling assembly 400 may further comprise one or more mechanical movement assemblies (not shown) configurable to provide movement, stopping, and/or anchoring of the sampling assembly 400 relative a portion of the interior wall 1b of the pipeline 1.

Measuring Assembly (e.g., Measuring Assembly 500).

Figure 5:
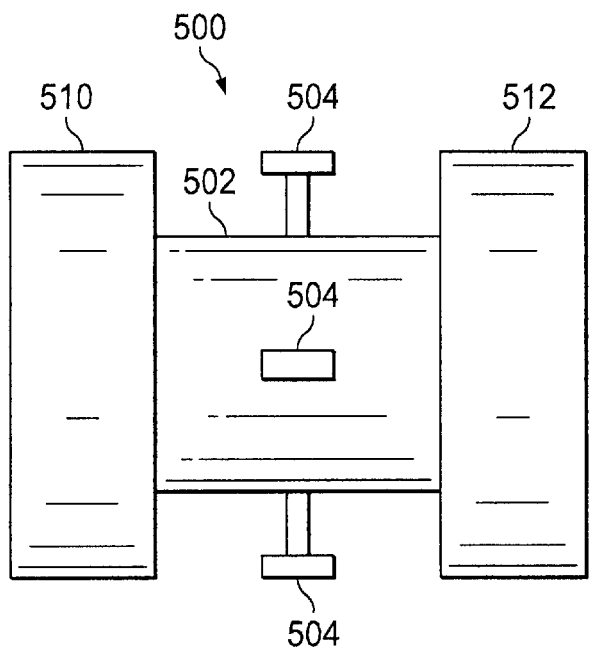
FIG. 5 is a perspective view illustration of an example embodiment of a system having a measuring assembly.

As illustrated in FIG. 5, the system 100 may also comprise a measuring assembly (e.g., measuring assembly 500). An example embodiment of the measuring assembly 500 may comprise a main body (e.g., main body 502). The main body 502 may comprise and/or be in communication with section 510 and/or 512, and may be configurable to traverse through the pipeline 1. The main body 502 may also correspond to or be in communication with the main body of one or more of the systems 100, 200, 300, 400 described above and in the present disclosure. For example, the measuring assembly 500 may be integrated or incorporated with one or more of the systems 100, 200, 300, 400 described above and in the present disclosure. In addition to or alternatively, the measuring assembly 500 may be attachable or attached to one or more of the systems 100, 200, 300, 400 described above and in the present disclosure, such as an attachment in a serially in line arrangement. In addition to or alternatively, the measuring assembly 500 may be a standalone system operable to function separately and/or independently from the one systems 100, 200, 300, 400. For example, the measuring assembly 500 may be provided to travel through the pipeline 1 to perform one or more sampling actions in the pipeline 1 before and/or after the one or more of the systems 100, 200, 300, 400 are provided to travel through the pipeline 1 to perform the treating of the pipeline 1.

As illustrated in FIG. 5, the measuring assembly 500 may include a measuring subsystem 504. The measuring subsystem 504 may be securable or secured to the main body 502. The measuring subsystem 504 may include or be any instrument and/or device configurable to measure a presence and/or quantity of a substance, such as mercury (Hg) and/or other toxic chemicals, in the interior wall 1b of the pipeline 1. For example, the measuring subsystem 504 may include one or more X-Ray Fluorescence (XRF) sensors, or the like, secured to and provided around the main body 502.

The measuring assembly 500 may also include other elements operable to support the storage and arrangement of received/extracted samples including, but not limited to, a controller and/or power supply (not shown), gear systems, springs, etc. In an example embodiment, the controller may be configurable to identify, keep track of, and/or estimate a location in and/or distance travelled through the pipeline 1, and also communicate with a storage medium (memory) to store information gathered. The controller may also be configurable to identify a location in respect of which a measurement is obtained by the measuring assembly 500. In this regard, the controller may be configurable to correlate, identify, and/or correspond each measurement with the origin/measurement location. It is recognized in the present disclosure that such identifying of the location of a measurement indicating a contamination (i.e., a measurement indicating a high or unacceptable amount of mercury (Hg) and/or toxic substances) may enable an operator to configure one or more of the systems 100, 200, 300, and/or 400 to subsequently perform further treatment of that particular identified location.

In respect to section 510 and section 512, section 510 and/or section 512 may be provided so as to perform one or more functions, including, but not limited to, enabling the system 100 to travel through the pipeline 1 and providing stability for the system 100 while within and traveling through the pipeline 1. For example, when the system 100 is provided in a pipeline 1, when it is desired for the system 100 to travel in the direction depicted by imaginary axis C while in the pipeline 1, and when the system 100 is operable to travel via an externally-provided high pressure medium (e.g., gas, liquid, and/or other medium) providable to the section 512 in the direction depicted by imaginary axis C, section 512 may be operable to receive the high pressured medium and cause the system 100 to travel through the pipeline 1 accordingly. In addition to or alternatively, the system 100 may travel through the pipeline 1 via other mechanisms, including those described above and in the present disclosure. When traveling through the pipeline 1, the system 100 may then perform, among other things, a measurement of the interior wall 1b of the pipeline 1 via the sampling assembly 400. The section 510 may be similarly used when it is desired for the system 100 to travel through the pipeline 1 in an opposite direction to the direction depicted by imaginary axis C. In addition to or alternatively, the section 510 may be used to assist in controlling the movement and/or position of the system 100 in the pipeline 1, such as by selectively controlling high pressured medium present on both ends of the system 100. In addition to or alternatively, the measuring assembly 500 may further comprise one or more mechanical movement assemblies (not shown) configurable to provide movement, stopping, and/or anchoring of the measuring assembly 500 relative a portion of the interior wall 1b of the pipeline 1.

Example Embodiments of the System (e.g., System 100)

The system (e.g., system 100) for use in performing an action to an interior wall 1b of a pipeline 1 may be configured in one or more of a plurality of ways. Example embodiments of the system 100 will now be described below and with reference to the accompanying figures.

Example 9—Example Embodiment of a System (e.g., System 100) Having a Standalone Subsystem Example embodiments of the system 100 may include a standalone mechanical assembly 200. For example, the standalone mechanical assembly 200 may be configured as described above and illustrated in FIGS. 2A-O. Alternatively, the system 100 may include a standalone system comprising a chemical assembly 300. For example, the standalone chemical assembly 300 may be configured as described above and illustrated in FIGS. 3A-G. Alternatively, the system 100 may include a standalone system comprising a sampling assembly 400. For example, the standalone sampling assembly 400 may be configured as described above and illustrated in FIGS. 4A and 4B. Alternatively, the system 100 may include a standalone system comprising a measuring assembly 500. For example, the standalone measuring assembly 500 may be configured as described above and illustrated in FIG. 5.

Figure 6A:
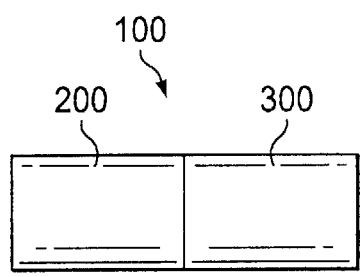
FIG. 6A is a simplified illustration of an example embodiment of a system having a mechanical assembly and a chemical assembly.

Example 10—Example Embodiment of a System (e.g., System 100) Having Two Subsystems Example embodiments of the system 100 may include a mechanical assembly 200 and a chemical assembly 300 arranged serially in line with and secured/attached to one another. For example, as illustrated in FIG. 6A, the system 100 may be configured in such a way that the mechanical assembly 200 is provided in front (or behind) of the chemical assembly 300.

Alternatively, when the system 100 is configured to comprise two sets of contact members (e.g., first set of contact members 204a and second set of contact members 204b, as illustrated in FIGS. 2C, 2G, 2J, and/or 2N), each set of contact members may be considered as a separate mechanical assembly 200 (e.g., first set of contact members 204a is a first mechanical assembly and second set of contact members 204b is a second mechanical assembly). In such a configuration, the system 100 includes a first mechanical assembly 200 and a second mechanical assembly 200 arranged serially in line with and secured to one another. It is to be understood in the present disclosure that, in such a configuration, the first mechanical assembly 200 may or may not be the same as the second mechanical assembly 200.

For example, the first and second mechanical assemblies 200 may both be substantially the same as the mechanical assembly illustrated in FIG. 2A. In example embodiments wherein the contact members 204 of such first and second mechanical assemblies 200 are configured to rotate relative to the main body 202 (or central axis C), the contact members 204 of the first mechanical assembly 200 may be configured to rotate in a direction (e.g., direction X) opposite to the rotation direction (e.g., direction Y) of the contact members 204 of the second mechanical assembly 200. Alternatively, the contact members 204 of such first and second mechanical assemblies 200 may be configured to rotate in the same direction. As another example, the first and second mechanical assemblies 200 may both be substantially the same as the mechanical assembly illustrated in FIG. 2C (or FIG. 2D or FIG. 2E or FIG. 2G or FIG. 2H or FIG. 2J or FIG. 2K or FIG. 2N). In example embodiments wherein the contact members 204 (and/or contact regions 206) of such first and second mechanical assemblies 200 are configured to rotate relative to the main body 202 (or central axis C, an axis of the contact member, and/or an axis described above and in the present disclosure), their respective rotations may be in opposite directions in a similar manner described above. Alternatively, the contact members 204 (and/or contact regions 206) of such first and second mechanical assemblies 200 may be configured to rotate in the same direction.

As another example, the first mechanical assembly 200 may be the example embodiment illustrated in FIG. 2A and the second mechanical assembly 200 may be the example embodiment illustrated in FIG. 2C (or FIG. 2D or FIG. 2E or FIG. 2G or FIG. 2H or FIG. 2J or FIG. 2K or FIG. 2N). Alternatively, the first mechanical assembly 200 may also be the example embodiment illustrated in FIG. 2C and the second mechanical assembly 200 may be the example embodiment illustrated in FIG. 2D (or FIG. 2A or FIG. 2E or FIG. 2G or FIG. 2H or FIG. 2J or FIG. 2K or FIG. 2N). Alternatively, the first mechanical assembly 200 may also be the example embodiment illustrated in FIG. 2D and the second mechanical assembly 200 may be the example embodiment illustrated in FIG. 2E (or FIG. 2A or FIG. 2C or FIG. 2G or FIG. 2H or FIG. 2J or FIG. 2K or FIG. 2N). Alternatively, the first mechanical assembly 200 may also be the example embodiment illustrated in FIG. 2E and the second mechanical assembly 200 may be the example embodiment illustrated in FIG. 2G (or FIG. 2A or FIG. 2C or FIG. 2D or FIG. 2H or FIG. 2J or FIG. 2K or FIG. 2N). Alternatively, the first mechanical assembly 200 may also be the example embodiment illustrated in FIG. 2G and the second mechanical assembly 200 may be the example embodiment illustrated in FIG. 2H (or FIG. 2A or FIG. 2C or FIG. 2D or FIG. 2E or FIG. 2J or FIG. 2K or FIG. 2N). Alternatively, the first mechanical assembly 200 may also be the example embodiment illustrated in FIG. 2I4 and the second mechanical assembly 200 may be the example embodiment illustrated in FIG. 2J (or FIG. 2A or FIG. 2C or FIG. 2D or FIG. 2E or FIG. 2G or FIG. 2K or FIG. 2N). Alternatively, the first mechanical assembly 200 may also be the example embodiment illustrated in FIG. 2J and the second mechanical assembly 200 may be the example embodiment illustrated in FIG. 2K (or FIG. 2A or FIG. 2C or FIG. 2D or FIG. 2E or FIG. 2G or FIG. 2I1 or FIG. 2N). Alternatively, the first mechanical assembly 200 may also be the example embodiment illustrated in FIG. 2K and the second mechanical assembly 200 may be the example embodiment illustrated in FIG. 2N (or FIG. 2A or FIG. 2C or FIG. 2D or FIG. 2E or FIG. 2G or FIG. 2I1 or FIG. 2J). In example embodiments wherein the contact members (and/or contact regions 206) of the aforementioned first and second mechanical assemblies 200 are configured to rotate relative to the main body 202 (or central axis C, an axis of the contact member, and/or an axis described above and in the present disclosure), their respective rotations may be in opposite directions in a similar manner described above. Alternatively, the contact members 204 (and/or contact regions 206) of such first and second mechanical assemblies 200 may be configured to rotate in the same direction.

Example embodiments of the system 100 may also be configured to comprise a first chemical assembly 300 and a second chemical assembly 300 arranged serially in line with and secured to one another, as illustrated in FIG. 3G. For example, when the system 100 is configured to comprise two chambers (e.g., first chamber 304a and second chamber 304b), each chamber may be considered as a part of a separate chemical assembly 300 (e.g., first chamber 304a is a part of the first mechanical assembly and second chamber 304b is a part of the second mechanical assembly). In such a configuration, the system 100 includes a first chemical assembly 300 and a second chemical assembly 300 arranged serially in line with and secured to one another. It is to be understood in the present disclosure that, in such a configuration, the removal medium 306 provided in the first chemical assembly 300 may or may not be the same as the removal medium 306 provided in the second chemical assembly 300.

Example embodiments of the system 100 may also be configured to comprise a sampling assembly 400 secured/attached in a serially in line arrangement with a chemical assembly 300, mechanical assembly 200, measuring assembly 500, or another sampling assembly 400. Alternatively, example embodiments of the system 100 may also be configured to comprise a measuring assembly 500 secured/attached in a serially in line arrangement with a chemical assembly 300, mechanical assembly 200, or another measuring assembly 500.

It is to be understood in the present disclosure that in the example embodiments described above and in this Example 10 where the system 100 includes two subsystems, the two subsystems may be configured to share (or not share) one or more elements of the system 100. For example, the system 100 may comprise a single controller and a single storage medium (memory), or each subsystem may comprise its own controller and/or storage medium (memory). As another example, the system 100 may comprise a single end portion (210, 310, 410, or 510) and a single end portion (212, 312, 412, or 512), or each subsystem may comprise its own single end portion (210, 310, 410, or 510) and/or a single end portion (212, 312, 412, or 512). As another example, the system 100 may comprise a single common main body (202, 302, 402, or 502), or each subsystem may comprise its own main body (202, 302, 402, or 502). As another example, the system 100 may comprise a single power source, or each subsystem may comprise its own power source. As another example, when the system comprises one or more chemical assemblies 300, the system 100 may comprise a single container unit, or each subsystem may comprise its own container unit.

In respect to the dimensions of a system 100 having two subsystems/assemblies, as described in this Example 10 and in the present disclosure, a dimension between the two ends of the system 100 (i.e., overall length) may be selected based on, among other things, the minimum or smallest bend radius found in the non-straight portions (e.g., bends or turns) of the overall pipeline 1 so as to ensure the system 100 is capable of traversing through such bends. In situations wherein the overall length of the system 100 exceeds the maximum allowable length based on considerations of the aforementioned minimum or smallest bend radius of the pipeline 1, the securing/attaching portion between the two subsystems/assemblies may include one or more bendable, pivotable, actuatable, and/or flexible portions configurable to enable the system 100 to traverse through such non-straight portion of the pipeline 1. In addition to or alternatively, one or both of the subsystems/assemblies may include one or more bendable, pivotable, actuatable, and/or flexible portions, as described above and in the present disclosure.

Figure 6B:
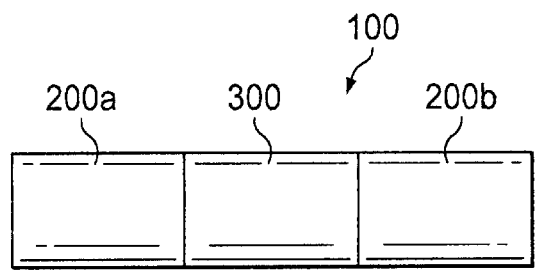
FIG. 6B is a simplified illustration of an example embodiment of a system having a first mechanical assembly, a chemical assembly, and a second mechanical assembly.
Figure 6C:
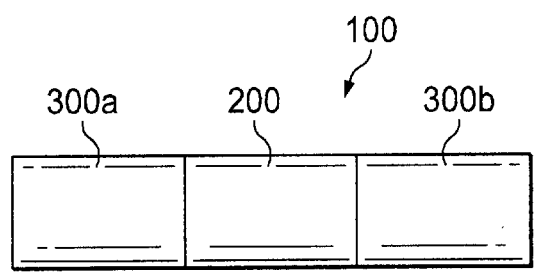
FIG. 6C is a simplified illustration of an example embodiment of a system having a first chemical assembly, a mechanical assembly, and a second chemical assembly.

Example 11—Example Embodiment of a System (e.g., System 100) Having Three Subsystems As illustrated in FIGS. 6B and 6C, the system 100 may include an example embodiment described above in Example 10 (i.e., two subsystems secured/attached in a serially in line configuration) secured/attached to a mechanical assembly 200, chemical assembly 300, sampling assembly 400, or measuring assembly 500.

For example, as illustrated in FIG. 6B, the system 100 may include a first mechanical assembly 200a and a chemical assembly 300 arranged serially in line with and secured to one another, and a second mechanical assembly 200b arranged serially in line with and secured to the chemical assembly 300. Alternatively, as illustrated in FIG. 6C, the system 100 may include a first chemical assembly 300a and a mechanical assembly 200 arranged serially in line with and secured to one another, and a second chemical assembly 300b arranged serially in line with and secured to the mechanical assembly 200. Alternatively, the system 100 may include a first mechanical assembly 200a and a second mechanical assembly 200b arranged serially in line with and secured to one another, and a chemical assembly 300 arranged serially in line with and secured to the second mechanical assembly 200b. Alternatively, the system 100 may include a first chemical assembly 300a and a second chemical assembly 300b arranged serially in line with and secured to one another, and a mechanical assembly 200 arranged serially in line with and secured to the second chemical assembly 300b.

It is to be understood in the present disclosure that in the example embodiments described above and in this Example 11 where the system 100 includes three subsystems, the three subsystems may be configured to share (or not share) one or more elements of the system 100. For example, the system 100 may comprise a single controller and a single storage medium (memory), or one or more of the subsystems may comprise its own controller and/or storage medium (memory). As another example, the system 100 may comprise a single end portion (210, 310, 410, or 510) and a single end portion (212, 312, 412, or 512), or one or more of the subsystems may comprise its own single end portion (210, 310, 410, or 510) and/or a single end portion (212, 312, 412, or 512). As another example, the system 100 may comprise a single common main body (202, 302, 402, or 502), or one or more of the subsystems may comprise its own main body (202, 302, 402, or 502). As another example, the system 100 may comprise a single power source, or each subsystem may comprise its own power source. As another example, when the system comprises one or more chemical assemblies 300, the system 100 may comprise a single container unit, or each subsystem may comprise its own container unit.

In respect to the dimensions of a system 100 having three subsystems/assemblies, as described in this Example 11 and in the present disclosure, a dimension between the two ends of the system 100 (i.e., overall length) may be selected based on, among other things, the minimum or smallest bend radius found in the non-straight portions (e.g., bends or turns) of the overall pipeline 1 so as to ensure the system 100 is capable of traversing through such bends. In situations wherein the overall length of the system 100 exceeds the maximum allowable length based on considerations of the aforementioned minimum or smallest bend radius of the pipeline 1, one or both of the securing/attaching portion between the three subsystems/assemblies may include one or more bendable, pivotable, actuatable, and/or flexible portions configurable to enable the system 100 to traverse through such non-straight portion of the pipeline 1. In addition to or alternatively, one or more of the subsystems/assemblies may include one or more bendable, pivotable, actuatable, and/or flexible portions, as described above and in the present disclosure.

Example 12—Example Embodiment of a System (e.g., System 100) Having Four or More Subsystems As illustrated in FIGS. 6D-G, the system 100 may include an example embodiment described above in Example 10 (i.e., two subsystems secured/attached in a serially in line configuration) secured/attached to one or more example embodiments described above in Example 10 (i.e., two subsystems secured/attached in a serially in line configuration). Alternatively, the system 100 may include an example embodiment described above in Example 11 (i.e., three subsystems secured/attached in a serially in line configuration) secured/attached to one or more mechanical assemblies 200, chemical assemblies 300, sampling assemblies 400, and/or measuring assemblies 500.

Figure 6D:
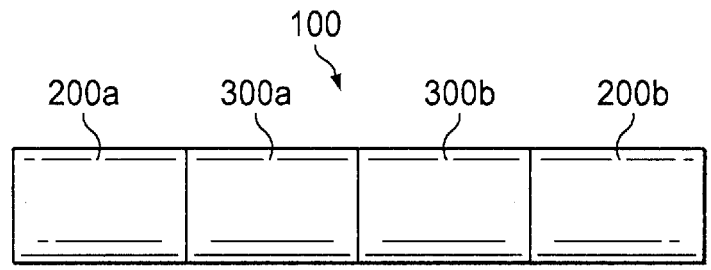
FIG. 6D is a simplified illustration of an example embodiment of a system having a first mechanical assembly, a first chemical assembly, a second chemical assembly, and a second mechanical assembly.
Figure 6E:
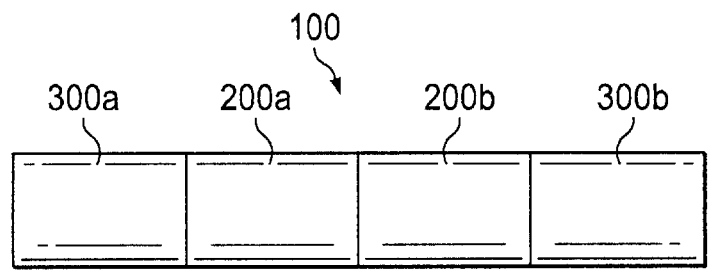
FIG. 6E is a simplified illustration of an example embodiment of a system having a first chemical assembly, a first mechanical assembly, a second mechanical assembly, and a second chemical assembly.
Figure 6F:
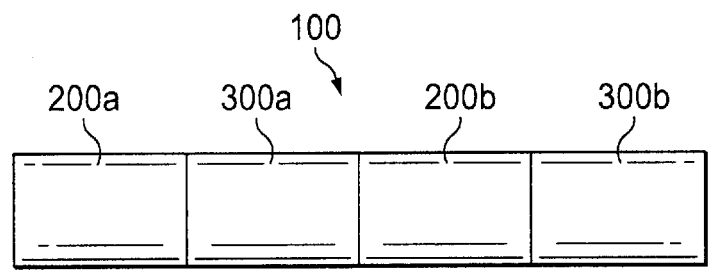
FIG. 6F is a simplified illustration of an example embodiment of a system having a first mechanical assembly, a first chemical assembly, a second mechanical assembly, and a second chemical assembly.

For example, as illustrated in FIG. 6D, the system 100 may also include a first mechanical assembly 200*a* and a first chemical assembly 300*a* arranged serially in line with and secured to one another, a second chemical assembly 300*b* arranged serially in line with and secured to the first chemical assembly 300*a*, and a second mechanical assembly 200*b* arranged serially in line with and secured to the second chemical assembly 300*b*. Alternatively, as illustrated in FIG. 6E, the system 100 may also include a first chemical assembly 300*a* and a first mechanical assembly 200*a* arranged serially in line with and secured to one another, a second mechanical assembly 200*b* arranged serially in line with and secured to the first mechanical assembly 200*a*, and a second chemical assembly 300*b* arranged serially in line with and secured to the second mechanical assembly 200*b*. Alternatively, as illustrated in FIG. 6F, the system 100 may also include a first mechanical assembly 200*a* and a first chemical assembly 300*a* arranged serially in line with and secured to one another, a second mechanical assembly 200*b* arranged serially in line with and secured to the first chemical assembly 300*a*, and a second chemical assembly 300*b* arranged serially in line with and secured to the second mechanical assembly 200*b*.

Figure 6G:
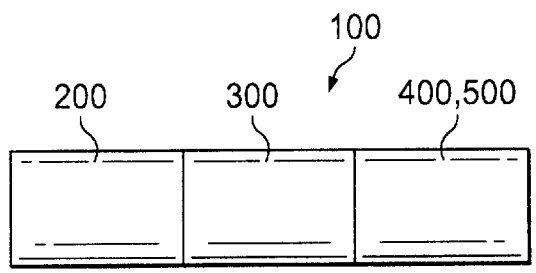
FIG. 6G is a simplified illustration of an example embodiment of a system having a sampling assembly and/or a measuring assembly in addition to or in replacement of one of the mechanical assemblied or chemical assemblied as described in one of the above embodiments.

Alternatively, as illustrated in FIG. 6G, the system 100 may also include a sampling assembly 400 and/or a measuring assembly 500 in addition to or in replacement of one of the mechanical assemblies 200 or chemical assemblies 300 described above and in the present disclosure.

It is to be understood in the present disclosure that in the example embodiments described above and in this *Example 12* where the system 100 includes four or more subsystems, the four or more subsystems may be configured to share (or not share) one or more elements. For example, the system 100 may comprise a single controller and a single storage medium (memory), or one or more of the subsystem may comprise its own controller and/or storage medium (memory). As another example, the system 100 may comprise a single end portion (210, 310, 410, or 510) and a single end portion (212, 312, 412, or 512), or one or more of the subsystems may comprise its own single end portion (210, 310, 410, or 510) and/or a single end portion (212, 312, 412, or 512). As another example, the system 100 may comprise a single common main body (202, 302, 402, or 502), or one or more of the subsystems may comprise its own main body (202, 302, 402, or 502). As another example, the system 100 may comprise a single power source, or each subsystem may comprise its own power source. As another example, when the system comprises one or more chemical assemblies 300, the system 100 may comprise a single container unit, or each subsystem may comprise its own container unit.

In respect to the dimensions of a system 100 having four or more subsystems/assemblies, as described in this Example 12 and in the present disclosure, a dimension between the two ends of the system 100 (i.e., overall length) may be selected based on, among other things, the minimum or smallest bend radius found in the non-straight portions (e.g., bends or turns) of the overall pipeline 1 so as to ensure the system 100 is capable of traversing through such bends. In situations wherein the overall length of the system 100 exceeds the maximum allowable length based on considerations of the aforementioned minimum or smallest bend radius of the pipeline 1, one or more of the securing/attaching portion between the subsystems/assemblies may include one or more bendable, pivotable, actuatable, and/or flexible portions configurable to enable the system 100 to traverse through such non-straight portion of the pipeline 1. In addition to or alternatively, one or more of the subsystems/assemblies may include one or more bendable, pivotable, actuatable, and/or flexible portions, as described above and in the present disclosure.

Method of Performing an Action to an Interior Wall of a Pipeline (e.g., Method 700).

Figure 7:
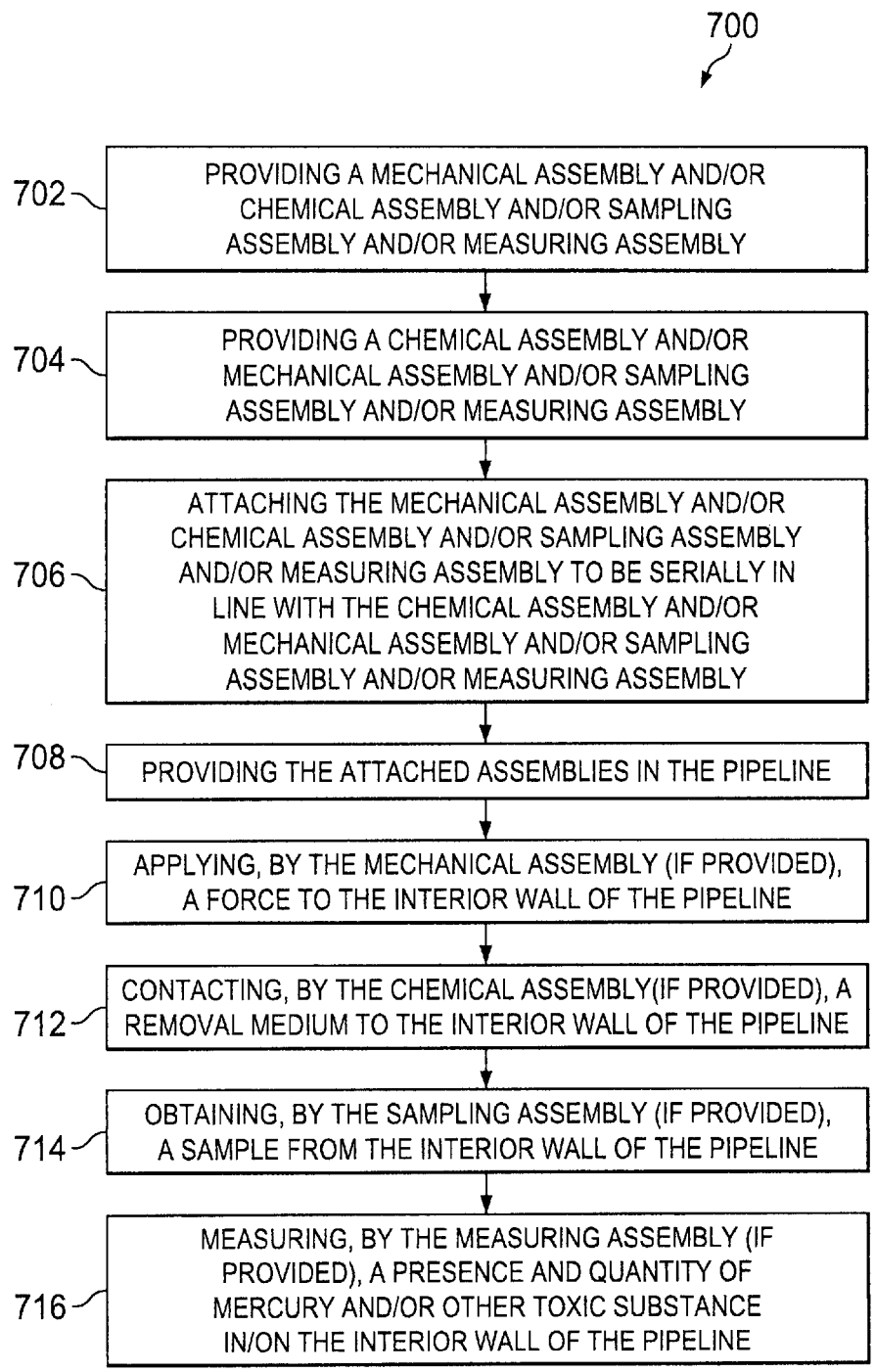
FIG. 7 is an illustration of an example embodiment of a method of performing an action on a pipeline.

FIG. 7 illustrates an example embodiment of a method (e.g., method 700) of performing an action (e.g., treating, sampling, measuring, etc.) to an interior wall of a pipeline 1. The method 700 may comprise providing a system (e.g., system 100). For example, the method 700 may include providing a system 100 having one or more mechanical assemblies (e.g., action 702). Each mechanical assembly (e.g., mechanical assembly 200) may be a mechanical assembly 200 described above and in the present disclosure. In addition to or alternatively, the method 700 may include providing a system 100 having one or more chemical assemblies (e.g., action 704). Each chemical assembly (e.g., chemical assembly 300) may be a chemical assembly 300 described above and in the present disclosure. In addition to or alternatively, the method 700 may include providing a system 100 having one or more sampling assemblies. Each sampling assembly (e.g., sampling assembly 400) may be a sampling assembly 400 described above and in the present disclosure. In addition to or alternatively, the method 700 may include providing a system 100 having one or more measuring assemblies. Each measuring assembly (e.g., measuring assembly 500) may be a measuring assembly 500 described above and in the present disclosure. In addition to or alternatively, the method 700 may include providing a system 100 having one or more mechanical assemblies 200, one or more chemical assemblies 300, one or more sampling assemblies 400, and/or one or more measuring assemblies 500.

In example embodiments wherein more than one assembly (e.g., one or more mechanical assemblies 200, one or more chemical assemblies 300, one or more sampling assemblies 400, and/or one or more measuring assemblies 500) are provided, the method 700 may further comprise securing/attaching the provided assemblies to be serially in line with one another, as described above and in the present disclosure (e.g., action 706).

The method 700 may further comprise providing the system 100 of serially secured/attached assemblies in the pipeline 1 (e.g., action 708). An example embodiment of providing the system 100 in the pipeline 1 is illustrated in FIGS. 1A and 1B.

The method 700 may further comprise encouraging the system 100 to travel through the pipeline 1, as described above and in the present disclosure. For example, the system 100 may be encouraged to travel through the pipeline 1 via an externally-provided high pressure medium (gas, liquid, and/or other medium) provided and/or applied to an end (e.g., first end 210 of the mechanical assembly 200, second end 212 of the mechanical assembly 200, first end 310 of the chemical assembly 300, second end of the chemical assembly 300, section 410 of the sampling assembly 400, section 412 of the sampling assembly 400, section 510 of the measuring assembly 500, and/or section 512 of the measuring assembly) of the system 100. In addition to or alternatively, the method 700 may comprise configuring the system 100 to comprise one or more mechanisms operable to enable the system 100 to move, change speed, position, change position, and/or stop within the pipeline 1. For example, the system 100 may include one or more wheels, anchors, arms/legs, and/or other moving and/or stopping mechanisms known in the art.

When the system 100 is provided in the pipeline 1 and when the system 100 is provided with one or more mechanical assemblies 200, the method 700 may further comprise applying, by the one or more mechanical assemblies 200, a contact and force to the interior wall 1b of the pipeline 1 (e.g., action 710), as described above and in the present disclosure. In this regard, while the system 100 is encouraged to move and/or stop, the contact and force applied by the one or more mechanical assemblies 200 (i.e., the contact region(s)) may be operable to remove at least a portion of a corroded or scaled outermost layer of the interior wall 1b of the pipeline 1.

In addition to or alternatively, when the system 100 is provided in the pipeline 1 and when the system 100 is provided with one or more chemical assemblies 300, the method 700 may further comprise contacting, by the one or more chemical assemblies 300, one or more removal mediums (e.g., removal medium 306) to the interior wall 1b of the pipeline 1 (e.g., action 712), as described above and in the present disclosure. In this regard, while the system 100 is encouraged to move and/or stop, the contact of the removal medium(s) by the one or more chemical assemblies 300 may be operable to remove at least a portion of a corroded or scaled outermost layer of the interior wall 1b of the pipeline 1.

In addition to or alternatively, when the system 100 is provided in the pipeline 1 and when the system 100 is provided with one or more sampling assemblies 400, the method 700 may further comprise obtaining, by the one or more sampling assemblies 400, a sample from the interior wall 1b of the pipeline 1 (e.g., action 714), as described above and in the present disclosure. In this regard, while the system 100 is encouraged to move and/or stop, the end effector(s) of the one or more sampling assemblies 400 may be operable to obtain one or more samples from at least a portion of a corroded or scaled outermost layer of the interior wall 1b of the pipeline 1.

In addition to or alternatively, when the system 100 is provided in the pipeline 1 and when the system 100 is provided with one or more measuring assemblies 500, the method 700 may further comprise measuring, by the one or more measuring assemblies 500, a presence and/or quantity of mercury and/or other toxic substances in/on the interior wall 1b of the pipeline 1 (e.g., action 716), as described above and in the present disclosure. In this regard, while the system 100 is encouraged to move and/or stop, the one or more measuring assemblies 500 may be operable to remove at least a portion of a corroded or scaled outermost layer of the interior wall 1b of the pipeline 1.

Example embodiments of the method 700 will now be described below and with reference to the accompanying figures.

Example 13—Example Embodiment of a Method (e.g., Method 700) of Treating a Pipeline In an example embodiment, a method (e.g., method 700) of treating a pipeline 1 may comprise providing a system (e.g., system 100, as illustrated in FIG. 6D) having a serially in-line arrangement of a first mechanical assembly (e.g., mechanical assembly 200a), a first chemical assembly (e.g., chemical assembly 300a) attached to the first mechanical assembly 200a, a second chemical assembly (e.g., chemical assembly 300b) attached to the first chemical assembly 300a, and a second mechanical assembly (e.g., mechanical assembly 200b) attached to the second chemical assembly 300b. The method 700 may further include configuring the system 100 to perform a treating of an interior wall 1b of the pipeline, as described above and in the present disclosure. The method 700 may further include providing the system 100 into the pipeline 1. The method 700 may further include providing a first removal medium in the chamber of the first chemical assembly 300a and providing a second removal medium in the chamber of the second chemical assembly 300b. The first removal medium may be the same as or different from the second removal medium. The method 700 may further include encouraging the system 100 to travel through the pipeline, such as by launching the system 100 using high pressured medium. The method 700 may further include performing a cleaning of the interior wall 1b of the pipeline 1. The cleaning may be performed by contacting the contact assembly of each of the first mechanical assembly 200a and second mechanical assembly 200b to the interior wall 1b of the pipeline 1 and applying a force, by the aforementioned contact assemblies, to the interior walls 1b of the pipeline 1. The cleaning may be further performed by applying the removal medium of each of the first chemical assembly 300a and second chemical assembly 300b to the interior wall 1b of the pipeline 1. It is recognized in the present disclosure that the contact and applying of force by the contact assemblies and the applying of the removal mediums to the interior walls 1b of the pipeline 1 are operable to remove at least a portion of accumulated and/or residual substances formed on and/or embedded in the interior walls 1b of the pipeline 1. For example, such contact and applying of force by the contact assemblies and such applying of the removal mediums are operable to remove at least a portion of a corroded and/or scaled outermost layer present in the interior wall 1b of the pipeline 1.

The method 700 may further comprise providing a second system (e.g., system 100, as illustrated in FIG. 2J) having a serially in-line arrangement of a first planetary arrangement (e.g., mechanical assembly called 200a, such as the first planetary arrangement illustrated in FIG. 2H) attached to another first planetary arrangement (e.g., mechanical assembly called 200b, such as the first planetary arrangement illustrated in FIG. 2H, with a same rotation as or opposite rotation to mechanical assembly 200a). The method 700 may further include configuring the system 100 to perform a treating of an interior wall 1b of the pipeline, as described above and in the present disclosure. The method 700 may further include providing the system 100 into the pipeline 1. The method 700 may further include encouraging the system 100 to travel through the pipeline, such as by launching the system 100 using high pressured medium. The method 700 may further include performing a cleaning of the interior wall 1b of the pipeline 1. The cleaning may be performed by contacting the contact assembly of each of the first planetary arrangement 200a and second planetary arrangement 200b to the interior wall 1b of the pipeline 1 and applying a force, by the aforementioned contact assemblies, to the interior walls 1b of the pipeline 1. It is recognized in the present disclosure that such contact and applying of force by the contact assemblies to the interior walls 1b of the pipeline 1 are operable to remove at least a portion of accumulated and/or residual substances formed on and/or embedded in the interior walls 1b of the pipeline 1. For example, such contact and applying of force by the contact assemblies are operable to remove at least a portion of a corroded and/or scaled outermost layer present in the interior wall 1b of the pipeline 1.

While various embodiments in accordance with the disclosed principles have been described above, it should be understood that they have been presented by way of example only, and are not limiting. Thus, the breadth and scope of the example embodiments described in the present disclosure should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

For example, as referred to herein, a controller may be any computing device or communication device, and may include a virtual machine, computer, node, instance, host, or machine in a networked computing environment. Also as referred to herein, a network or cloud may be a collection of machines connected by communication channels that facilitate communications between machines and allow for machines to share resources. Network may also refer to a communication medium between processes on the same machine. Also as referred to herein, a network element, node, or server may be a machine deployed to execute a program operating as a socket listener and may include software instances.

For example, "assembly", "apparatus", "portion", "segment", "member", "body", "section", "subsystem", "system", or other similar terms should generally be construed broadly to include one part or more than one part attached or connected together.

Storage medium (or memory or storage or database) may comprise any collection and arrangement of volatile and/or non-volatile components suitable for storing data. For example, memory may comprise random access memory (RAM) devices, read-only memory (ROM) devices, magnetic storage devices, optical storage devices, and/or any other suitable data storage devices. In particular embodiments, memory may represent, in part, computer-readable storage media on which computer instructions and/or logic are encoded. Memory may represent any number of memory components within, local to, and/or accessible by a processor.

Various terms used herein have special meanings within the present technical field. Whether a particular term should be construed as such a "term of art" depends on the context in which that term is used. For example, "connect", "connected", "connecting", "connectable", "attach", "attached", "attaching", "attachable", "secure", "secured", "securing", "securable", "lock", "locked", "locking", "lockable", "anchor", "anchored", "anchoring", "anchorable", "install", "installed", "installing", "installable", "couple", "coupled", "coupling", "in communication with", "communicating with", "associated with", "associating with", or other similar terms should generally be construed broadly to include situations where attachments, connections, installations, and anchoring are direct between referenced elements or through one or more intermediaries between the referenced elements. As another example, "un-connect," "un-connected", "un-connecting", "un-connectable", "un-attach", "un-attached", "un-attaching", "un-attachable", "un-secure", "un-secured", "un-securing", "un-securable", "unlock", "unlocked", "unlocking", "unlockable", "un-anchor", "un-anchored", "un-anchoring", "un-anchorable", "uninstall", "uninstalled", "uninstalling", "uninstallable", "uncouple", "uncoupled", "uncoupling", or other similar terms should generally be construed broadly to include situations where separation, removal, and detaching are direct between referenced elements or from one or more intermediaries between the referenced elements. These and other terms are to be construed in light of the context in which they are used in the present disclosure and as one of ordinary skill in the art would understand those terms in the disclosed context. The above definitions are not exclusive of other meanings that might be imparted to those terms based on the disclosed context.

Words of comparison, measurement, and timing such as "at the time", "equivalent", "during", "complete", and the like should be understood to mean "substantially at the time", "substantially equivalent", "substantially during", "substantially complete", etc., where "substantially" means that such comparisons, measurements, and timings are practicable to accomplish the implicitly or expressly stated desired result.

Additionally, the section headings and topic headings herein are provided for consistency with the suggestions under various patent regulations and practice, or otherwise to provide organizational cues. These headings shall not limit or characterize the embodiments set out in any claims that may issue from this disclosure. Specifically, a description of a technology in the "Background" is not to be construed as an admission that technology is prior art to any embodiments in this disclosure. Furthermore, any reference in this disclosure to "invention" in the singular should not be used to argue that there is only a single point of novelty in this disclosure. Multiple inventions may be set forth according to the limitations of the claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A system for use in treating an interior wall of a pipeline having
   a geometrically-shaped cross-section, the system comprising:
   a mechanical assembly, the mechanical assembly having a main body and a contact assembly attachable to the main body, wherein, when the mechanical assembly is provided in the pipeline, at least a portion of the contact assembly is configurable to contact with and apply a force to the interior wall of the pipeline; and
   a chemical assembly arranged serially in line with and attached to at least a portion of the mechanical assembly, the chemical assembly having:
   a front section having a cross-sectional portion configurable to resemble the geometrically-shaped cross-section of the pipeline;
   a rear section having a cross-sectional portion configurable to resemble and face the cross-sectional portion of the front section;
   a container unit provided in the front and/or rear sections, the container unit for housing a liquid-based removal medium; and
   an elongated midsection connecting the front and rear sections, the elongated midsection formed separately from the container unit, the elongated midsection having one or more release units formed on the elongated midsection, wherein the one or more of the release units of the elongated midsection are connected to the container unit;
   wherein the front and rear sections are arranged in such a way that, when the chemical assembly is provided in the pipeline, the cross-sectional portions of the front and rear sections are operable to cooperate with the interior wall of the pipeline to form a chamber, the chamber operable to receive and substantially house the liquid-based removal medium;
   wherein one or more of the release units are configured to access the liquid-based removal medium housed in the container unit and provide at least a portion of the liquid-based removal medium housed in the container unit into the chamber; and
   wherein the elongated midsection is configured in such a way that at least a portion of the elongated midsection is adjustable so as to adjust a volume of the chamber.

2. The system of claim 1, wherein the force applied by the contact assembly to the interior wall of the pipeline is sufficient to remove at least a portion of a corroded or scaled outermost layer present in the interior wall of the pipeline.

3. The system of claim 1,
   wherein the contact assembly comprises a first set of contact members arranged radially around the main body, at least one of the contact members having an interior portion attachable to the main body and a contact region facing outwardly away from the main body;
   wherein, when the mechanical assembly is provided in the pipeline, at least a portion of at least one of the contact regions are configurable to contact with and apply the force to the interior wall of the pipeline; and
   wherein the contact assembly is configurable in such a way that at least a portion of at least one of the contact regions are movable in a first direction relative to the main body.

4. The system of claim 3,
   wherein the contact assembly further comprises a second set of contact members arranged radially around the main body and serially in line with the first set of contact members, at least one of the contact members of the second set having a second interior portion attachable to the main body and a second contact region facing outwardly away from the main body;
   wherein the contact assembly is configurable in such a way that at least a portion of at least one of the contact regions of the second set are moveable in a second direction relative to the main body, the second direction different from the first direction; and
   wherein, when the mechanical assembly is provided in the pipeline, at least a portion of at least one of the second contact regions are configurable to contact with and apply the force to the interior wall of the pipeline.

5. The system of claim 1,
   wherein the contact assembly comprises a cylindrical-shaped contact member, the cylindrical-shaped contact member having an interior portion attachable to the main body and a contact region facing outwardly away from the main body;
   wherein, when the mechanical assembly is provided in the pipeline, at least a portion of the contact region is configurable to contact with and apply the force to the interior wall of the pipeline;
   wherein the contact assembly is configurable in such a way that at least a portion of the contact region is movable in a first direction relative to the main body.

6. The system of claim 5,
   wherein the contact assembly further comprises a second cylindrical-shaped contact member arranged serially in line with the cylindrical-shaped contact member, the second cylindrical-shaped contact member having a second interior portion attachable to the main body and a second contact region facing outwardly away from the main body;
   wherein the contact assembly is configurable in such a way that at least a portion of the second contact region of the second cylindrical-shaped contact member is movable in a second direction relative to the main body, the second direction different from the first direction; and
   wherein, when the mechanical assembly is provided in the pipeline, at least a portion of the second contact region of the second cylindrical-shaped contact member is configurable to contact with and apply the force to the interior wall of the pipeline.

7. The system of claim 1, wherein the contact assembly comprises:
   a planetary gear assembly having:
      a sun gear configurable to rotate around its central axis when driven by a source; and
      a plurality of planet gears arranged radially around and in communication with the sun gear, each planet gear configurable to rotate around its own central axis in a first direction when driven by the sun gear; and
   a plurality of contact regions, each contact region formed on at least a portion of an exterior circumferential portion of each planet gear;
   wherein, when the mechanical assembly is provided in the pipeline and the sun gear is driven by the source, at least a portion of at least one of the contact regions are configurable to contact with and apply the force to the interior wall of the pipeline.

8. The system of claim 7, wherein the plurality of planet gears are configurable to collectively rotate in one or more directions around the central axis of the sun gear.

9. The system of claim 7, wherein the contact assembly further comprises:
   a second planetary gear assembly having:
      a second sun gear configurable to rotate around its central axis when driven by a second source; and
      a plurality of second planet gears arranged radially around and in communication with the second sun gear, each second planet gear configurable to rotate around its own central axis in a second direction different from the first direction when driven by the second sun gear; and
   a plurality of second contact regions, each second contact region formed on at least a portion of an exterior circumferential portion of each second planet gear;
   wherein, when the mechanical assembly is provided in the pipeline and the second sun gear is driven by the second source, at least a portion of at least one of the second contact regions are configurable to contact with and apply the force to the interior wall of the pipeline.

10. The system of claim 1, wherein the contact assembly comprises:
    a planetary gear assembly having:
       a sun gear operable to rotate when driven by a source;
       a plurality of planet gears arranged radially around the sun gear;
       a planet carrier having an input end and a plurality of output ends, the input end in communication with the sun gear, each output end in communication with one of the planet gears, wherein the input end is configurable to drive the plurality of output ends to collectively rotate around a central axis of the sun gear, wherein each planet gear is configured in such a way that it is prevented from rotating around its own central axis; and
       a ring gear in communication with and surrounding the planet gears, the ring gear operable to rotate in a first direction when driven by the planet gears; and
    a contact region formed on an exterior circumferential portion of the ring gear;
    wherein, when the mechanical assembly is provided in the pipeline and the sun gear is driven by the source, at least a portion of the contact region is configurable to contact with and apply the force to the interior wall of the pipeline.

11. The system of claim 10, wherein the contact assembly further comprises:
    a second planetary gear assembly having:
       a second sun gear operable to rotate when driven by a second source;
       a plurality of second planet gears arranged radially around the second sun gear;
       a second planet carrier having a second input end and a plurality of second output ends, the second input end in communication with the second sun gear, each second output end in communication with one of the second planet gears, wherein the second input end is configurable to drive the plurality of second output ends to collectively rotate around a central axis of the second sun gear, wherein each second planet gear is configured in such a way that it is prevented from rotating around its own central axis; and
       a second ring gear in communication with and surrounding the second planet gears, the second ring gear operable to rotate in a second direction different from the first direction when driven by the planet gears; and
    a second contact region formed on an exterior circumferential portion of the second ring gear;
    wherein, when the mechanical assembly is provided in the pipeline and the second sun gear is driven by the second source, at least a portion of the second contact region is configurable to contact with and apply the force to the interior wall of the pipeline.

12. The system of claim 1, further comprising the liquid-based removal medium, the liquid-based removal medium for use in the chamber, the liquid-based removal medium operable to remove at least a portion of a corroded or scaled outermost layer of the interior wall of the pipeline upon contact with the said corroded or scaled outermost layer of the interior wall of the pipeline, wherein the liquid-based removal medium comprises one or more of an acid, mercury (Hg) stabilizer, inhibitors, or scale removal compound.

13. The system of claim 1, wherein the volume of the chamber is selectively configurable by adjusting a length of the elongated midsection of the chemical assembly and/or a volume of the elongated midsection of the chemical assembly.

14. The system of claim 1, further comprising a controller, the controller configurable to perform at least one or more of the following:
    control the contact assembly so as to contact with and apply the force to the interior wall of the pipeline when the mechanical assembly is provided in the pipeline;
    control at least a portion of the contact assembly so as to move relative to the main body;
    control a separation distance between the cross-sectional portions of the front and rear sections;
    control a volume of the chamber; and/or
    control a volume of the liquid-based removal medium housed in the chamber.

15. The system of claim 1, further comprising a second mechanical assembly arranged serially in line with the mechanical assembly and the chemical assembly, the second mechanical assembly having a second main body and a second contact assembly attachable to the second main body, wherein, when the second mechanical assembly is provided in the pipeline, at least a portion of the second contact assembly is configurable to contact with and apply a force to the interior wall of the pipeline.

16. The system of claim 1, further comprising a second chemical assembly arranged serially in line with the mechanical assembly and the chemical assembly, the second chemical assembly having:
- a second front section having a cross-sectional portion configurable to resemble the geometrically-shaped cross-section of the pipeline; and
- a second rear section having a cross-sectional portion configurable to resemble and face the cross-sectional portion of the second front section;
- wherein the second front and rear sections are arranged in such a way that, when the second chemical assembly is provided in the pipeline, the cross-sectional portions of the second front and rear sections are operable to cooperate with the interior wall of the pipeline to form a second chamber, the second chamber operable to receive and substantially house a second liquid-based removal medium.

17. The system of claim 1, further comprising a sampling assembly, the sampling assembly having a sample extraction subsystem for extracting a sample of a portion of the interior wall of the pipeline and a sample containment subsystem for storing the extracted sample.

18. The system of claim 1, further comprising a measuring assembly, the measuring assembly configurable to measure a concentration of mercury (Hg) present in the interior wall of the pipeline.

* * * * *